United States Patent [19]

Waugh

[11] 4,437,159

[45] Mar. 13, 1984

[54] COOKING COMPUTER

[75] Inventor: Gerald F. Waugh, Shreveport, La.

[73] Assignee: The Frymaster Corporation, Shreveport, La.

[21] Appl. No.: 264,173

[22] Filed: May 15, 1981

[51] Int. Cl.³ .......................... G06F 15/46; H05B 1/02
[52] U.S. Cl. ..................................... 364/400; 219/492; 219/494; 364/144; 364/557
[58] Field of Search ................ 364/400, 477, 143–147, 364/557, 569; 219/489, 492, 494, 497, 441, 442, 501; 99/325–328, 330–333, 336, 403

[56] References Cited

U.S. PATENT DOCUMENTS 4,197,581 4/1980 Watrous et al. ..................... 364/400
4,223,379 9/1980 Simcoe ................................. 364/144
4,225,776 9/1980 Meisner et al. ................. 219/494 X
4,301,509 11/1981 Haase et al. ........................ 364/400
4,345,145 8/1982 Norwood ............................ 99/328 X

*Primary Examiner*—Joseph F. Ruggiero
*Attorney, Agent, or Firm*—Hubbard, Thurman, Turner & Tucker

[57] ABSTRACT

A cooking computer for use with a deep fat fryer having a temperature sensing probe as disclosed herein. The temperature sensing probe feeds a signal to a microprocessor. The microprocessor provides internal cook cycle timers which are alterable by signals from the temperature probe to correspond to changes in the rate of cooking of a commestible. Up to 12 recipes, each of which include a cooking time and a temperature compensation, can be stored in an EAROM. Cooking times and time compensation factors stored in recipes are user alterable through a keyboard.

17 Claims, 60 Drawing Figures

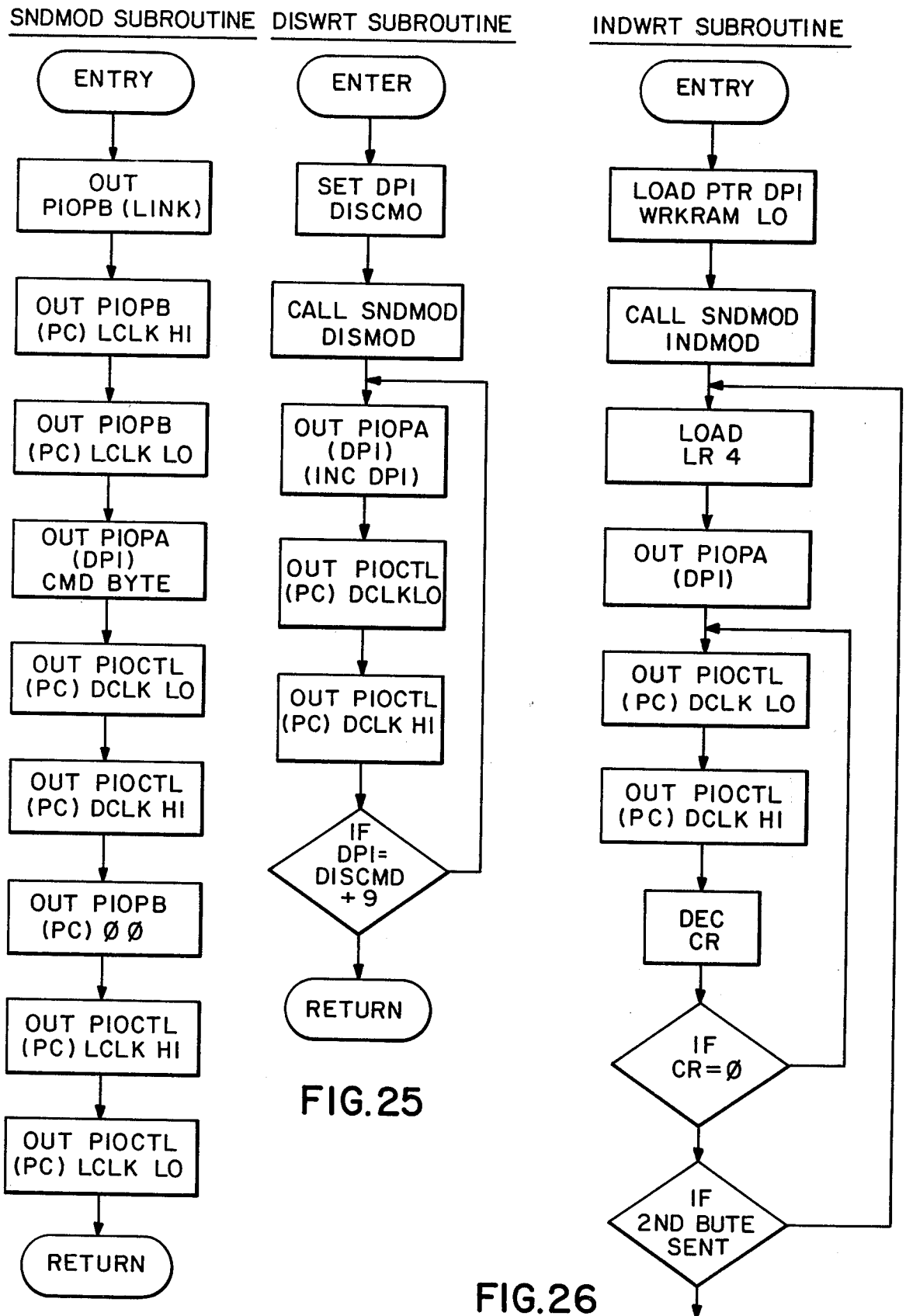

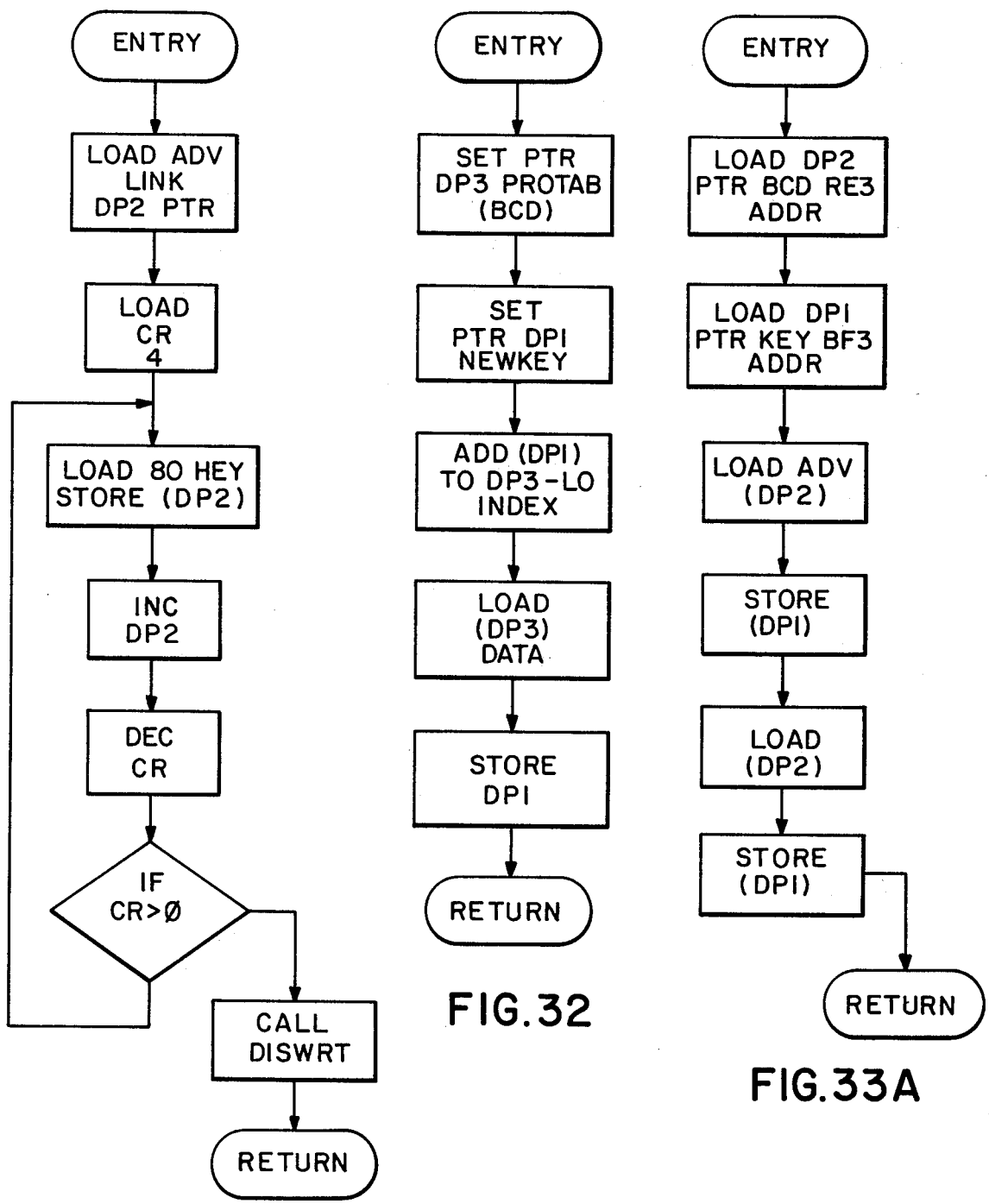

C TO F SUBROUTINE

MULTIPLY SUBROUTINE

DIVIDE SUBROUTINE

F TO C SUBROUTINE

COOKING COMPUTER

BACKGROUND OF THE INVENTION

There has been for a long time a need for a device to control precisely cooking of comestibles and deep fat fryers precisely and easily. A number of approaches have been developed in the prior art.

U.S. Pat. No. 3,979,056 to Barnes for a Multi-Product Cooking Computer discloses an electronic circuit having a timer controlled in part by a temperature probe submerged within heated oil or shortening in a deep fat fryer well. The temperature probe controls the rate of oscillation of an oscillator 22. Oscillator 22 drives a counter 24. When counter 24 counts a predetermined number of oscillations of oscillator 22, an output signal is provided indicating that cooking has been completed. In other words, Barnes employs a temperature adjusted oscillator to perform a type of time-temperature cooking integration. Barnes also provides a plurality of product selection switches which connect different resistances in series with a capacitor 68 to control the period of the oscillator. However, should it become necessary to adjust the time for which a particular product selection switch conditions the oscillator internal adjustments of a mechanical or electronic nature would have to be made to the circuit.

Another approach was taken in U.S. Pat. No. 4,197,581 to Watrous et al, for a Control System for and Method of Controlling a Cooking Appliance. Watrous teaches the use of a combination microcomputer controller having associated circuitry for controlling a deep fat fryer. Watrous, preloads timing counters from diode matrices. Watrous, like Barnes, employs a temperature variable frequency oscillator but uses it to actuate microcomputer counters. The variable frequency oscillator of Watrous is controlled by a cooking control probe R801 so that as the probe, which is submerged in heated oil, becomes warmer, the oscillator runs faster. There is no provision in Watrous for altering the preload cooking counter without rewiring a circuit board.

There appears to be no prior art on a precise apparatus and method for controlling a deep fat fryer and having the facility for reprogramming. The reprogramming facility should be usable by persons in authority without the problems associated with tampering of controlled information by unauthorized persons.

SUMMARY OF THE INVENTION

A cooking computer is disclosed herein which employs a reprogrammable microprocessor control. The cooking computer is adapted for use with a deep fat fryer wherein more than two food products, possibly of different types, are to be cooked simultaneously in the same shortening.

The controller has a temperature sensing probe which supplies analog temperature information to an analog-to-digital converter. The analog-to-digital converter supplies binary temperature information to a microprocessor. The microprocessor is controlled by a stored program and by recipe constants stored in keyboard alterable permanent memory. Cooking time loaded into alterable memory is modified during a cooking operation to adjust for changes in the rate of cooking due to temperature fluctuations in the oil bath.

The contents of part of the alterable permanent memory may be changed by authorized users having knowledge of an access code of the alterable memory of microprocessor control. Unauthorized users are prevented from making program changes. Up to twelve recipes can be stored in alterable memory. Each recipe includes cooking time and a time-temperature adjustment factor referred to hereinafter as a sensitivity factor. Each of the recipes can have a different cooking time and sensitivity factor.

It is an object of the present invention to provide a reprogrammable cooking computer with a deep fat fryer. It is another object of the present invention to provide a cooking computer for a deep fat fryer which adjusts cooking time as a function of the temperature conditions of a shortening bath.

It is still another object of the instant invention to provide a cooking computer for a deep fat fryer having seven segment displays to display cooking oil temperature, remaining adjusted cooking time and/or hold time for previously cooked products.

Other objects of the present invention will become obvious to one skilled in the art upon a period of the following specification and claims in light of the accompanying drawings.

BRIEF DESCRIPTION OF THE DRAWINGS

FIG. 24 is a flow diagram of a subroutine which initiates a display controller;

FIG. 25 is a flow diagram of a subroutine which transfers information to a display controller;

FIG. 26 is a flow diagram of a routine which sends information to a display controller which controls a plurality of LED indicators;

FIG. 31 is a flow diagram of a subroutine which blinks the 7-segment displays;

FIG. 32 is a flow diagram of a subroutine which processes information received from the keyboard;

FIG. 33A is a flow diagram of a routine which displays time elapsed in a cook cycle or during a fryer recovery routine;

DESCRIPTION OF THE PREFERRED EMBODIMENT

Figure 1A:
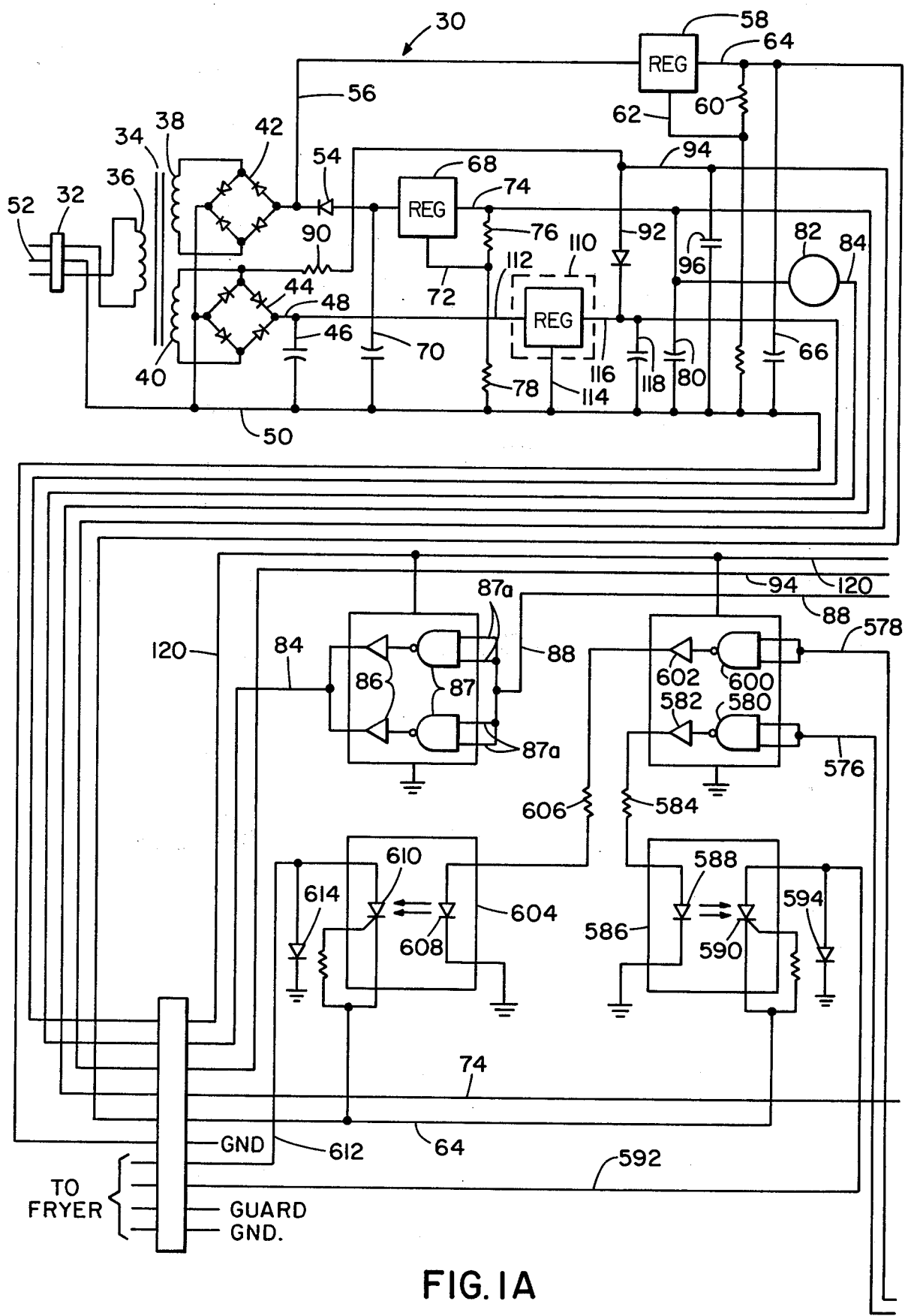
FIG. 1A is a portion of the schematic diagram of the instant cooking computer showing details of a power supply and basket lift control circuits.

A cooking computer 10 for use with a deep fat fryer 12 having an electric heater 12a and a thermostat 12b is generally disclosed herein. Cooking computer 10 has a thermal probe 14 located in a deep fat fryer well 16 for submersion in heated oil to sense the temperature thereof as does thermostat 12b. As will be explained in greater detail hereinafter, the temperature probe 14 is connected to an analog-to-digital converter which supplies digital signals to a microprocessor, indicative of the temperature of the oil in the deep fat fryer. The microprocessor processes the digital temperature signals using a program and data stored in a Read Only Memory and other data stored in an Electrically Alterable Read Only Memory (EAROM). A timing counter has its periodic updating facility conditioned in response to the temperature of the oil to reflect accurately the amount of cooking completion of a particular foodstuff placed in a basket 18 lowered within the well 16. After a predetermined time, as adjusted for temperature variations in the oil, the microprocessor gives a command to a motor control circuit to cause a motor 19 drivingly connected to the basket 18 to raise the basket 18 from the well 16 to terminate cooking of the foodstuff.

The instant cooking computer includes a power supply generally referred to by the numeral 30 and shown in FIG. 1A. Power supply 30 includes a power supply plug 32 which is connected to a transformer 34 at a primary winding 36. Power transformer 34 also has a pair of secondary windings 38 and 40. A first full-wave rectifier bridge 42 is connected across secondary winding 38. A second full wave rectifier bridge 44 is connected across secondary winding 40. A filter capacitor 46 is connected between a lead 48, which is connected to bridge 44, and a ground lead 50, which is connected to a ground terminal 52 of plug 32. A reverse poled diode 54 is connected to bridge 42 at its junction with a lead 56. Lead 56 supplies filtered DC current to a voltage regulator 58, in this instance, a LM337MP regulator configured as a clamp. The regulator 58 has a resistor 60 connected across its adjustment lead 62 and its output lead 64. A filter capacitor 66 is connected between regulator output lead 64 and ground lead 50. Regulator output lead 64 provides a source of electric power to the basket lifts.

A second LM337MP voltage regulator 68 also configured as a clamp is connected to diode 54 and to a capacitor 70. Again, an adjustment lead 72 and an output lead 74 are connected together by a resistor 76. Resistor 76 comprises a portion of a voltage divider which includes a resistor 78 connected to ground lead 50. The output of voltage regulator 68 is fed through lead 74 and is filtered by a capacitor 80 connected between lead 74 and ground lead 50. An audible alarm device, such as a buzzer 82, is connected to the junction of capacitor 80 and lead 74 and is also connected to other portions of the circuit to provide an output indication on certain specified conditions such as cooking completion hold time expiration or data entry. Alarm 82 is connected through a lead 84 to a pair of buffers 86 connected to a pair of NAND gates 87 comprised of a 74C908 integrated circuit. All of the NAND gate input leads 87a are tied together and connected to a lead 88. Furthermore, the outputs of buffers 86 connected to the NAND gates 87 are connected in parallel to buzzer lead 84.

A resistor 90 is connected to bridge 44 and secondary winding 40 of power transformer 34 to receive alternating current at line frequency and feed it to a diode 92 connected thereto. A tap lead 94 is connected to diode 92 and receives essentially have wave rectified voltage therefrom. The half wave rectified voltage is partially filtered by a capacitor 98 connected between lead 94 and ground lead 50. Lead 94 is also connected to an inverter 96 which drives a capacitor 98 and a resistor 100 to provide a triggering edge to a second inverter 102. Inverter 102 is connected to an RCA CDP 1802 microprocessor configured as a central processor unit 104 at its interrupt pin 106, thereby causing interrupt signals to be generated in central processor unit 104 in synchronism with the alternating current line frequency feeding the power supply 30.

Voltage regulator 110, in this case, an MC7805CT has an input terminal 112 connected to capacitor 46, a ground terminal 114 connected to ground lead 50 and an output terminal 116 connected to diode 92. In addition, a capacitor 118 is connected between diode 92 and ground lead 50 and has a regulated power supply or VCC lead 120 connected thereto. VCC lead 120 provides a 5 volt power supply potential to buffers 86, NAND gates 87 and other portions of the circuit. VCC lead 120 is also connected to a VCC terminal 122 of CPU 104 and a VDD terminal 124 of CPU 104. A ground terminal 126 of CPU 124 is connected to ground.

CPU 104 also has a clear terminal 128 which is supplied with signals by a pair of series connected inverters respectively numbered 130 and 132 connected to a resistor 134 and a capacitor 136, which are series connected between ground and a source of intermittent voltage supplied to reset or clear CPU 104. A quartz crystal having a resonant frequency of 2 MHz is connected in parallel with a resistor 140, the parallel combination being connected across a clock pin 142 and an XTAL pin 144 of CPU 104. CPU 104 is an 8 bit microprocessor and has 8 data or data bus pins which are identified herein by the numerals 150 through 157, each of which are connected to a resistor collectively identified by numeral 158 which are all connected to VCC lead 120. Data bus leads 150 through 157 are collectively referred to herein as data bus 160. A wait pin 162 is also connected to one of the pull up resistors 158.

In addition, a pair of Direct Memory Access pins 164 and 166 are connected in parallel to one of a plurality of resistors 168. Resistors 168 are connected to VCC lead 120 to provide voltage pull up to the CPU 104 pins. CPU 104 also has eight memory address pins, respectively identified by numerals 170 through 177, numeral 170 representing the lowest order bit, and numeral 177 representing the highest order bit. Each of pins 170 through 177 are connected through a respective pull up resistor of plurality 168 to VCC lead 120. Address leads 170 through 177 together comprise an 8 bit address bus 180.

CPU 104 also has a memory read pin 182 to which is connected to a memory read line 184. A Q flip-flop pin 185 is connected to buzzer control lead 88. A memory write pin 186 has a memory write line 188 connected thereto. A TPA or timing pulse A pin 190 has a TPA line 192 connected thereto. CPU 104 also has a TPB pin 194 together with a plurality of N lines; an N0 line 196, and N1 line 198, and an N2 prior line 200. TPB line 194, N0 line 196, and N1 line 198 are shown herein for simplicity sake as comprising a timing and control bus 202. N2 pin 200 is connected to an N2 line 204.

CPU 104 also includes a plurality of input flag terminals hereinafter identified in the manufacturer's scheme as terminals EF1 through EF4 having the corresponding identifying numerals 206, 208, 210 and 212. Terminal 212 is connected to ground by a jumper only during manufacturing burn-in and diagnostic routines. Terminal 210 is connected to ground to place controller 10 in its multiproduct mode. When terminals 210 and 212 are not connected to ground they are held at VCC by a pair of resistors 214 and 216 connected to lead 120 at a point 218.

Figure 1B:
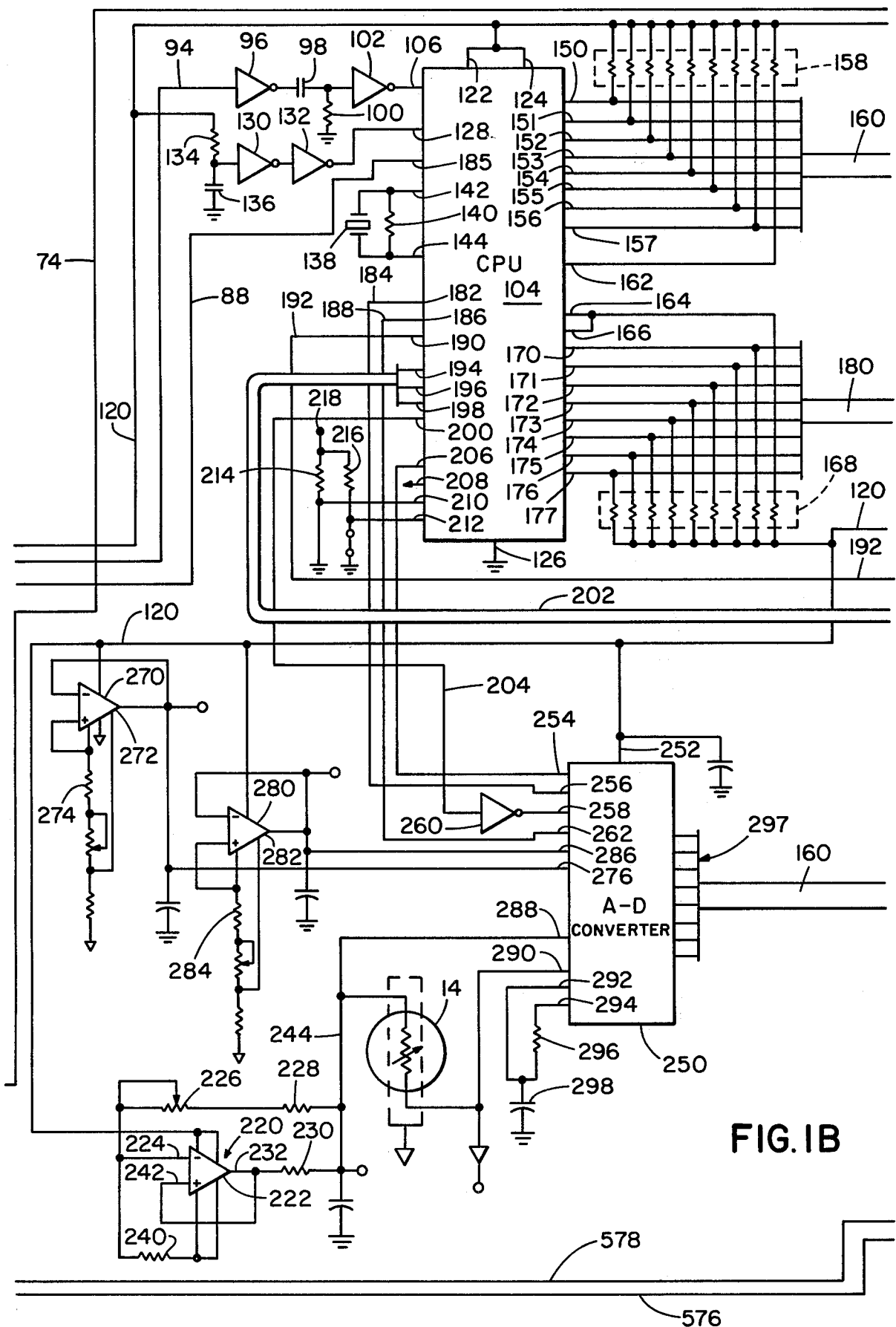
FIG. 1B is a portion of a schematic diagram of a cooking computer showing details of an analog-to-digital converter and a central processing unit.
Figure 1C:
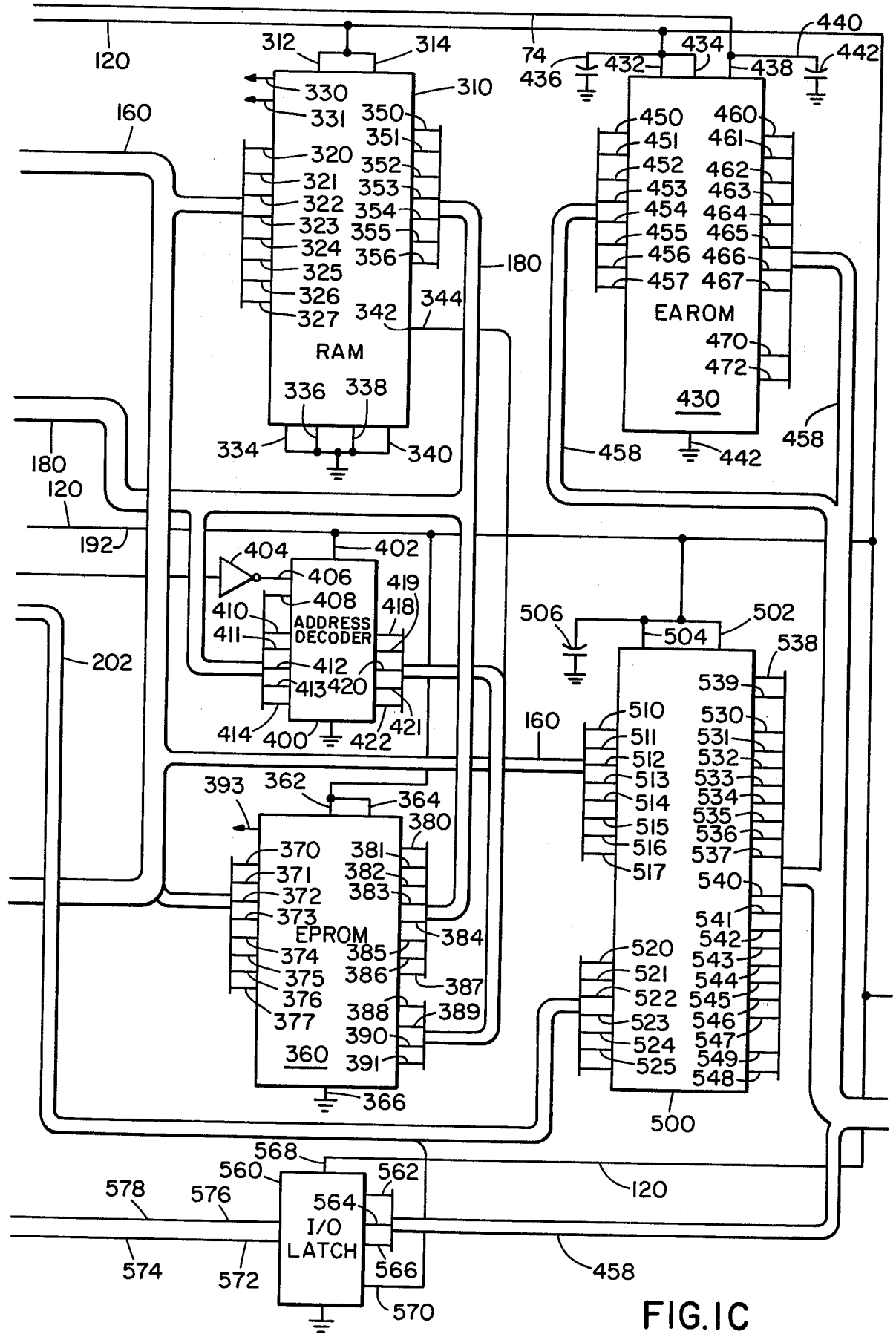
FIG. 1C is a schematic diagram of a portion of a cooking computer showing details of various memory devices and an input/output port.

Referring to the lower left portion of FIG. 1B, there is shown a constant current generator 220 which includes an operational amplifier 222 having an inverting terminal 224 connected to a variable resistor 226, a fixed resistor 228 and another fixed resistor 230, which is connected to an output terminal 232. A fixed resistor 240 is connected between a power supply lead and inverting terminal 224. A noninverting terminal 242 is directly connected to output terminal 232. The constant current output supplied by constant current generator 220 is fed through a lead 224 to the RTD thermal probe 14 and back to ground. Lead 244 is also connected to an analog to digital converter 250, in this embodiment, a Model ADC0803LCD. Analog to digital converter 250 is powered from line 120 at a VCC pin 252. A ready pin 254 is connected to flag pin EF1 or pin 206 of CPU 104. A read pin 256 is connected to memory read pin 182 of CPU 104 to provide a processing completion signal to CPU 104. A chip select or CS pin 258 is connected through an inverter 260 to line 204 for receipt of control signals from N2 line 200 of CPU 104. A write pin 262 is connected to lead 188.

A first voltage reference generator 270 comprised of an operational amplifier 272 and voltage divider network 274 is connected to a pin 276, in this instance, the V minus pin of analog to digital converter 250 to provide zero offset to analog to digital converter 250. A second substantially identical voltage reference supply 280 having an operational amplifier 282 and a voltage divider 284 is connected at its output to a pin 286 in this case the reference divide by 2 pin of analog to digital converter 250. A V plus pin 288 is connected to lead 244 for receipt of the voltage signal across the RTD probe 14 which is indicative of the temperature of the fryer shortening. An AG pin 290 is connected to the opposite side of the RTD probe 14 and a CC and CR pin, respectively numbered 292 and 294 are connected together by a resistor 296 which is connected to ground through a capacitor 298. A plurality of data bus pins 297 from analog to digital converter 250 are connected to the data bus 160 of CPU 104 to supply an 8 binary digital signal to CPU 104 representative of the voltage drop across the RTD probe, which is indicative of the temperature of the shortening bath.

Volatile memory for information processing by the CPU 104 is provided by a Random Access Memory or RAM 310. In the instant embodiment RAM 310 is an RCA CDP1823 128 byte random access memory. Other random access memories could also be used by one skilled in the art. RAM 310 is connected to VCC lead 120 at a VCC pin 312 and a chip select or CS pin 314. Furthermore, a plurality of data bus pins respectively numbered 320 through 327 with pin 320 being the lowest order pin and 327 being the highest order pin. Data bus pins 320 through 327 are connected to data bus 160. A memory read pin 330 and a memory write pin 331 are respectively connected to memory read pin 182 and memory write 186 of CPU 104. A plurality of three chip select pins respectively numbered 334, 336 and 338 together with a VSS pin 340 are all connected to ground. A pin 342 commonly known as the A12 pin or address 12 pin on RAM 310 is hereinafter used as a chip select pin and is connected to a lead 344. A plurality of address pins respectively numbered 350 through 356 is connected to address bus 180. Ram 310 is used to store variables frequently changed and used by CPU 104 during computations. RAM 310 is unable to store information when power is not being supplied.

The program to operate CPU 104 is stored in a permanent memory, in this instance, a Texas Instruments TMS2532 Erasable Programmable Read Only Memory or EPROM, hereinafter identified by numeral 360. EPROM 360 is powered by VCC lead 120 at its VCC pin 362 and pin 364, its VDD pin. EPROM 360 is also connected to ground at a pin 366. EPROM 360 also has a plurality of data bus terminals, respectively, 370 through 377, with terminal 370 identifying the lowest order bit and terminal 377 identifying the highest order bit. Data bus pins 370 through 377 are connected to data bus 160 for communication with CPU 104. Furthermore, EPROM 360 receives address signals through a plurality of memory address pins 380 through 391. Pin 380 is the lowest order pin and pin 391 is the highest order pin. Pins 380 through 387 are connected directly to address bus 180. Pins 388 through 391 are respectively connected to a local decoder bus 392. A chip select pin 393 is connected to lead 344.

Since CPU 104 can access over 65,000 bytes of memory which requires memory addressing with a 16 bit number and since CPU 104 only has an 8 bit memory address bus, it is necessary for CPU 104 to supply the address of the information to be accessed from the EPROM 360 in two fetch cycles. Thus, as is well known in the art, it is necessary for a portion of the address bits to be latched with an address decoder 400 a National Semiconductor 74C174 Hex D Flip-Flop is used. Address decoder 400 has a power supply pin 402 connected to line 120. An inverter 404 connects TPA line 192 from CPU 104 with a flip-flop clock terminal 406. A latch request terminal 408 is connected to CPU 104. A plurality of flip-flop memory address pins respectively numbered 410 through 414 is connected to address bus 180 to receive information therefrom. In this instance, memory address pin 410 is the lowest order pin, memory address pin 414 is the highest order pin. A plurality of address output pins, respectively numbered 418 through 422, is connected to local bus 392 to feed the highest order bits of the address output by the CPU in two cycles to EPROM 360.

Certain specific program information such as recipe constants which include sensitivity factors and recipe times in minutes and seconds is stored in an Electrically Alterable Read Only Memory 430, in this embodiment, a Nitron ER 7055 EAROM, having 64 bytes of storage. EAROM 430 has a VCC pin 432 which is connected to receive power from VCC line 120. A CS2 or chip select 2 pin 434 is connected in parallel VCC pin 432 to lead 120. A power supply filter capacitor 436 is connected in parallel with pins 432 and 434 and to ground. A VGG pin 438 is connected to a lead 440 and to a grounded filtered capacitor 442. Lead 440 is connected to lead 74 of the power supply 30. EAROM 430 has a ground terminal 442 connected to ground and has a plurality of data bus terminals 450 through 457 connected to a local bus data 458. Similarly, a plurality of EAROM address terminals 460 through 467 are connected to another portion of local bus 458 which in this instance provides address information to address pins 460 through 467. In addition, control information is provided by a local bus 458 to a chip select pin 470 and a clock pin 472 of EAROM 430.

A programmable two port input/output device hereinafter referred to as PIO 500 and which is in this embodiment an RCA CDP 1851, is connected to receive information from and transfer information to data bus 160, control bus 202 and local data bus 458, as will be explained in more detail hereinafter. PIO 500 is connected to VDD lead 120 at a VCC pin 502 and a chip select 504. A filter capacitor 506 is connected to pins 502 and 504 and to ground. CPU data bus 160 is connected to a plurality of PIO bus pins 510 through 517 for the transfer of information to and from the CPU 104. Control bus 202 is connected to a memory read pin 520, a TPA pin 521, a TPB pin 522 and N0 pin 523 and N1 pin 524 and a clear pin 525. PIO 500 has a pair of input/output ports, the first one, identified as Port A, is comprised of a plurality of Port A IO pins 530 through 537. Port A includes a Port A strobe pin 538 and a Port A ready pin 539. In a similar fashion, the second Port is identified as Port B and includes a plurality of Port B I/O pins 540 through 547. Port B also includes a Port B strobe pin 548 and a Port B ready pin 549. All communication with displays, LEDs, the keyboard and the basket lifts is through PIO 500. In addition, all communication with EAROM 430 is through PIO 500. The only external information which is supplied to controller 10 without being processed by PIO 500 are the temperature signal provided by the RTD probe and the interrupt timing signals.

An input/output latch 560 is connected to bus 458 and more specifically, to pins 540, 541 and the Port B strobe pin 548 at a plurality of pins 562, 564 and 566. I/O latch 560 is powered from lead 120 at a power supply pin or VCC pin 568. A pin 570 is connected to control bus 202 and to the clear pin on the CPU. A first latch output pin 572 is connected to a lead 574 which supplies latched signals to basket lift controllers. A second output pin 576 is connected to a lead 578 to supply other output signals to basket lift controllers. In the present embodiment I/O latch 560 is a National Semiconductor 74C175 Quad D Flip-Flop. Lead 576 connects to parallel input terminals of a NAND gate 580 which is in turn connected to a buffer 582 and supplies an electrical signal through a resistor 584 to an optical coupler 586 having a light emitting diode 588. Light emitting diode 588 controls a silicon controlled rectifier 590 which is connected to power supply lead 64 and a left basket relay lead 592. A diode 594 is connected to ground for surge current protection.

In a similar fashion, a NAND gate 600 is connected as an inverter to lead 578 and supplies its output to a buffer 602 which drives an optical coupler 604 through a resistor 606. Current flowing through resistor 606 is supplied to a light emitting diode 608 of optical coupler 604 which controls a silicon controlled rectifier 610. Silicon controlled rectifier 610 is also connected to lead 64 and to a right lift basket relay lead 612. A protective diode 614 is connected between 612 and ground. Lead 612 is connected to a basket lift control motor for a right hand basket of the deep fat fryer. Lead 592 is connected to the left hand basket of a deep fat fryer. Signals on lead 592 and 612 control the raising and lowering of the respective baskets in the heated oil of the deep fat fryer. Thus, CPU 104 controls the position of the baskets in a deep fat fryer through PIO 500, latch 560 and NAND gates 580 and 600.

Figure 1D:
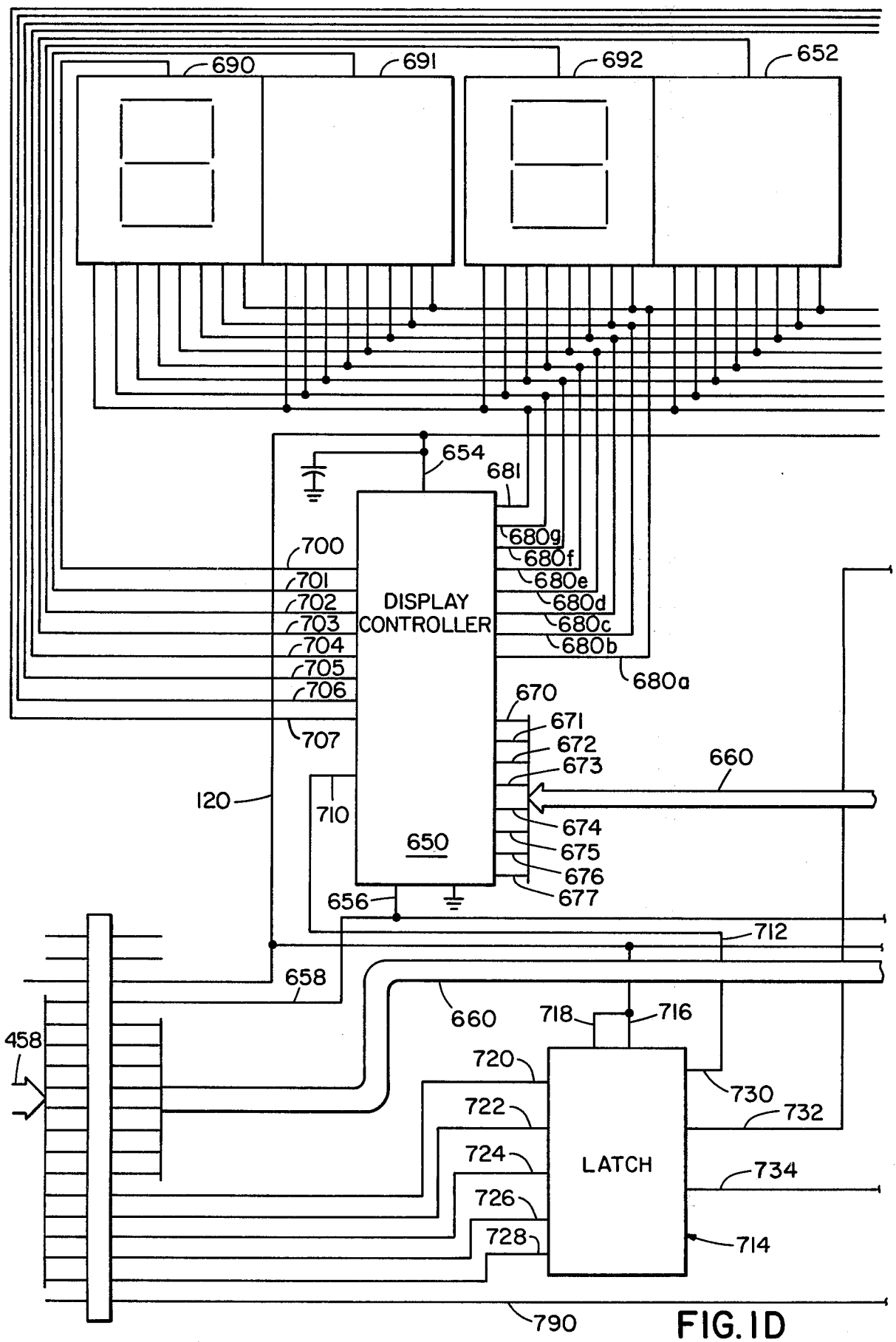
FIG. 1D is a schematic diagram of a portion of a cooking computer showing electrical connections to a left hand 7-segment display and details of a display controlled and associated circuitry.

Referring to FIG. 1D, PIO bus 458 is connected to a display controller 650 for driving a digital display 652. Display controller 650 is, in this embodiment, an Intersil ICM 7218AIJI display controller. Display controller 650 is energized from VDD line 120 at a VCC pin 654. A write pin 656 is connected to a clock lead 658 which is driven from Port A strobe terminal 538 of PIO 500. A local Port A bus 660 which is connected to bus 458 and carries the signals from Port A terminals 530 through 537 is connected to display controller 650 at a plurality of pins which are numbered 670 through 677 and correspond to pins 7, 5, 6, 10, 14, 13, 11 and 12 in the manufacturer's numbering scheme. In addition, display controller 650 has a plurality of output lines 680a, 680b, 680c, 680d, 680e, 680f, 680g and 681 which correspond respectively to pins 426, 24, 2, 25, 1, 3 and 27 in the Intersil numbering scheme.

Pins 680a through g are connected to a plurality of LED seven segment numeric displays 690, 691, 692, 693, 694, 695, 696 and 697 in conventional fashion as is well known to those skilled in the art. The individual displays are sequentially enabled by signals from a plurality of pins 700, 701, 702, 703, 704, 705, 706 and 707 which correspond to pins 15, 16, 23, 20, 17, 22, 21 and 18 in the Intersil numbering scheme. A mode pin 710 is connected to a lead 712 for receipt of signals from a latch 714 to which it is connected. Latch 714 is a 74C175 Quad D Flip-Flop powered from lead 120 by supplies voltage received at pins 716 and 718 which respectively correspond to pins 16 and 8 in the National Semiconductor numbering scheme. Latch 714 also has a plurality of input pins specifically numbered 720, 722, 724 and 726 which are respectively connected to pin 547, 546, 545 and 543 of PIO 500 through local bus 458. A pin 728 is connected to Port B ready pin 549. Pins 720, 722, 724, 726 and 728 correspond to pins 4, 5, 13, 12 and 9 in the National Semiconductor numbering scheme. Lead 712 is connected to a pin 730 of latch 714. Latch 714 also has output pins 732 and 734. Pins 730, 732 and 734 correspond to pins 15, 2 and 11 in the National Semiconductor numbering scheme.

Figure 1E:
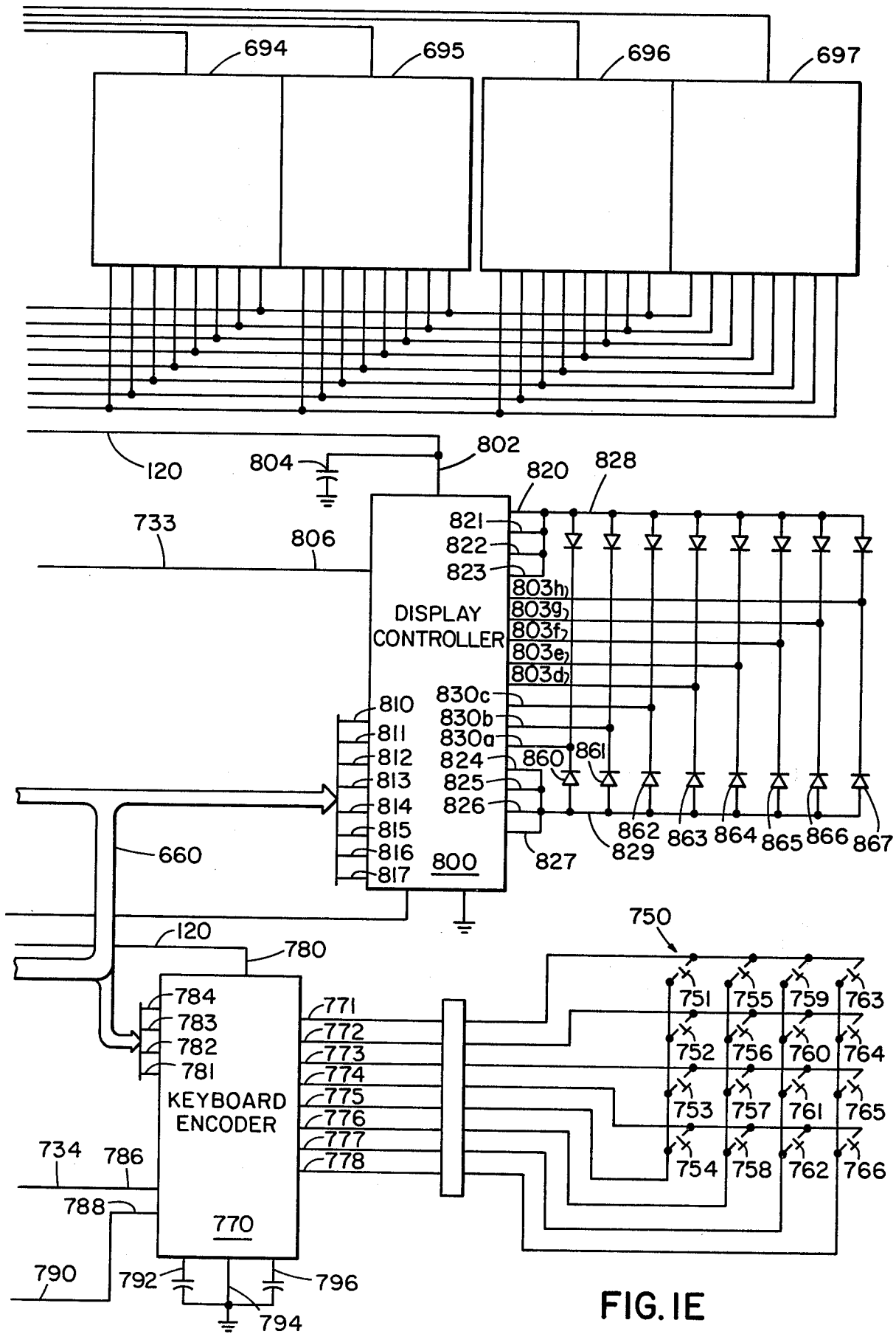
FIG. 1E is a portion of a schematic diagram of a cooking computer showing electrical connection details to a right hand 7-segment display, a light emitting diode display control and a keyboard and keyboard encoder.
Figure 2A:
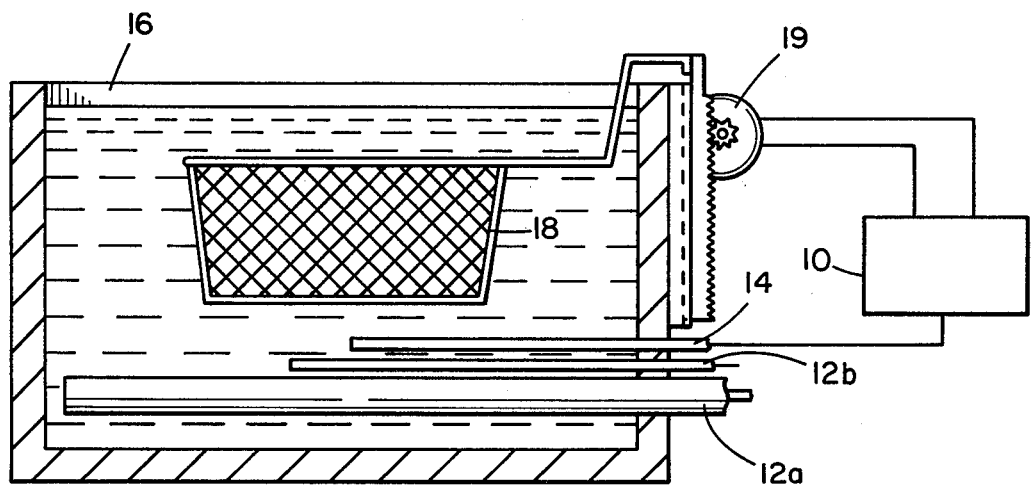
FIG. 2A is a sectional view of a deep fat fryer having a frying basket, the position of which is controlled by the cooking computer.
Figure 2B:
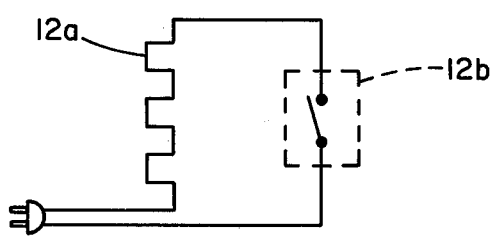
FIG. 2B is a schematic diagram of the fryer heater shown in FIG. 2A and heater controlled thermostat.
Figure 3:
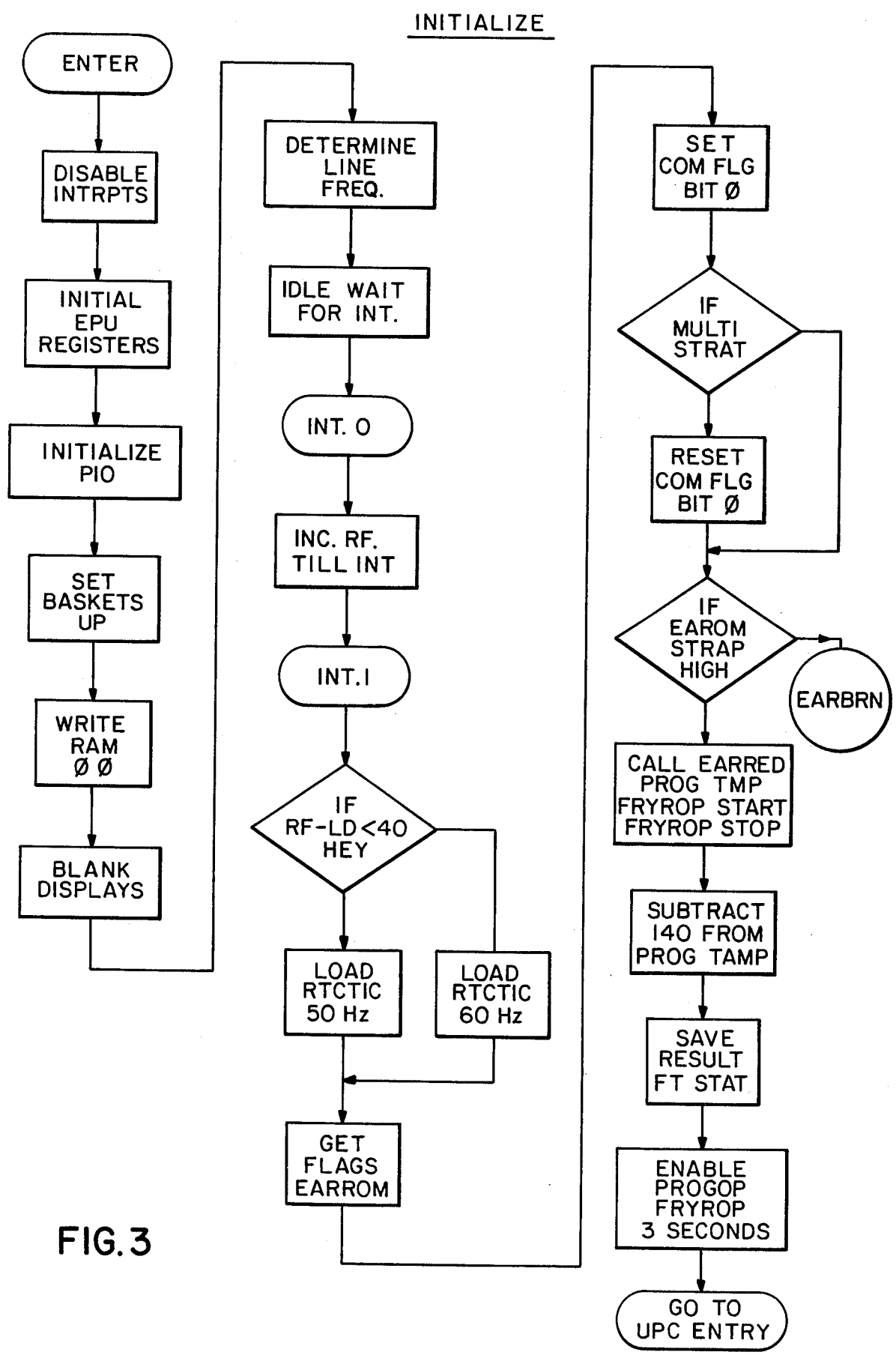
FIG. 3 is a flow diagram of the initialization routine stored in the cooking computer ROM.
Figure 4:
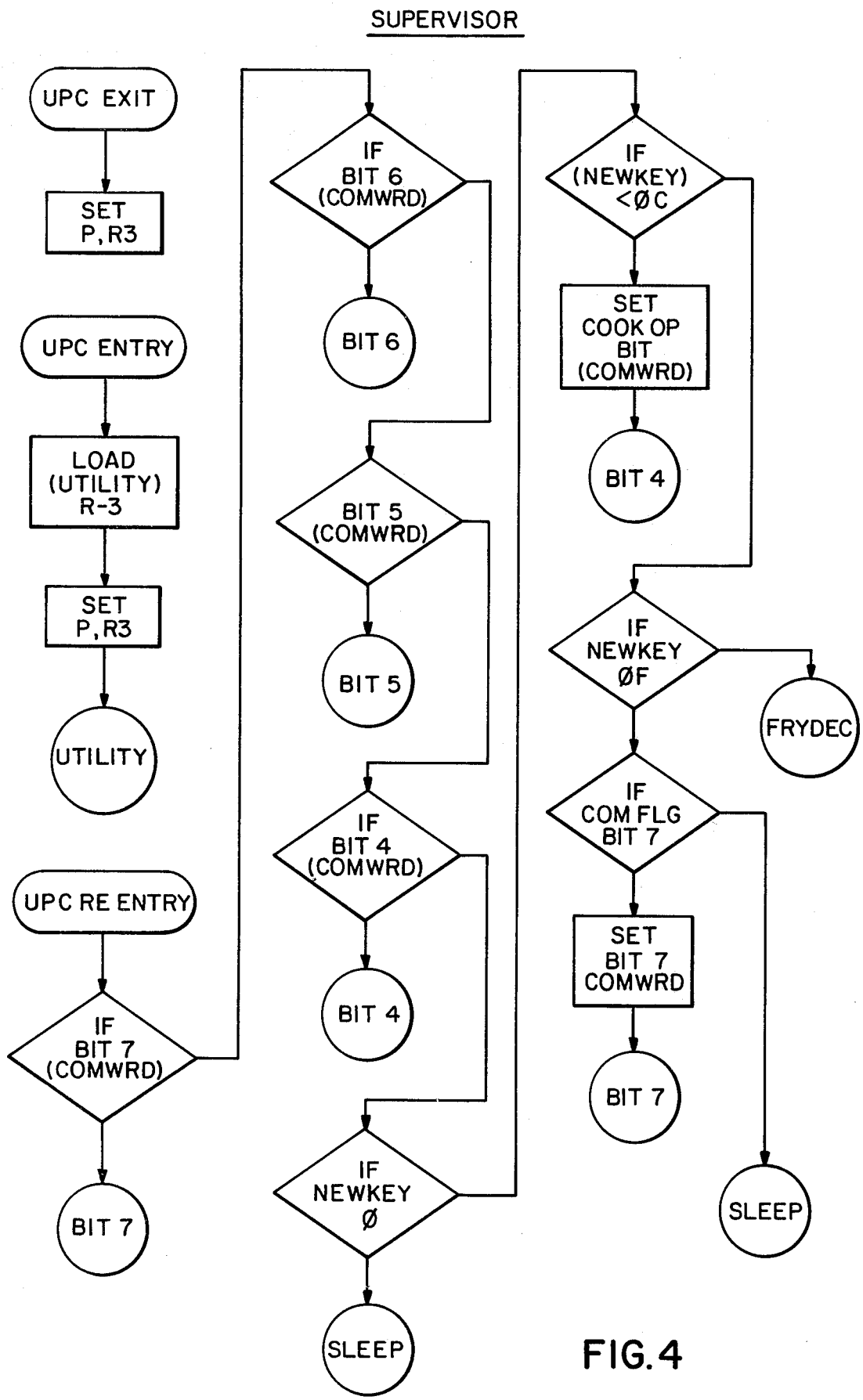
FIGS. 4 and 4A are flow diagrams of the supervisory section of the program stored in ROM.
Figure 4A:
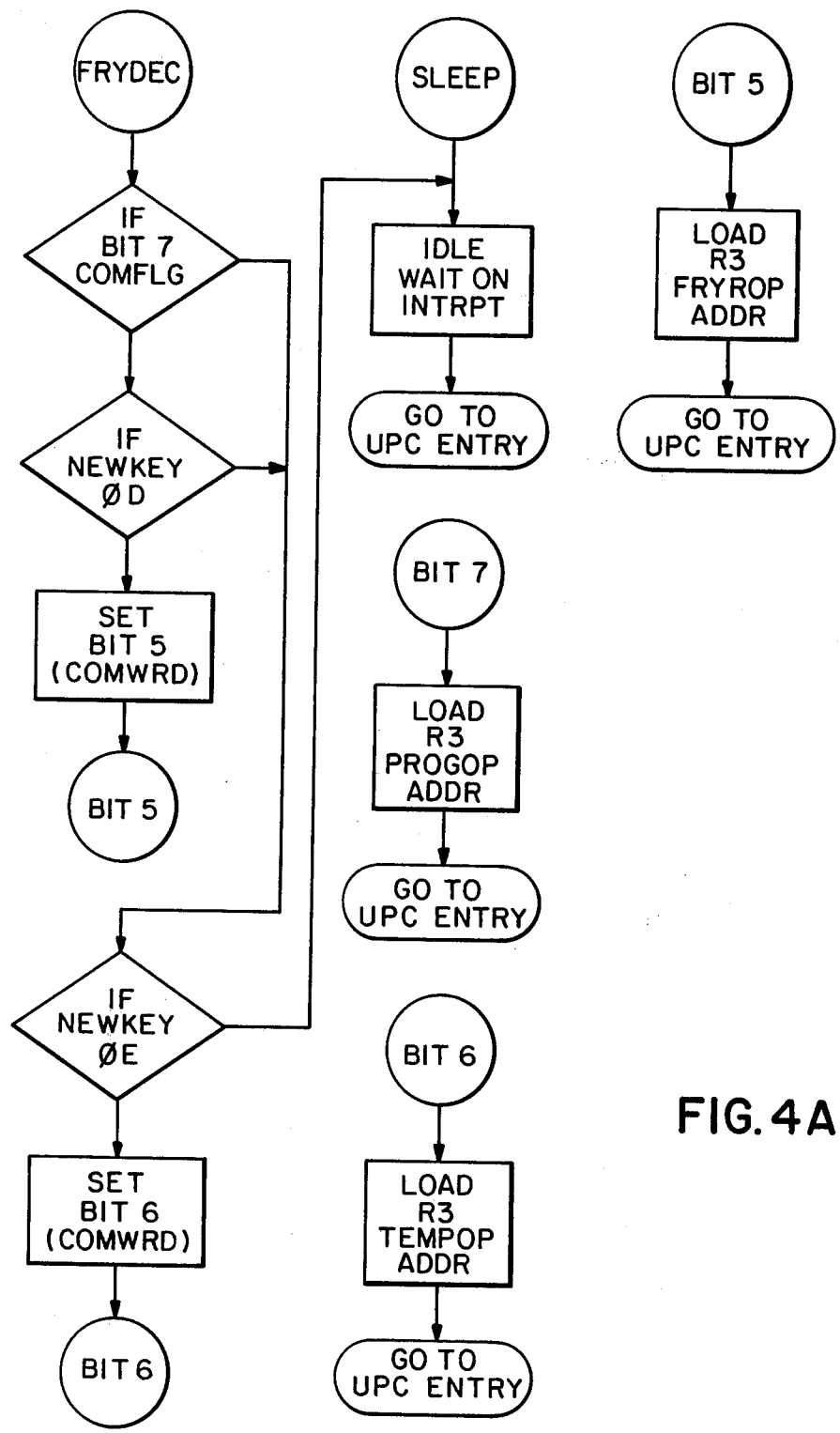
Figure 5A:
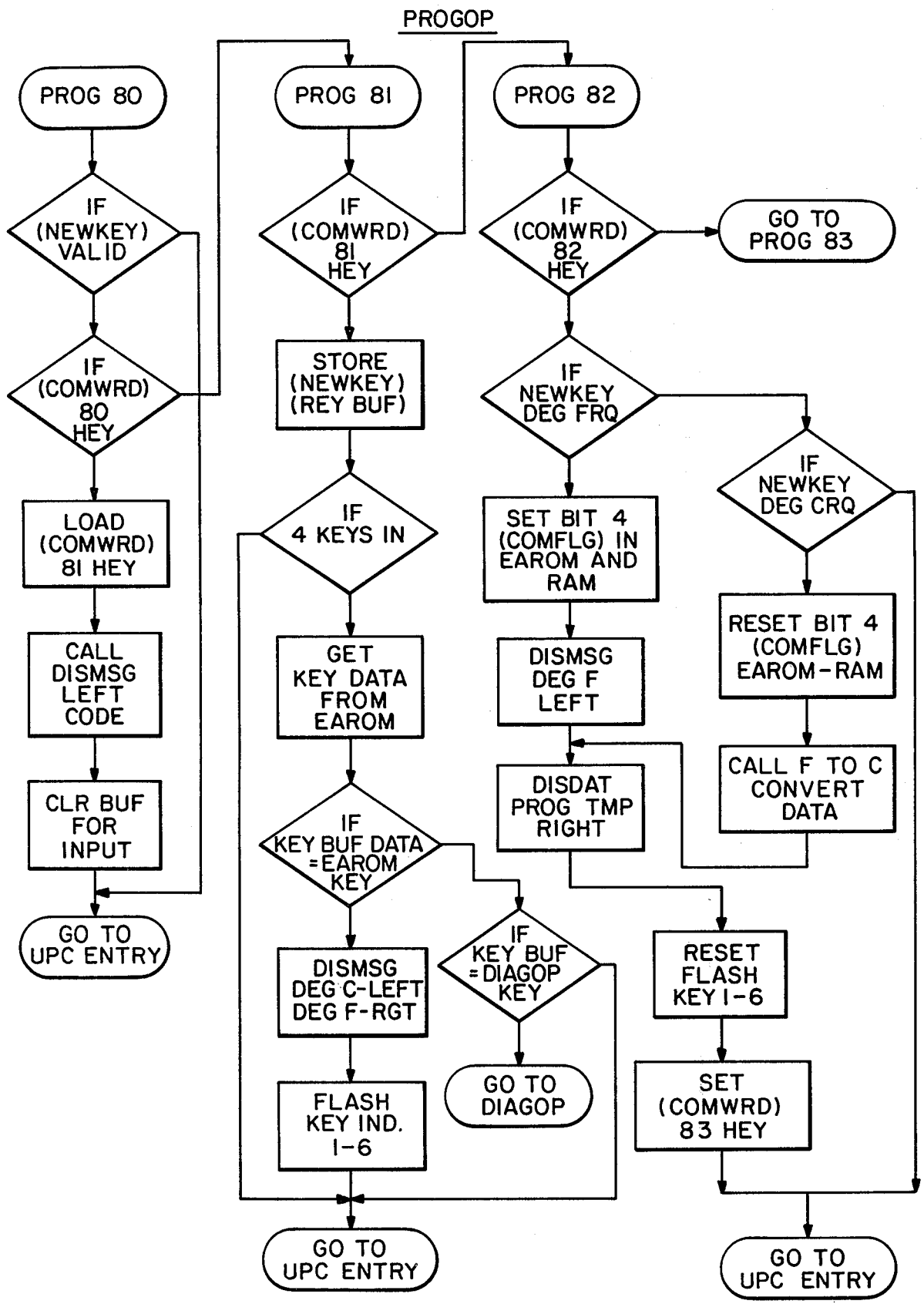
FIGS. 5A–D are flow charts of the PROGOP or reprogramming routines stored in ROM.
Figure 5B:
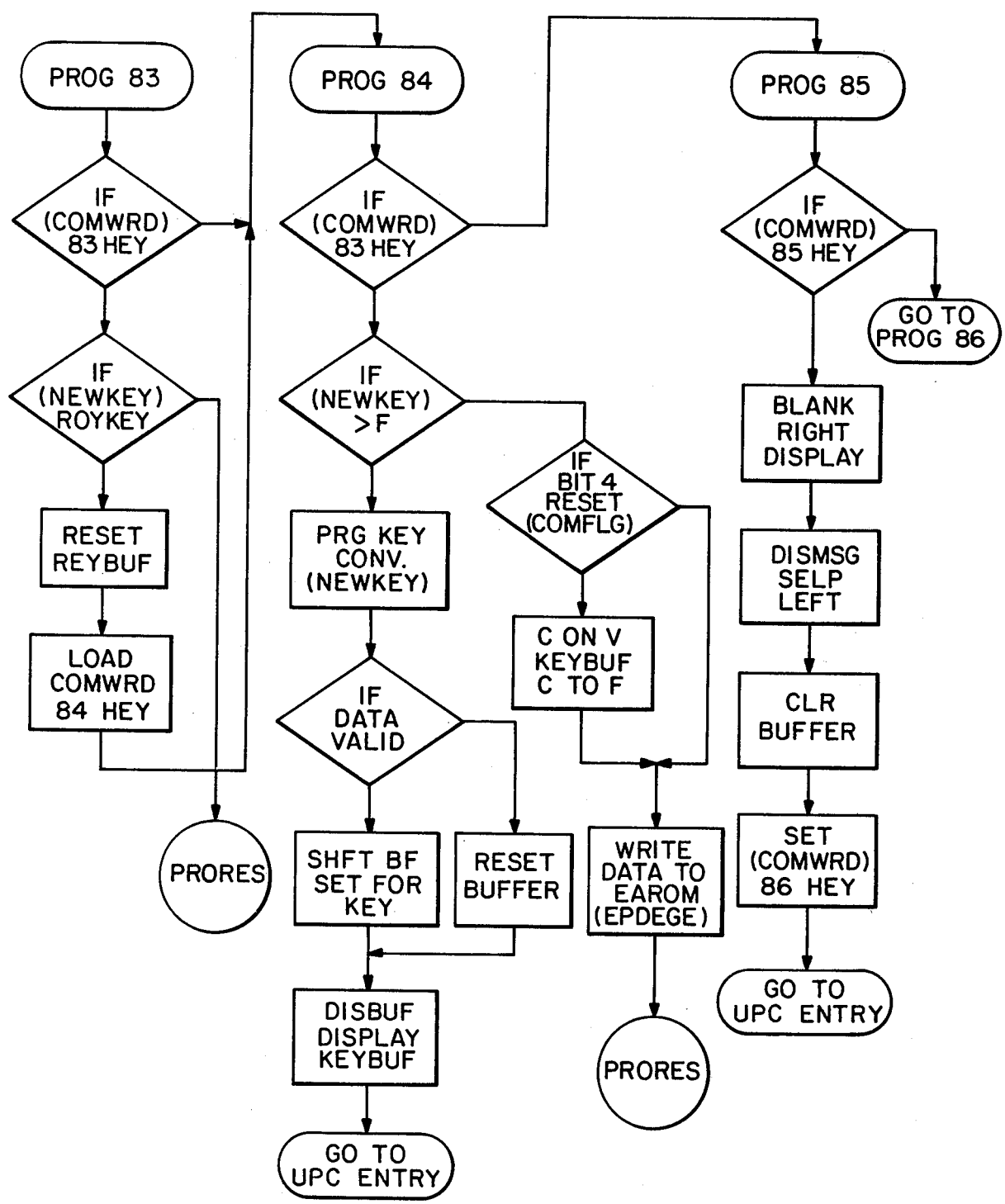
Figure 5C:
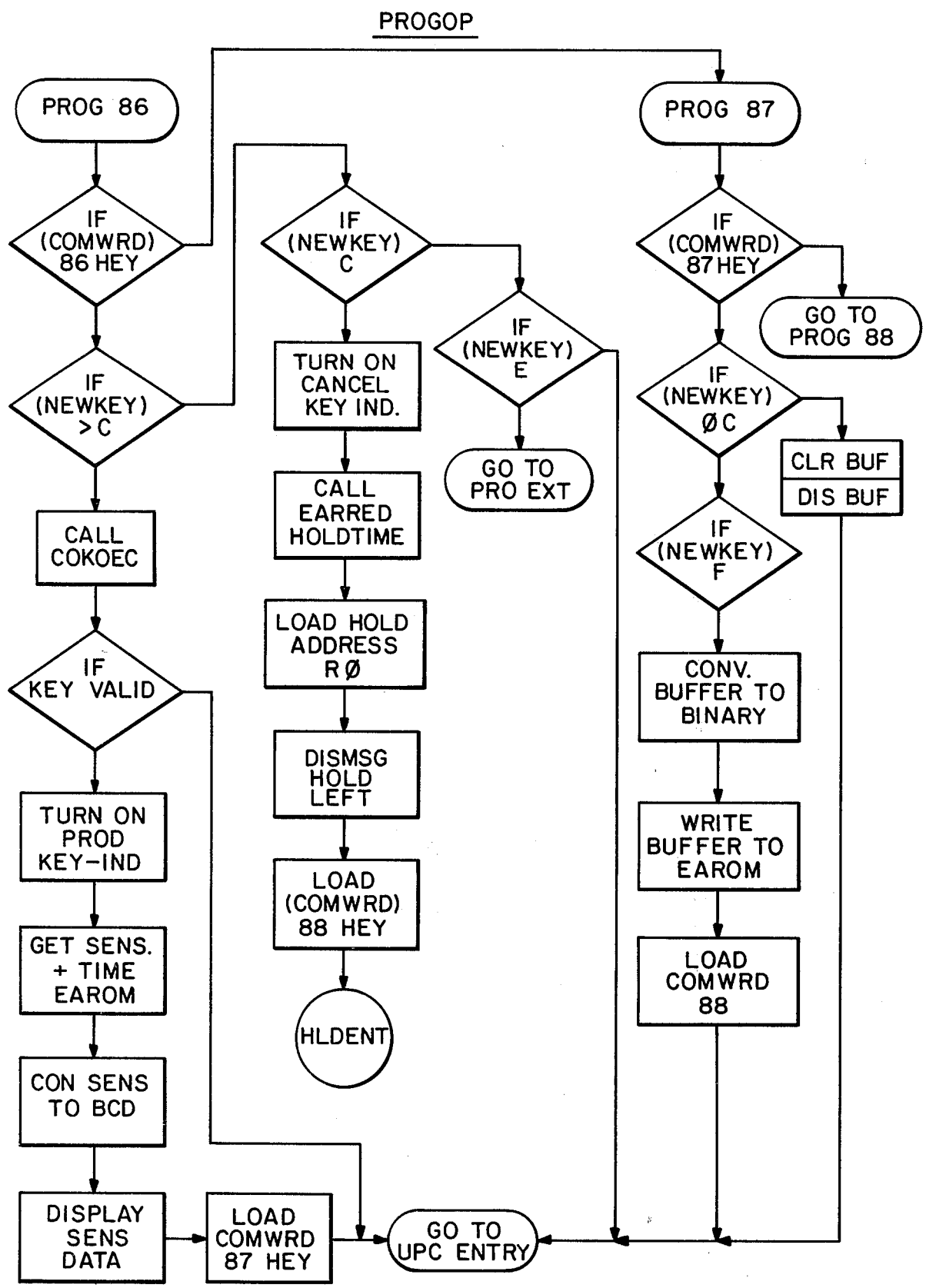
Figure 5D:
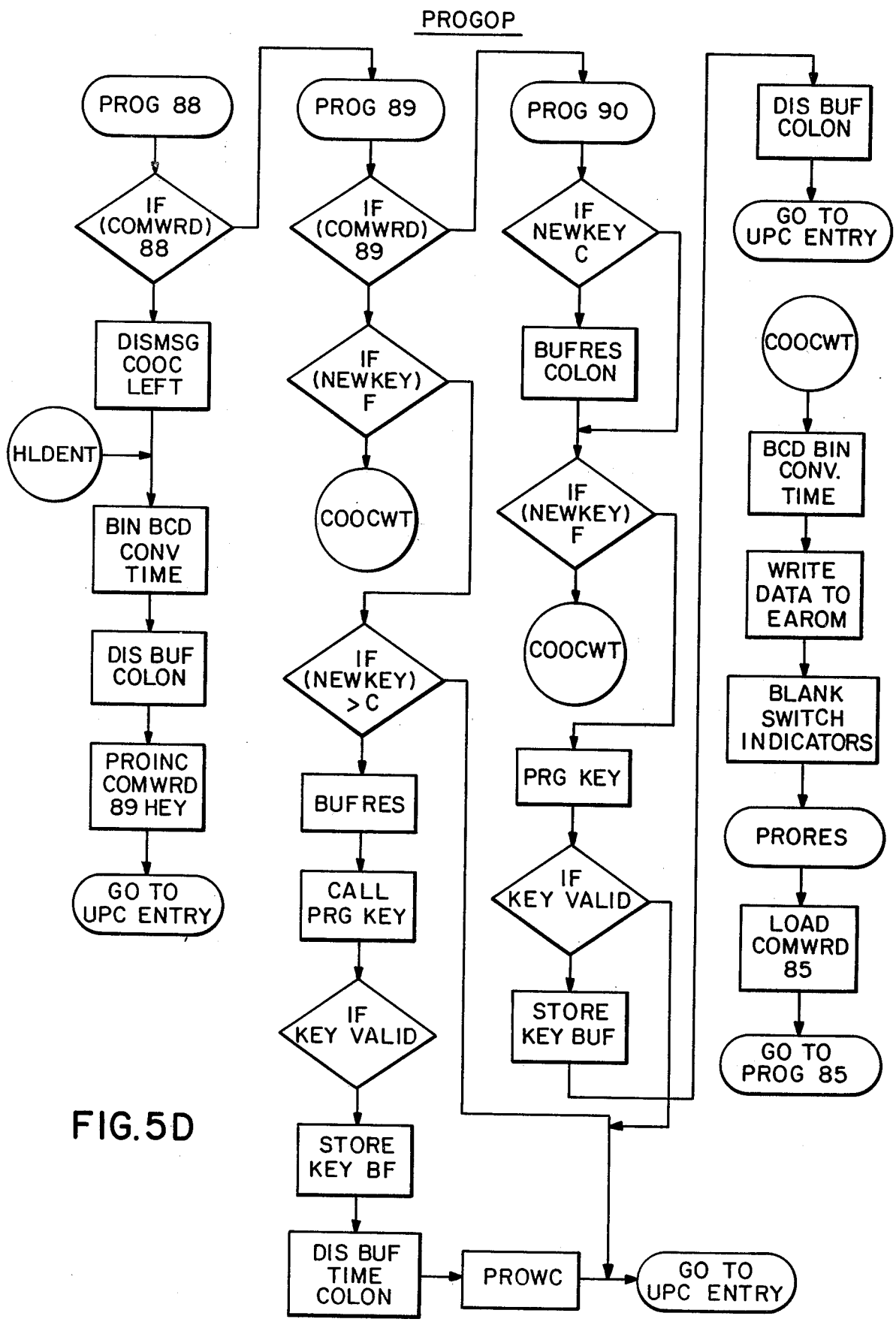
Figure 6:
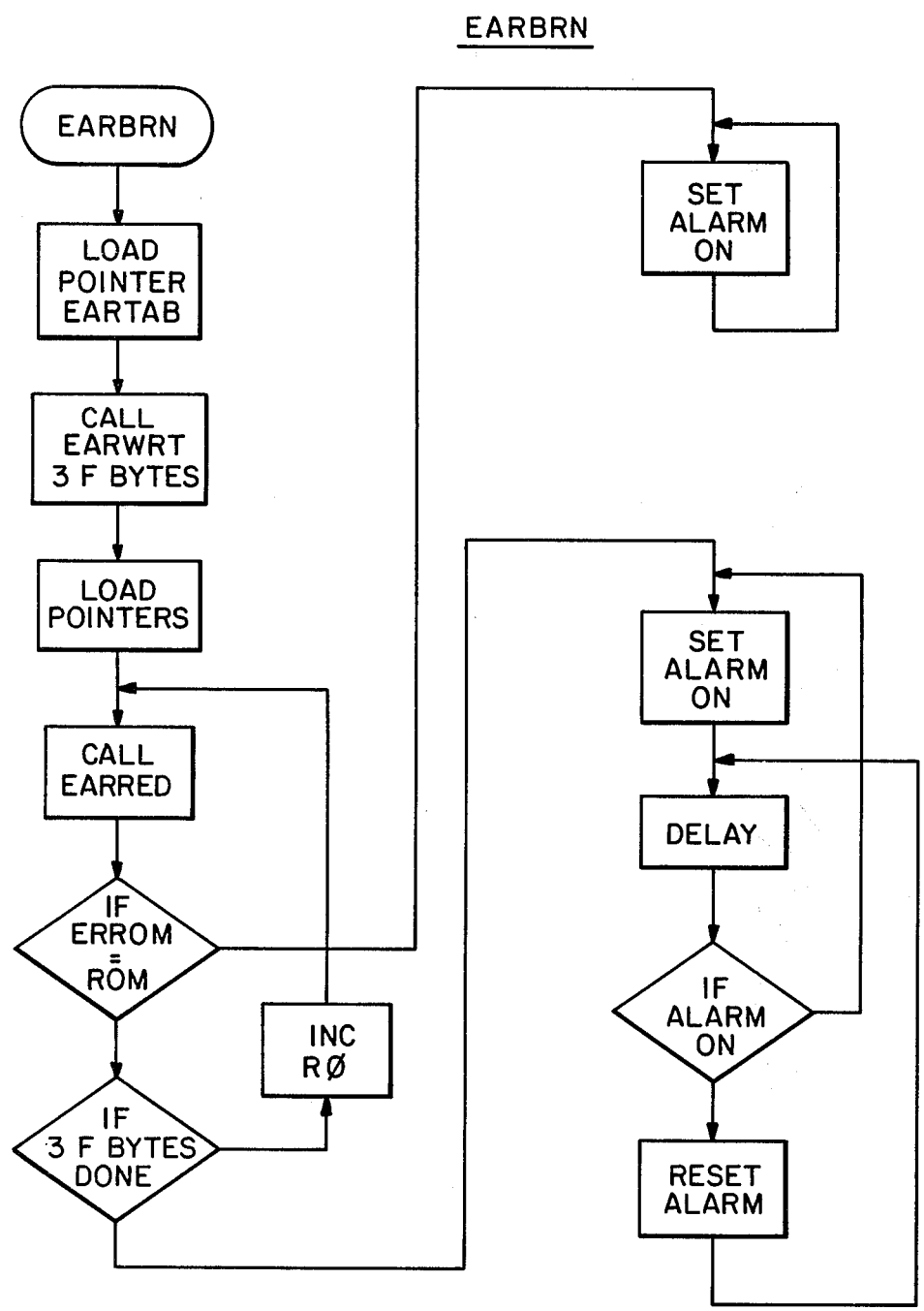
FIG. 6 is a flow diagram of the EAROM factory burn only routine stored in ROM.
Figure 7:
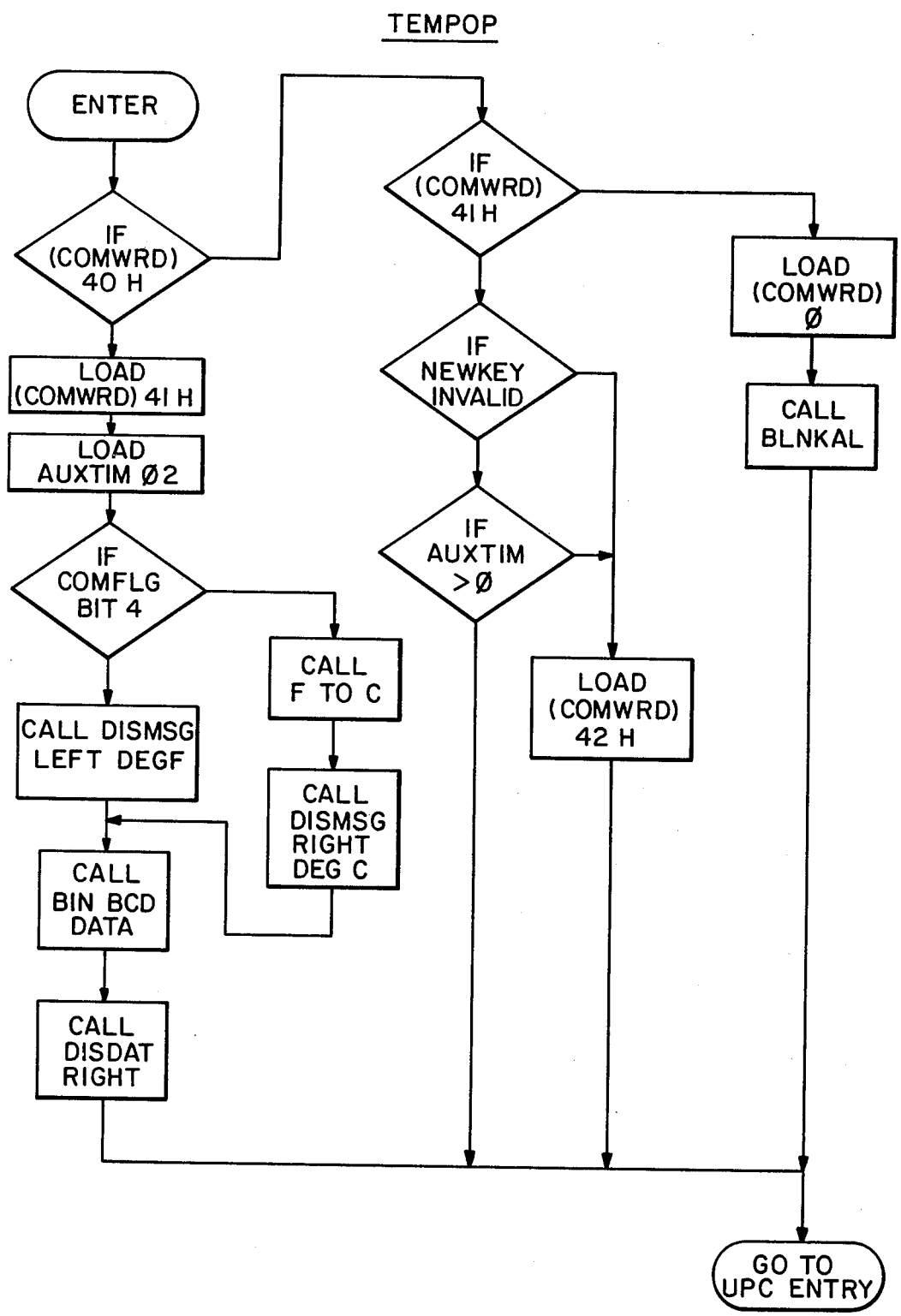
FIG. 7 is a flow diagram of the temperature computation routine stored in ROM.
Figure 8A:
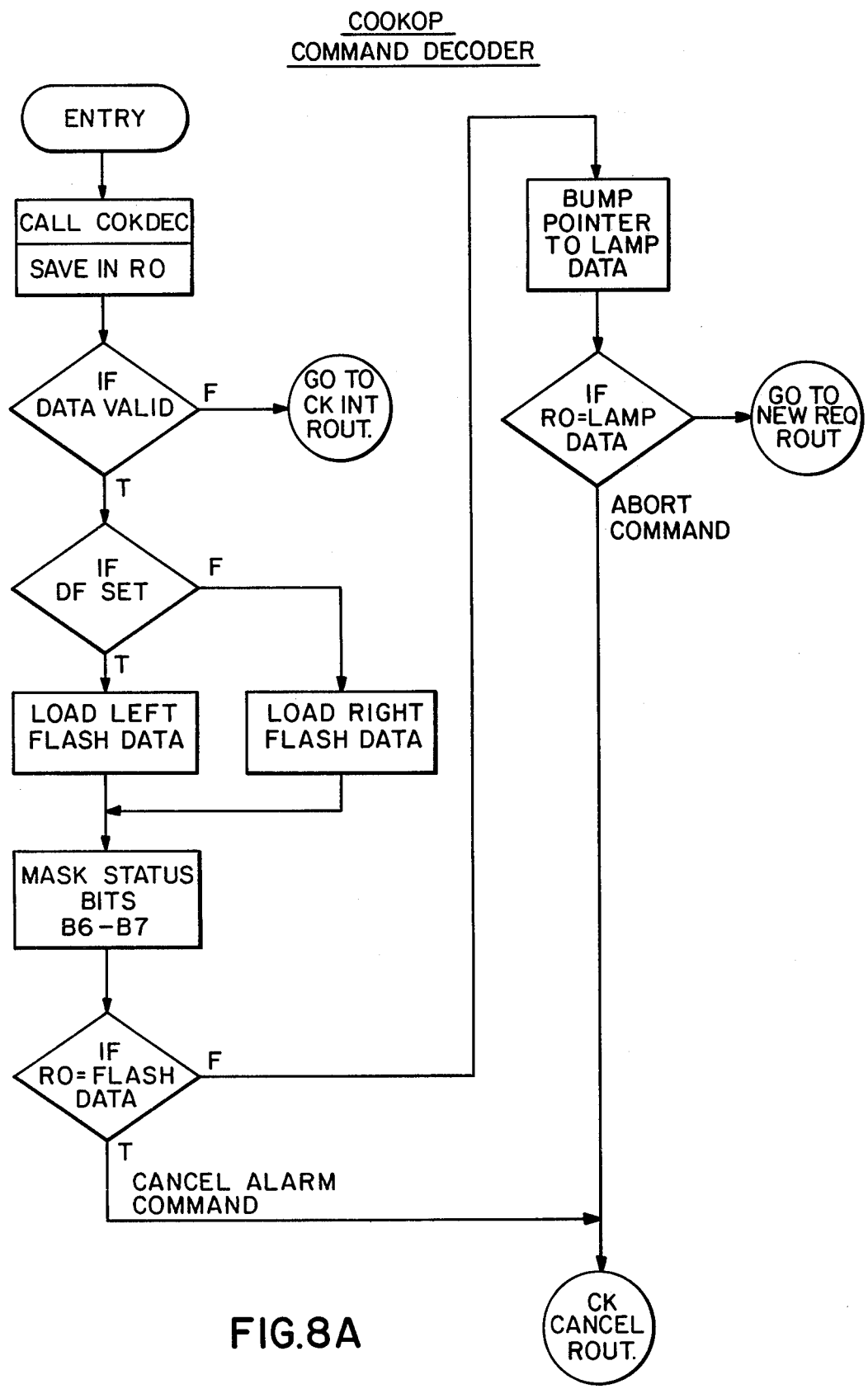
FIGS. 8A–F are flow diagrams of the cooking cycle control routines stored in ROM.
Figure 8B:
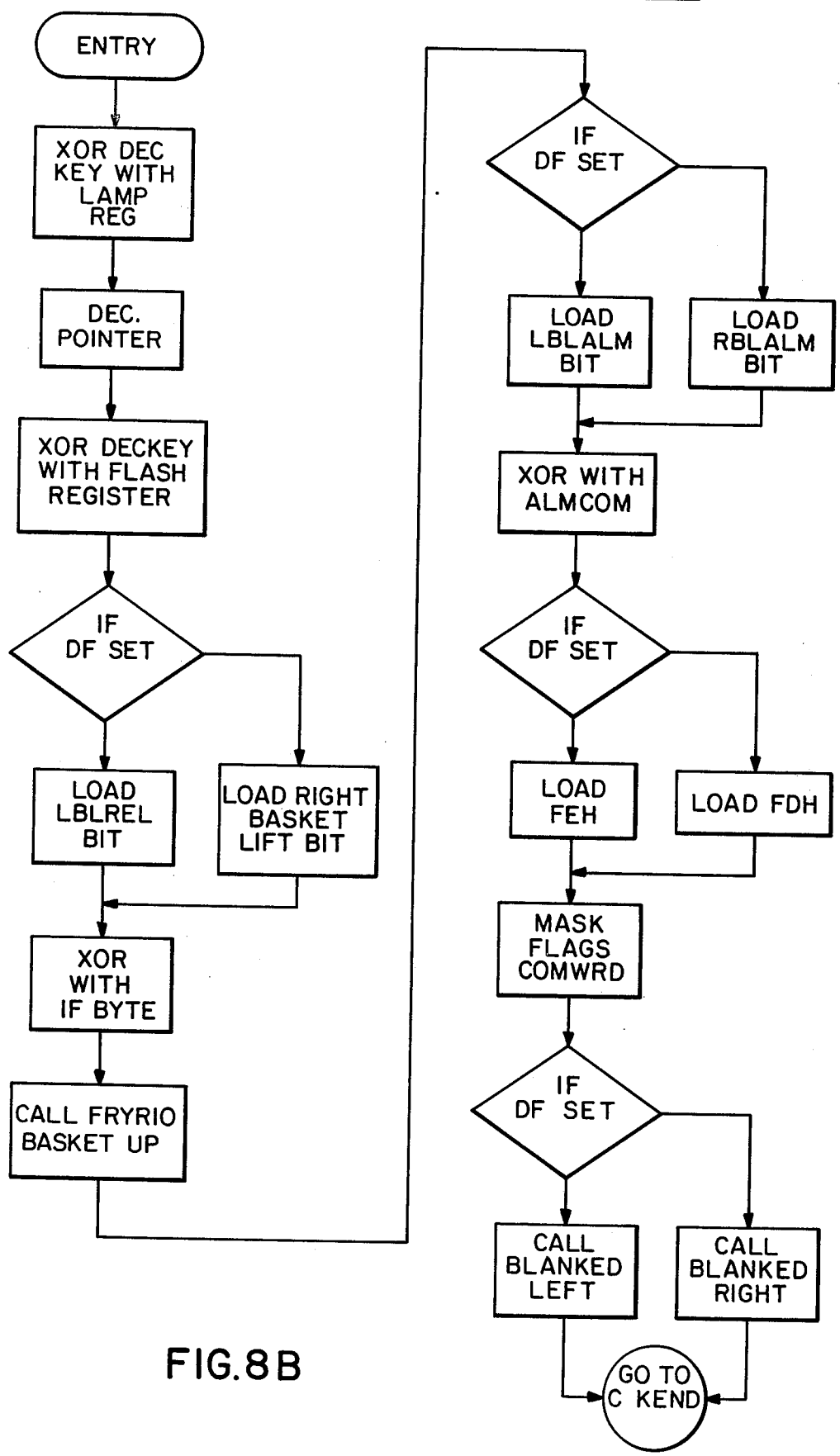
Figure 8C:
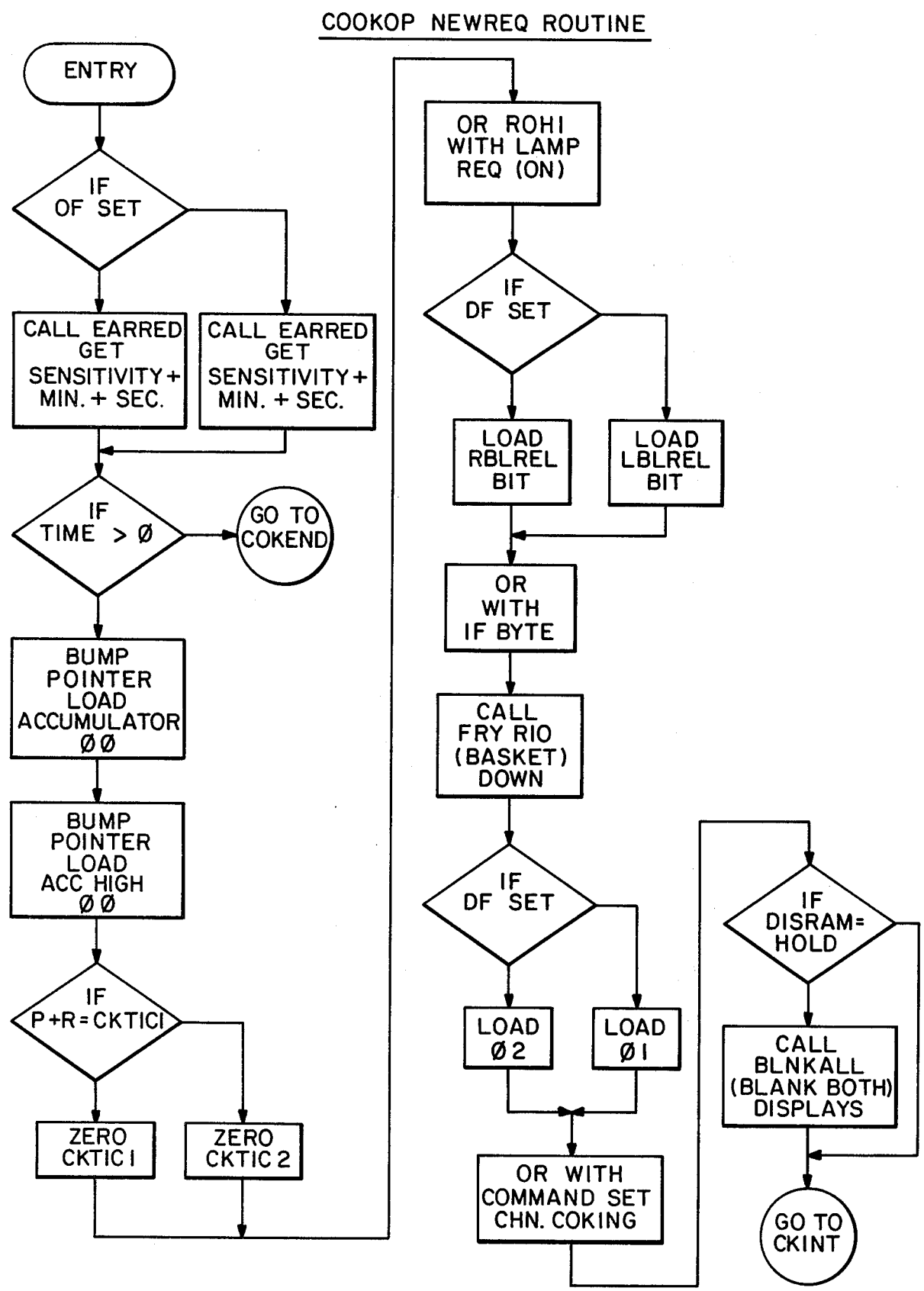
Figure 8D:
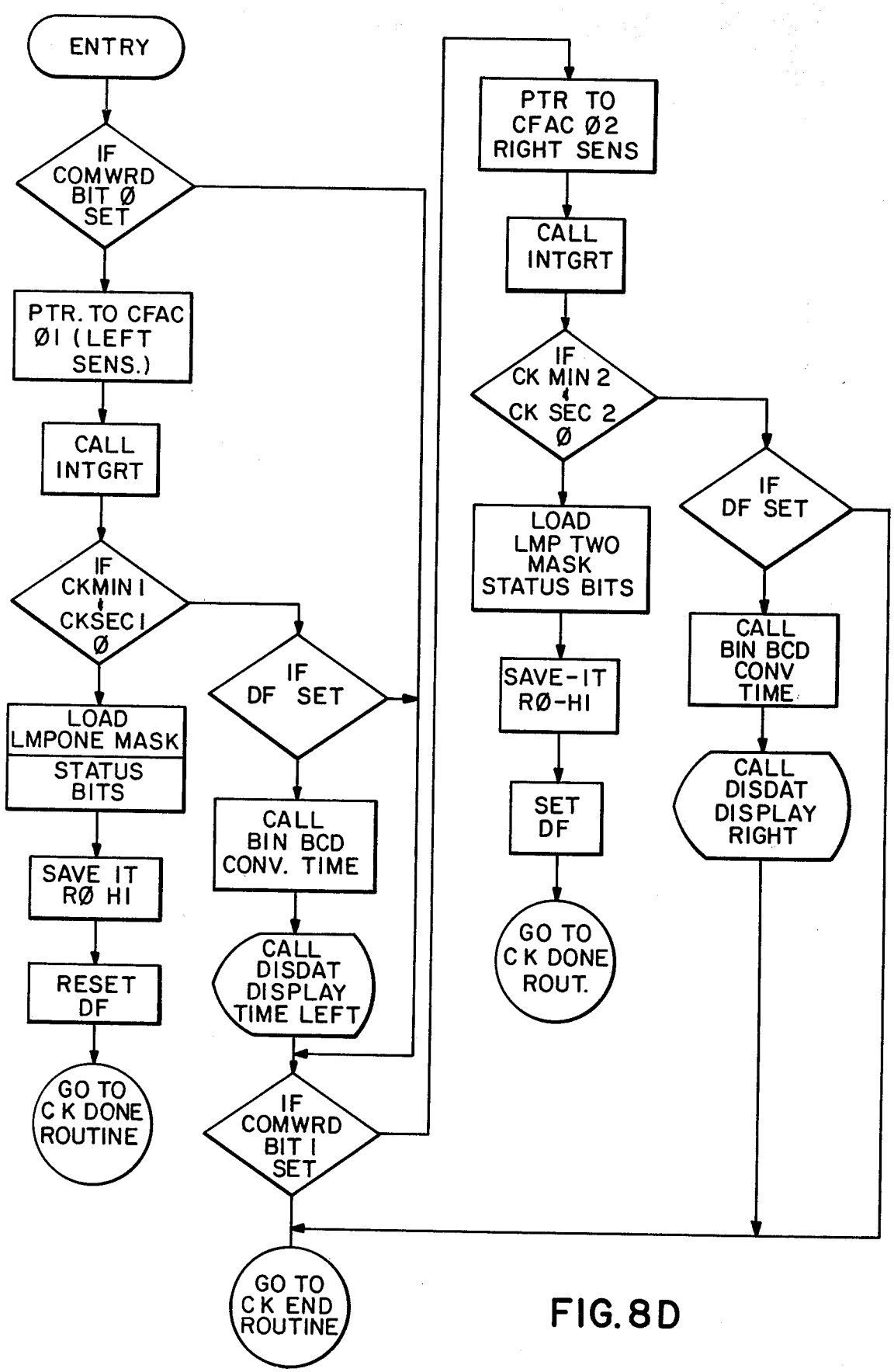
Figure 8E:
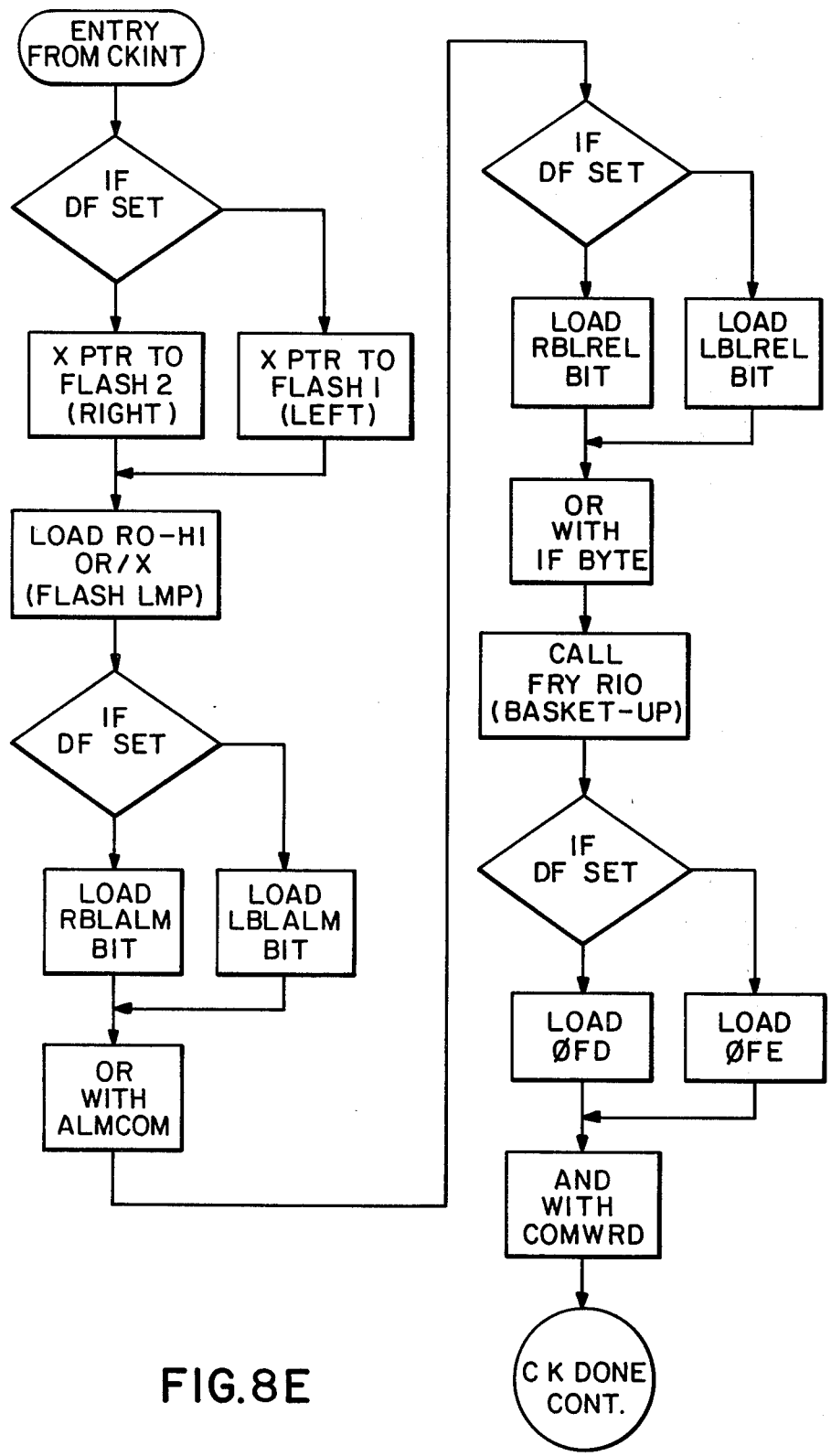
Figure 8F:
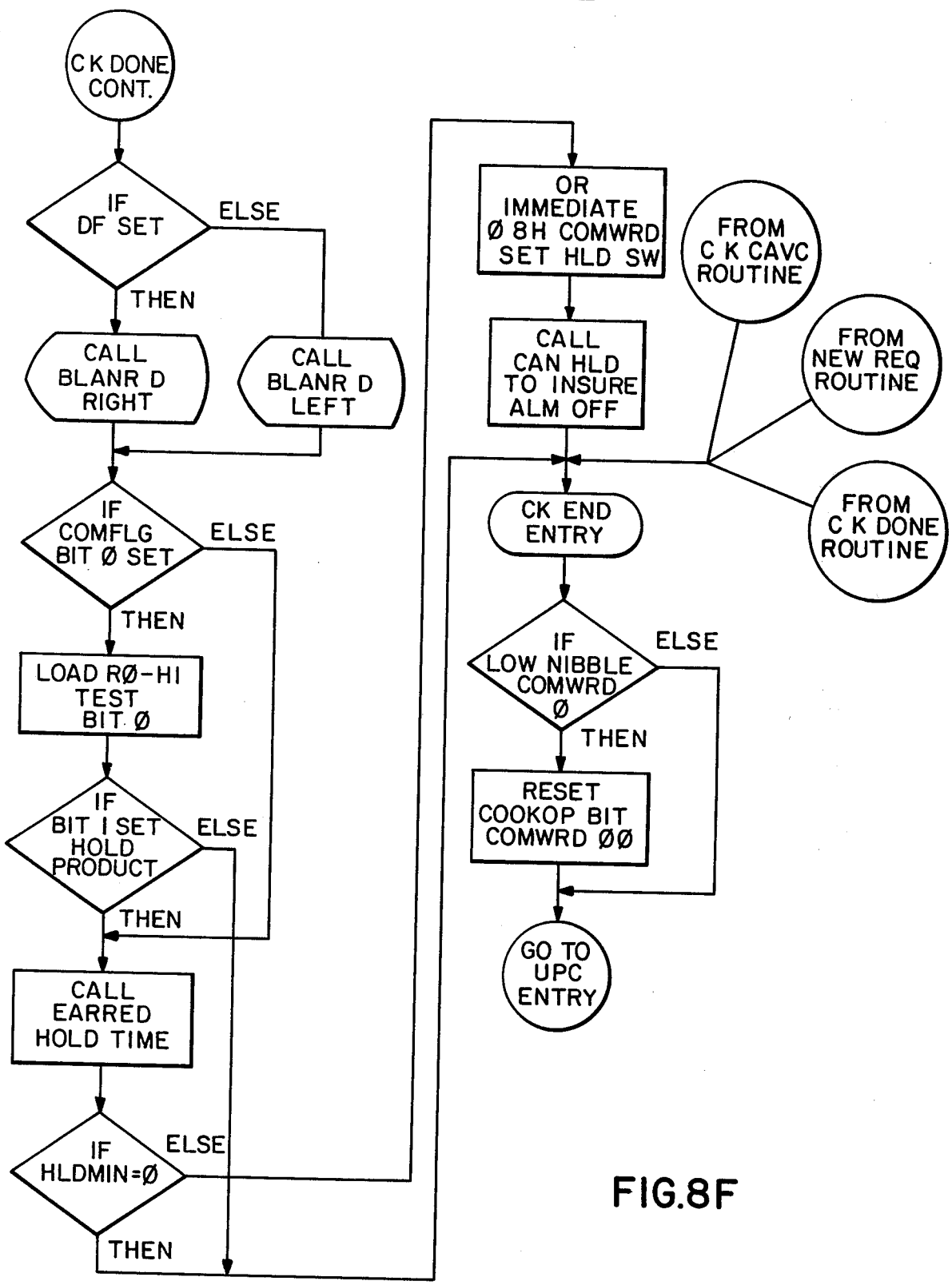
Figure 9A:
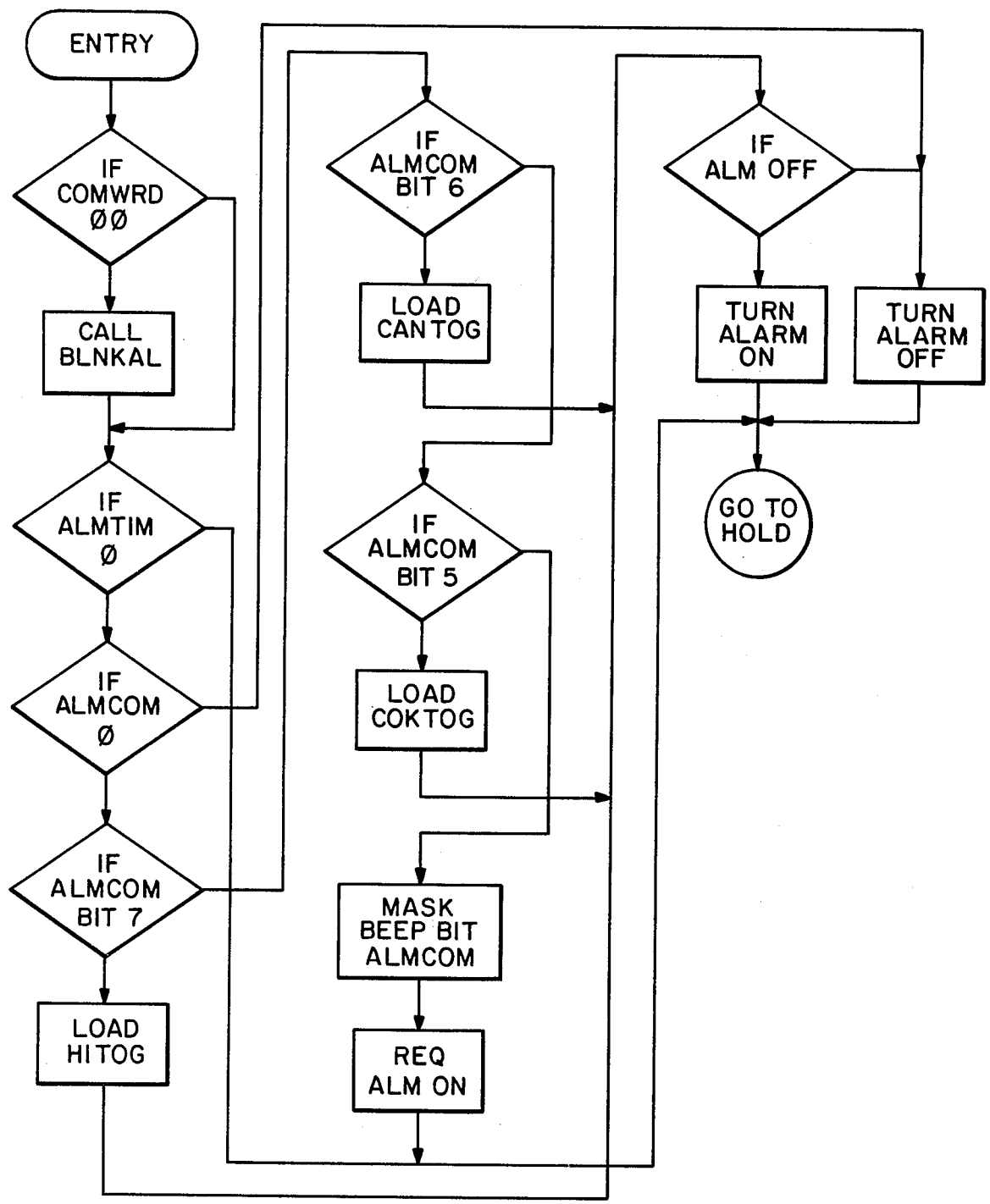
FIGS. 9A–D are flow diagrams of alarm, hold, analog-to-digital converter, and LED flashing utility routines stored in ROM.
Figure 9B:
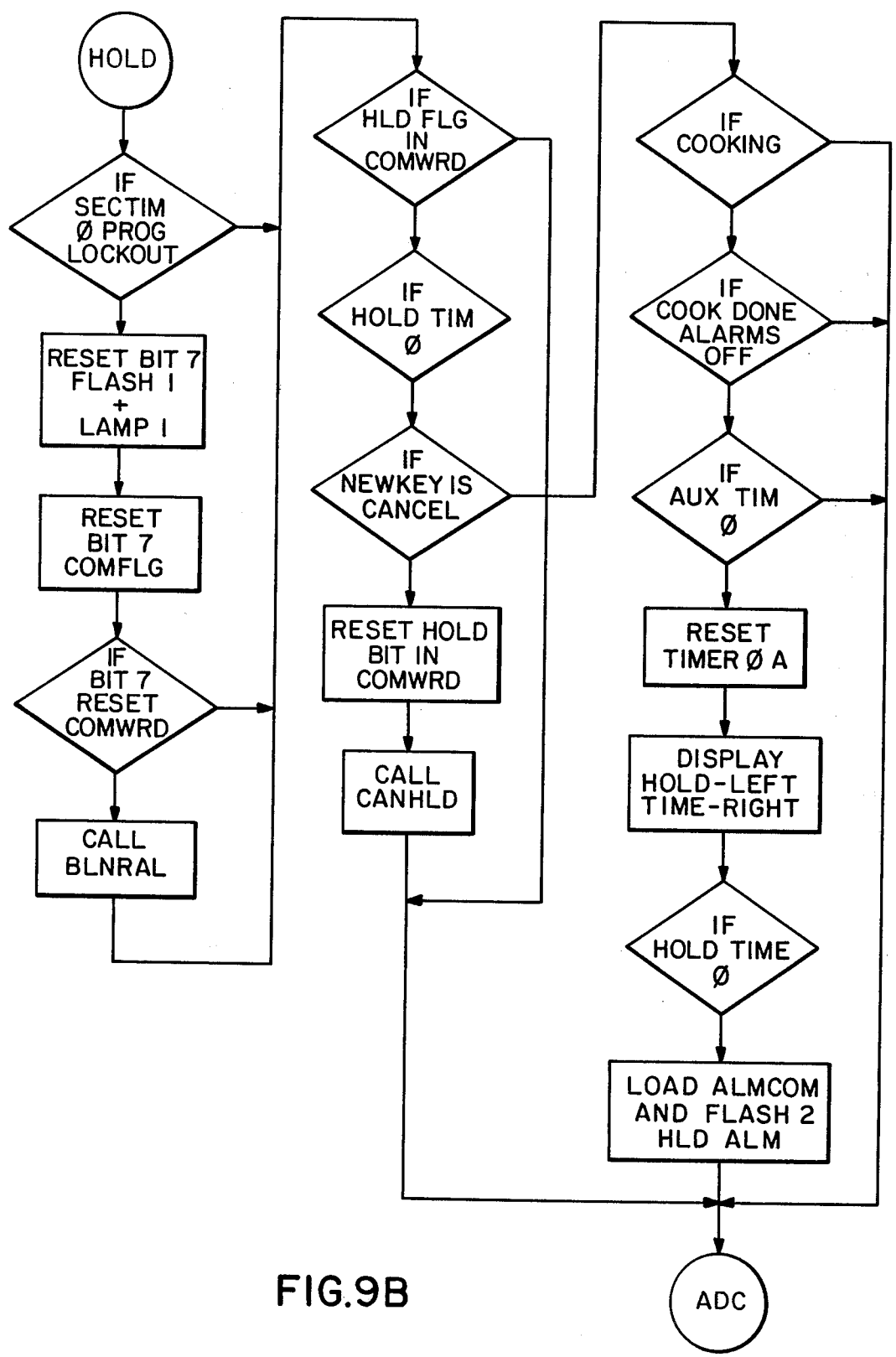
Figure 9C:
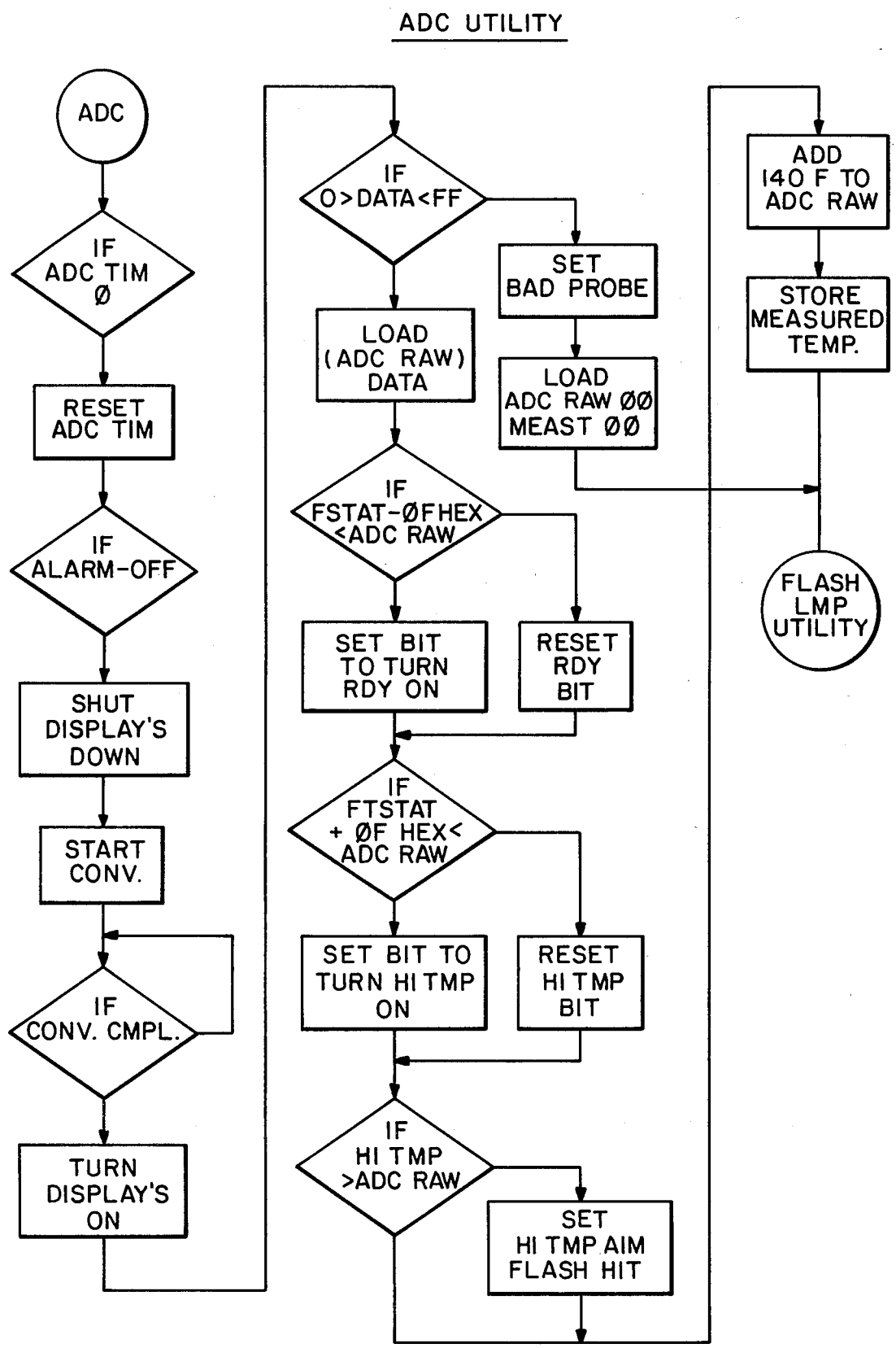
Figure 9D:
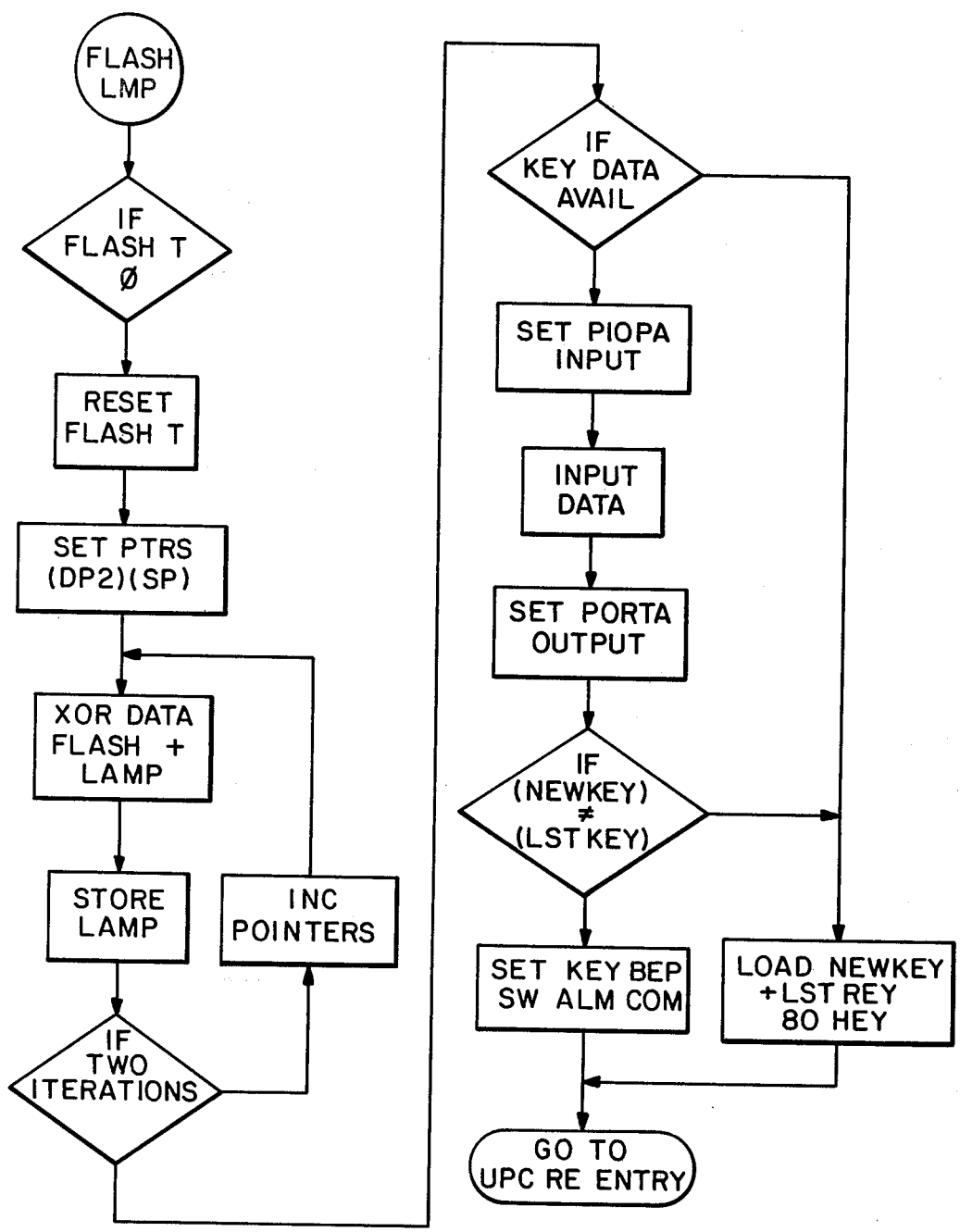
Figure 10:
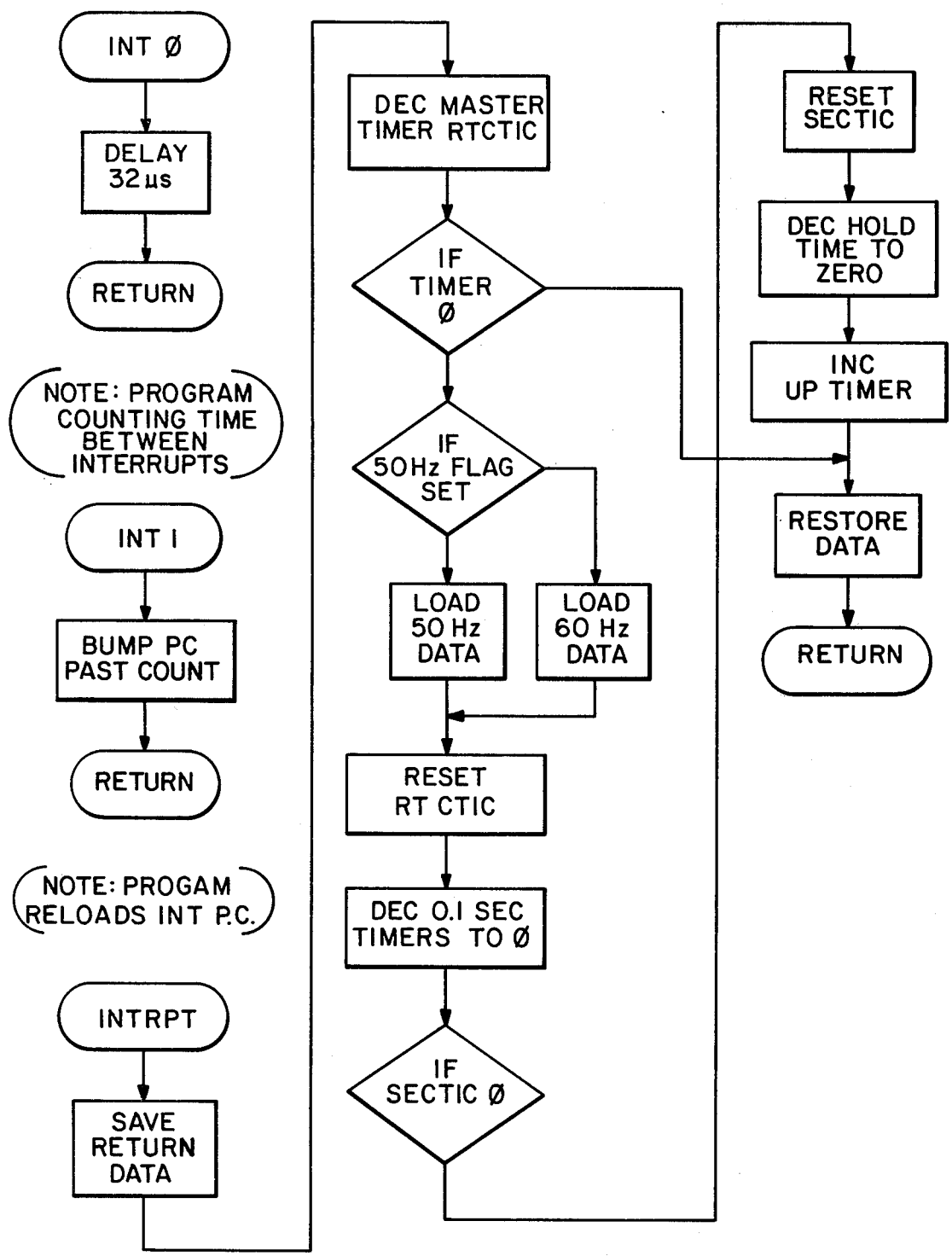
FIG. 10 is a flow diagram of the interrupt routine stored in ROM.
Figure 11:
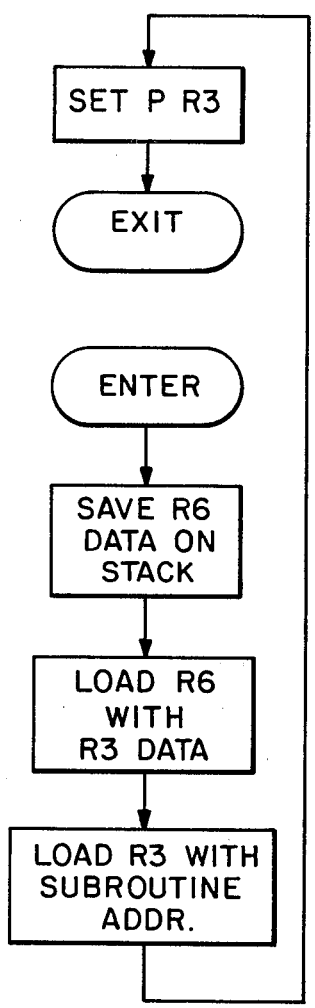
FIG. 11 is a flow diagram of the call subroutine stored in ROM.
Figure 12:
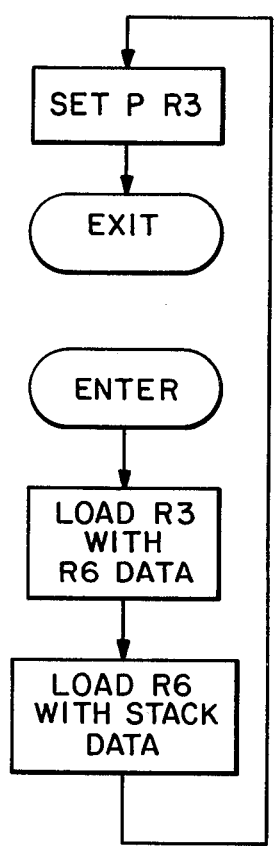
FIG. 12 is a flow diagram of the return subroutine stored in ROM.
Figure 13:
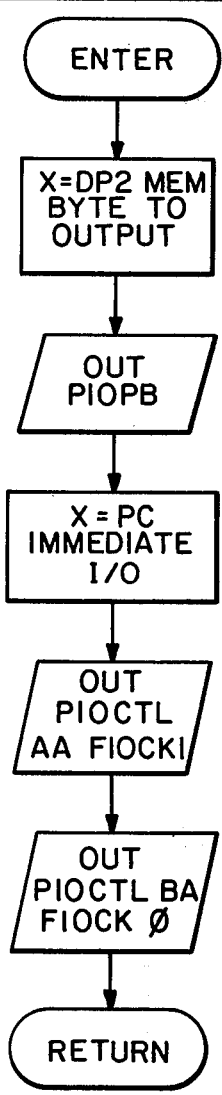
FIG. 13 is a flow diagram of an input/output actuated for control of the fryer basket lifts stored in ROM.
Figure 14:
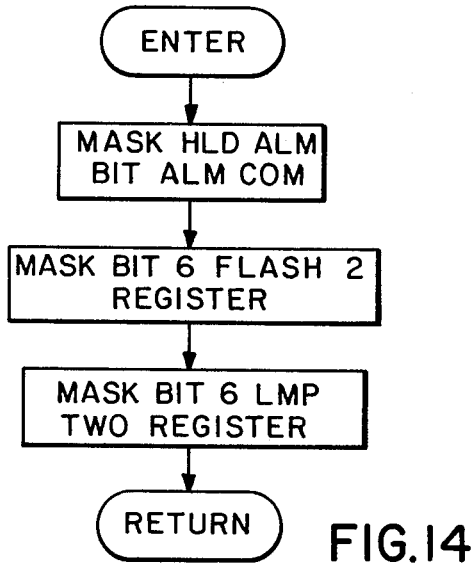
FIG. 14 is a flow diagram of the hold time comparison subroutine stored in ROM.
Figure 15:
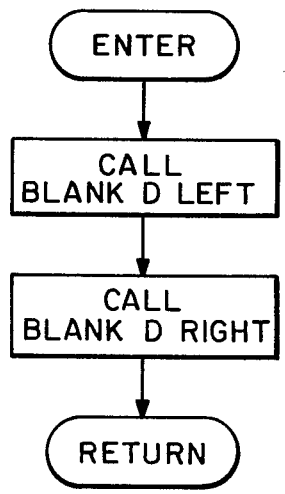
FIG. 15 is a flow diagram of a display blinking subroutine stored in ROM.
Figure 16:
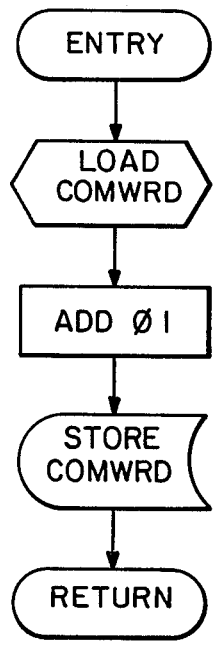
FIG. 16 is a flow diagram of a command word incrementing routine stored in ROM.
Figure 17:
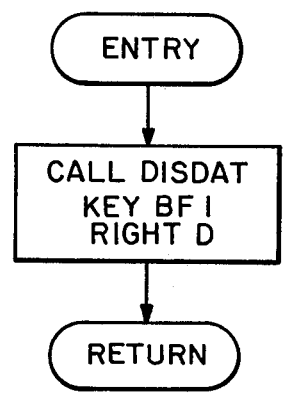
FIG. 17 is a flow diagram of a display buffer subroutine stored in ROM.
Figure 18:
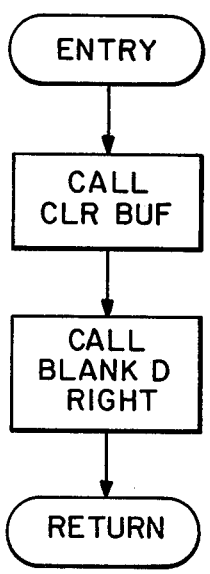
FIG. 18 is a flow diagram of a buffer restored subroutine stored in ROM.
Figure 19:
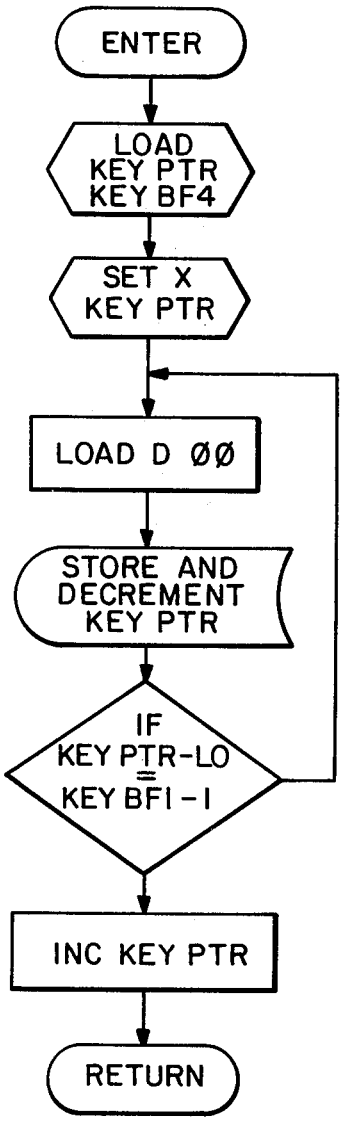
FIG. 19 is a flow diagram of a clear buffer subroutine stored in ROM.
Figure 20:
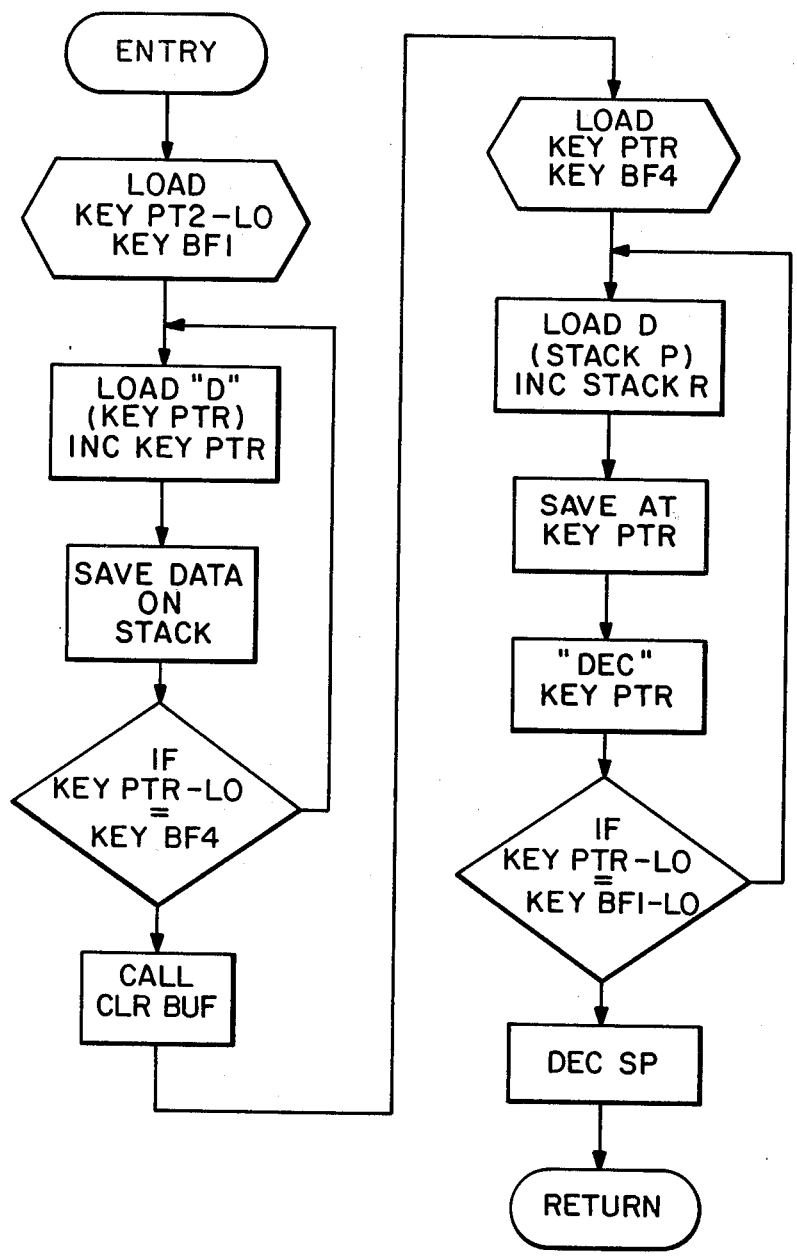
FIG. 20 is a flow diagram of a buffer restore subroutine stored in ROM.
Figure 21:
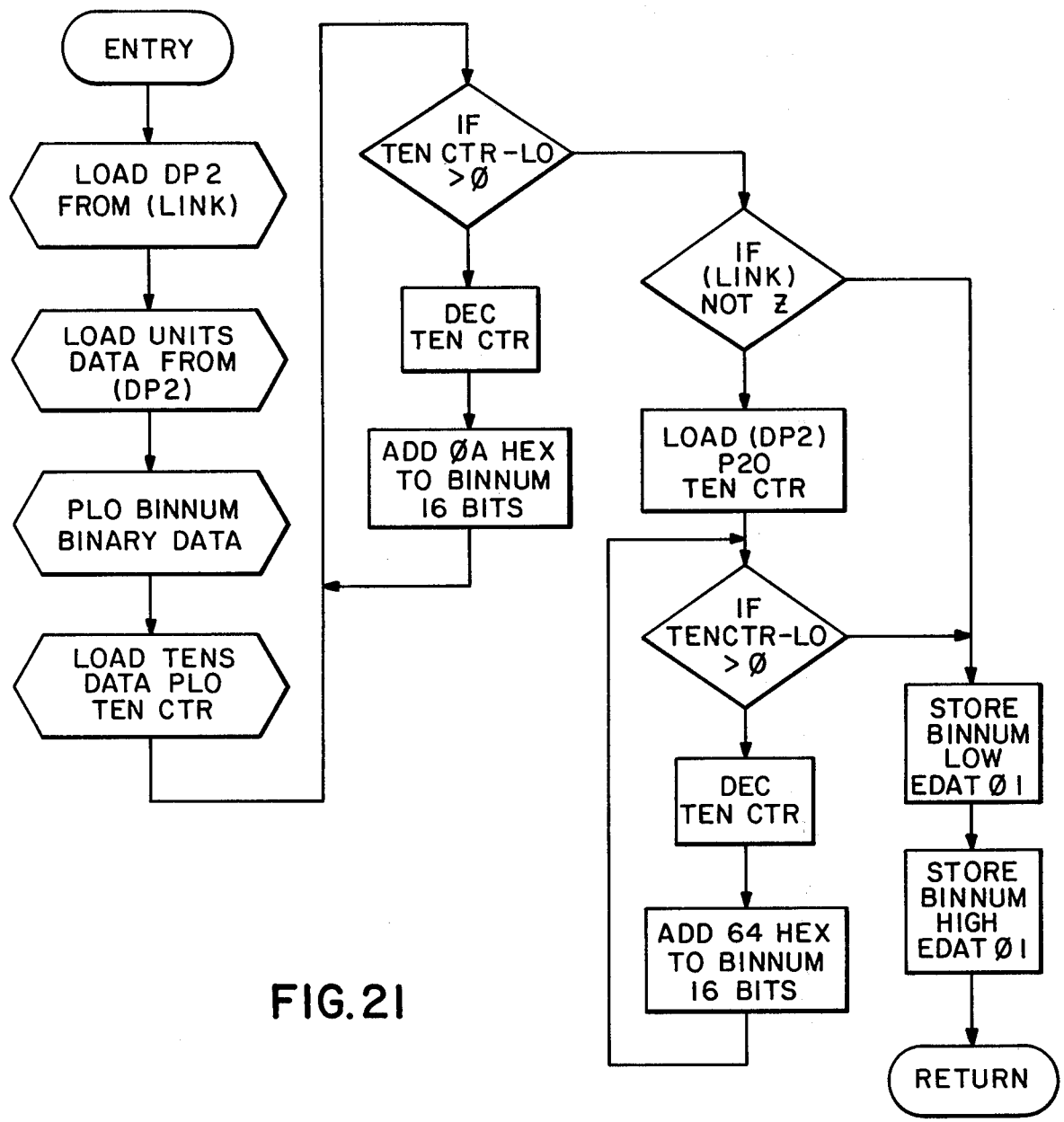
FIG. 21 is a flow diagram of a BCD to binary numerical conversion routine stored in ROM.
Figure 22:
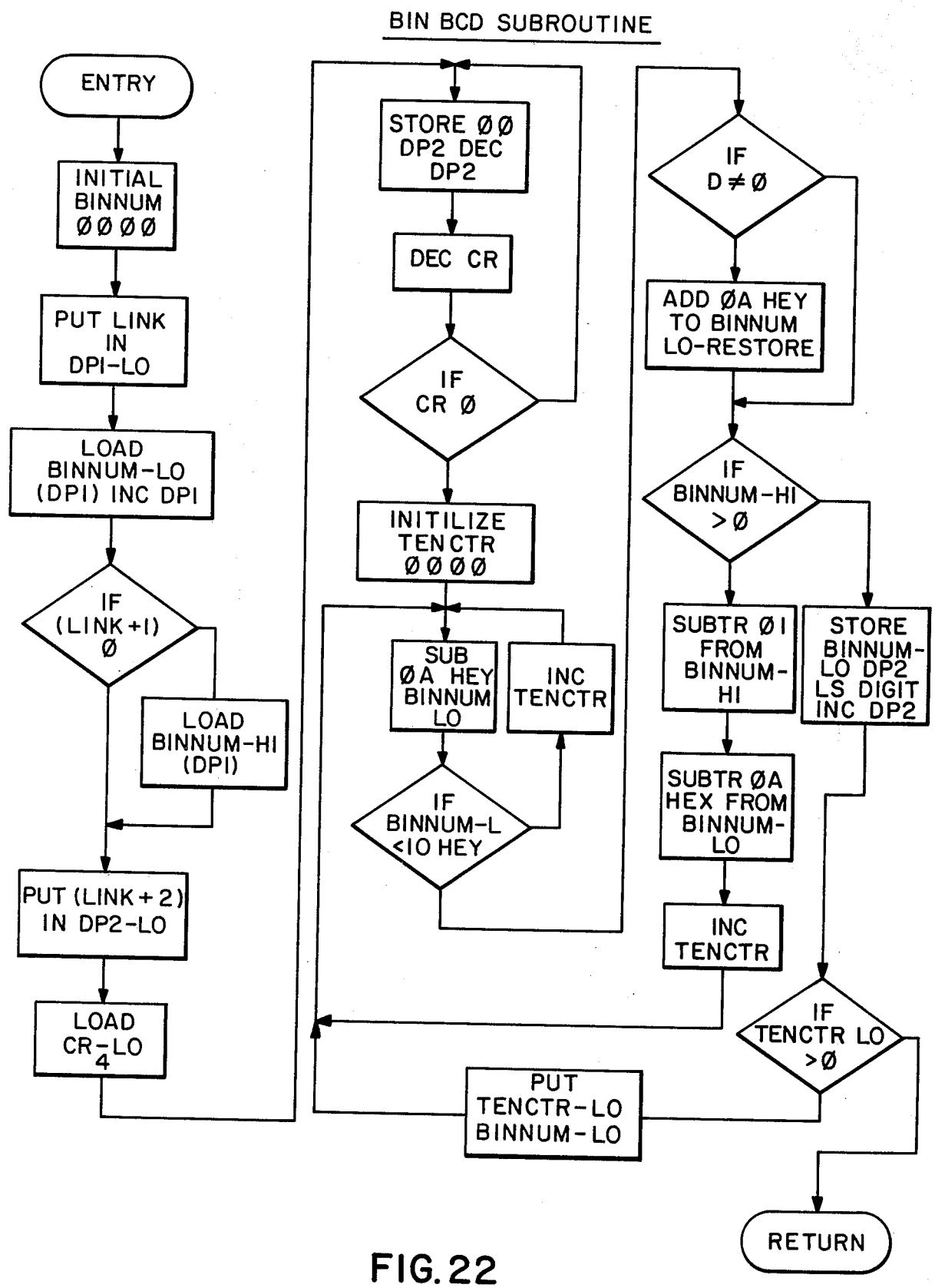
FIG. 22 is a flow diagram of a binary to BCD in numeric conversion routine stored in ROM.
Figure 23:
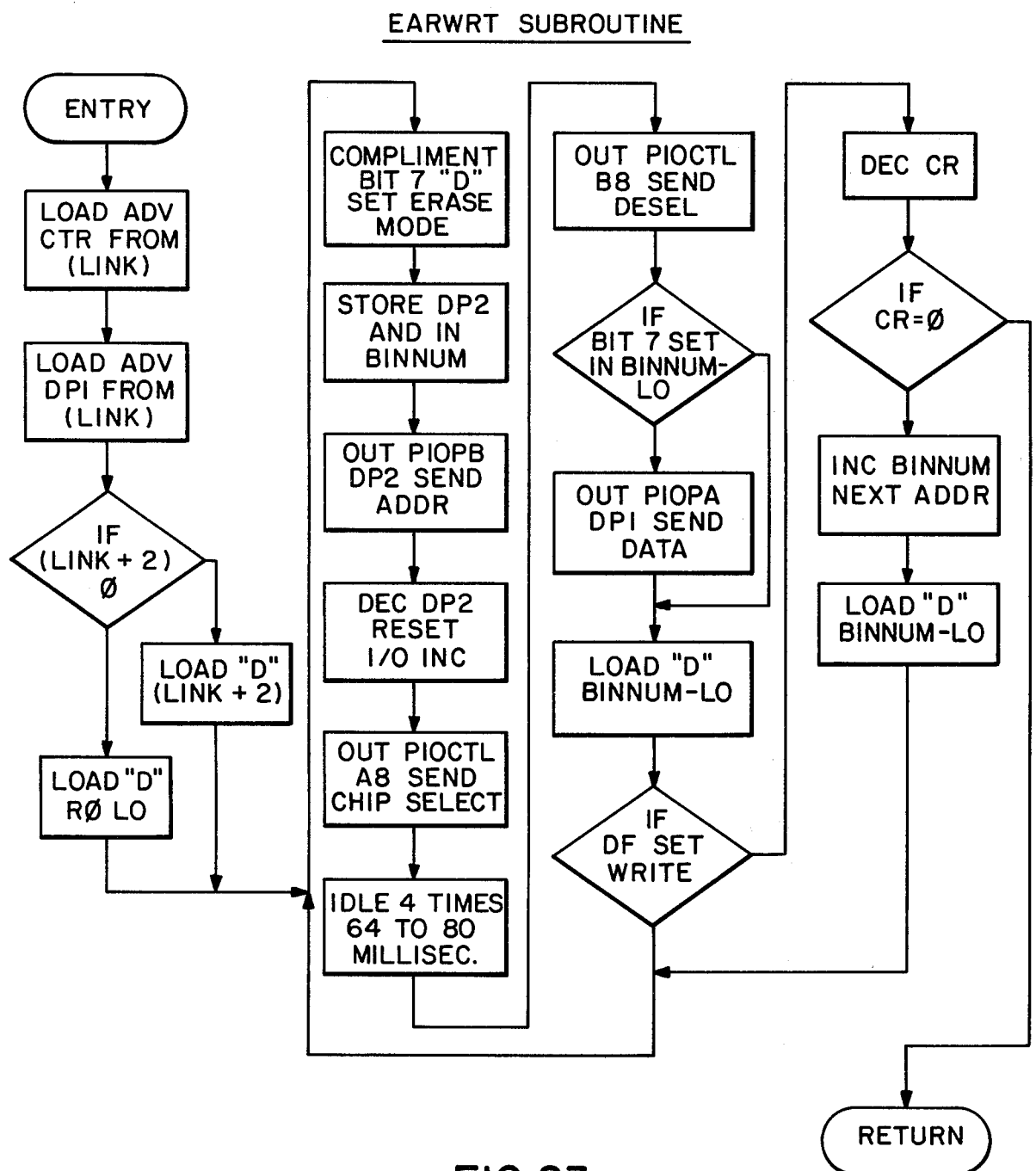
FIG. 23 is a flow diagram of a routine to erase select storage locations in EAROM and subsequently rewrite new information to the storage locations.
Figure 27:
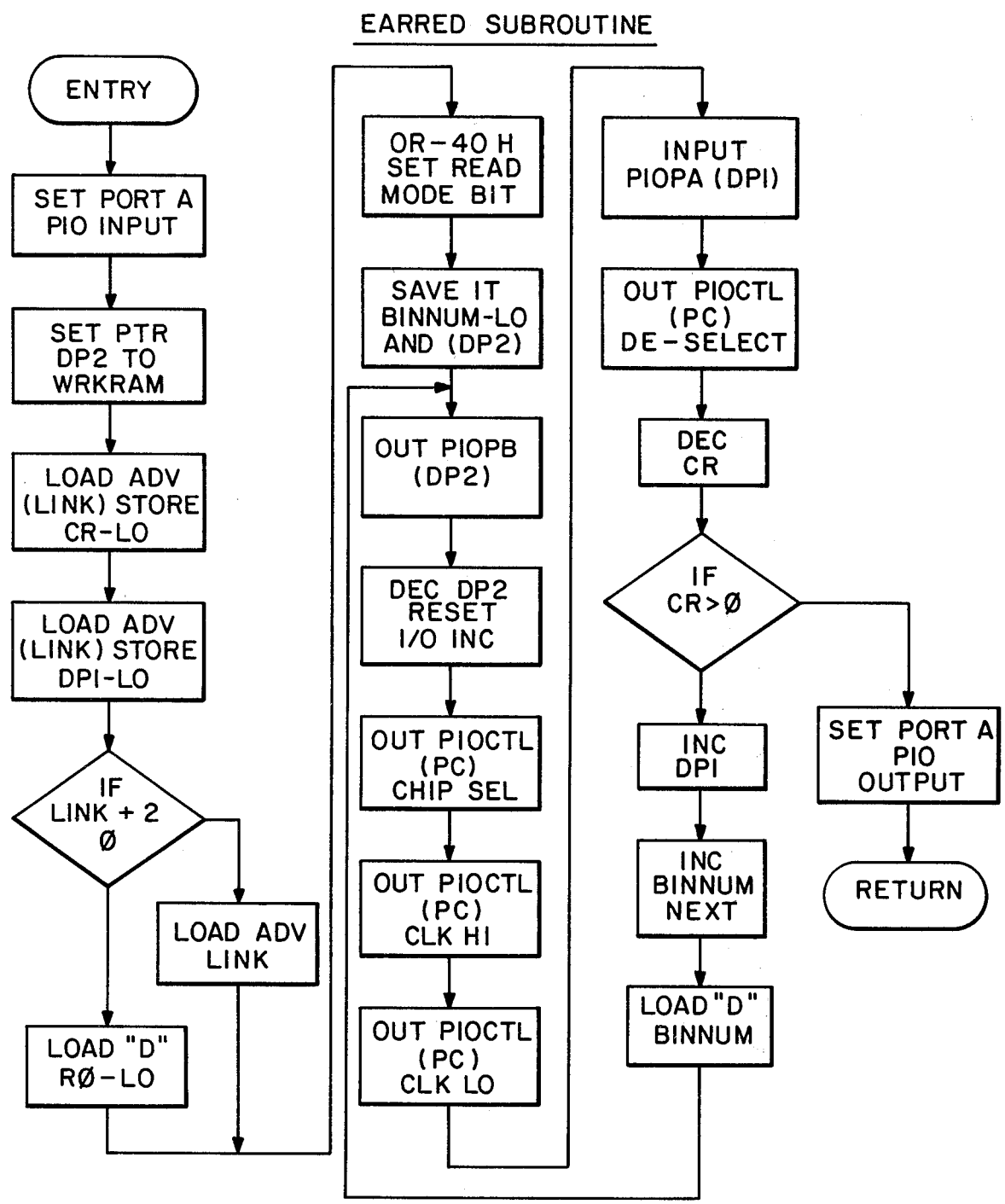
FIG. 27 is a flow diagram of a routine which reads select contents of the EAROM.
Figures 28, 29:
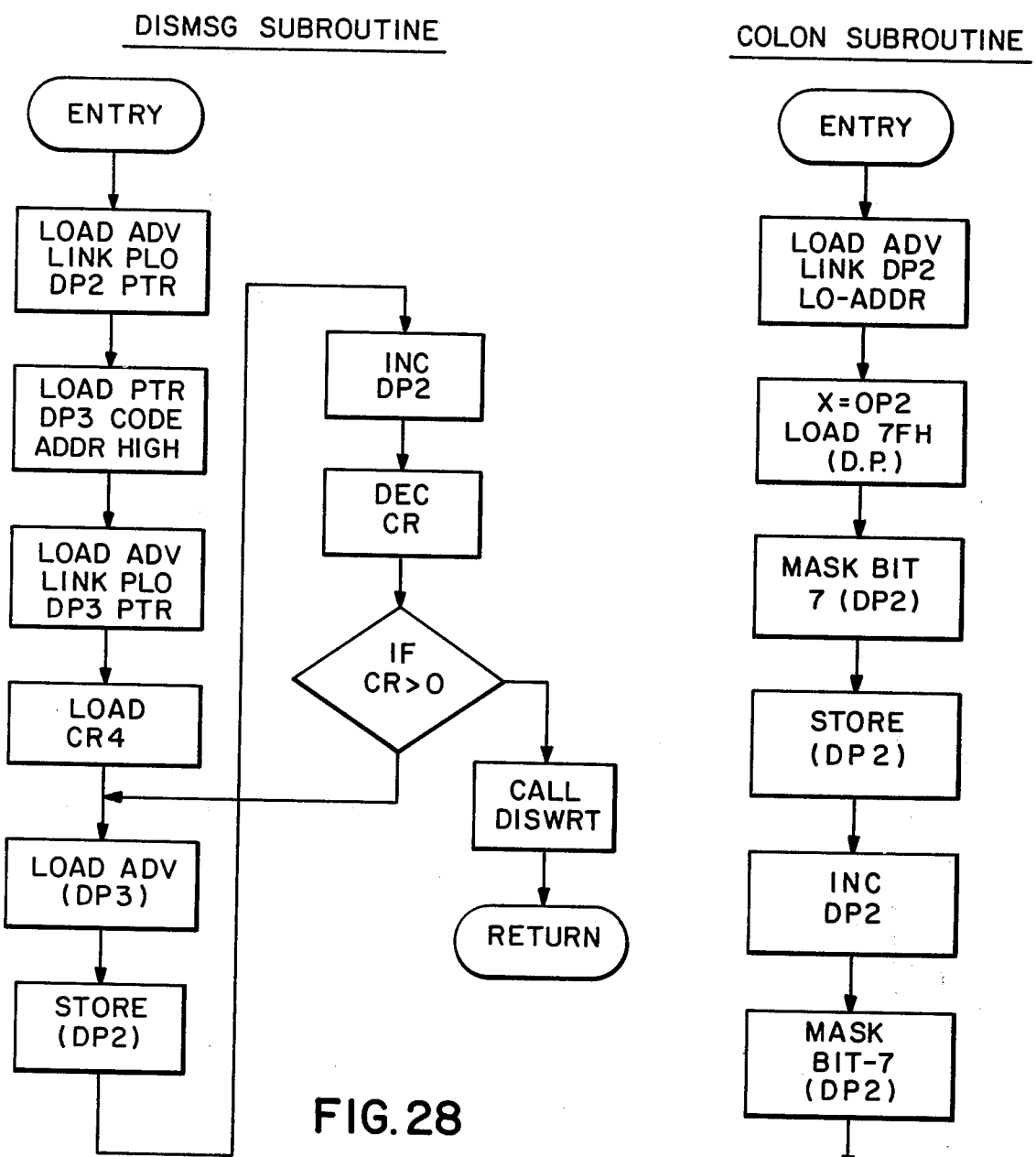
FIG. 28 is a flow diagram of a subroutine which sends messages to a display controller which controls 7-segment displays.
FIG. 29 is a flow diagram of a subroutine which sends messages to a display controller to control the 7-segment displays.
Figure 30:
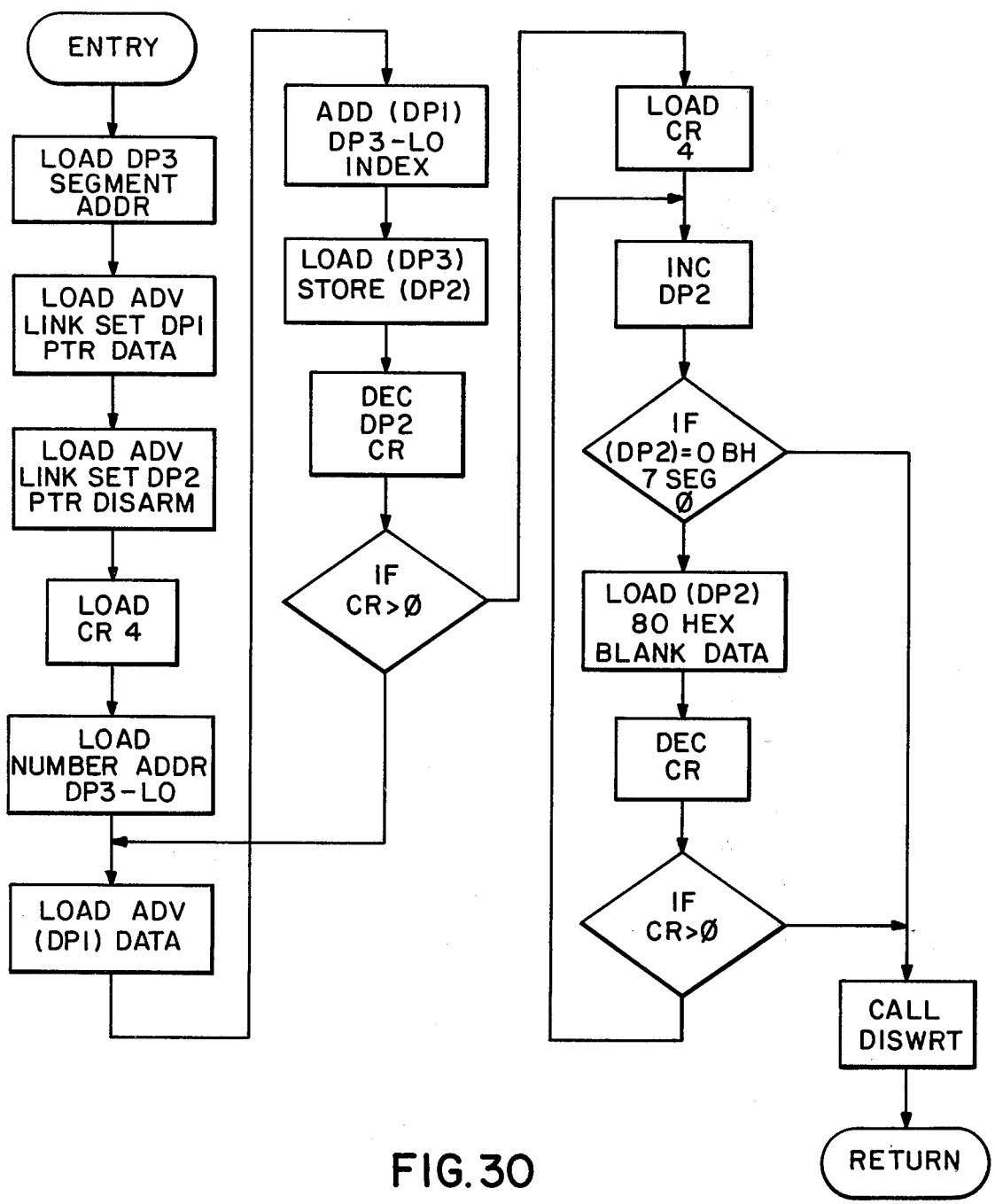
FIG. 30 is a flow diagram of a subroutine which sends alpha numeric to a display controller to control 7-segment displays.
Figure 33B:
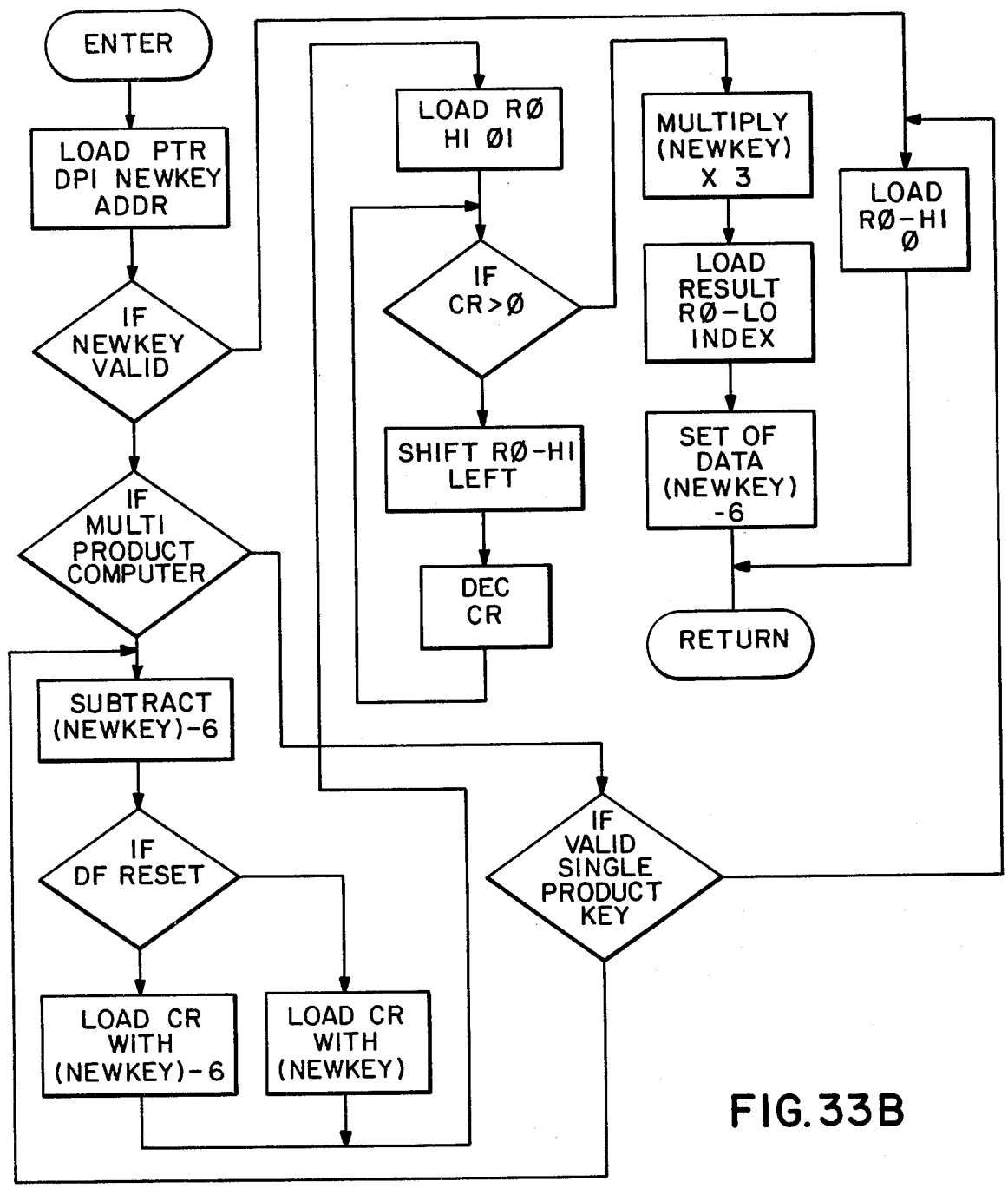
FIG. 33B is a flow diagram of a subroutine which tests for keyboard switch closings to determine which if any cooking recipes have been selected.
Figure 34A:
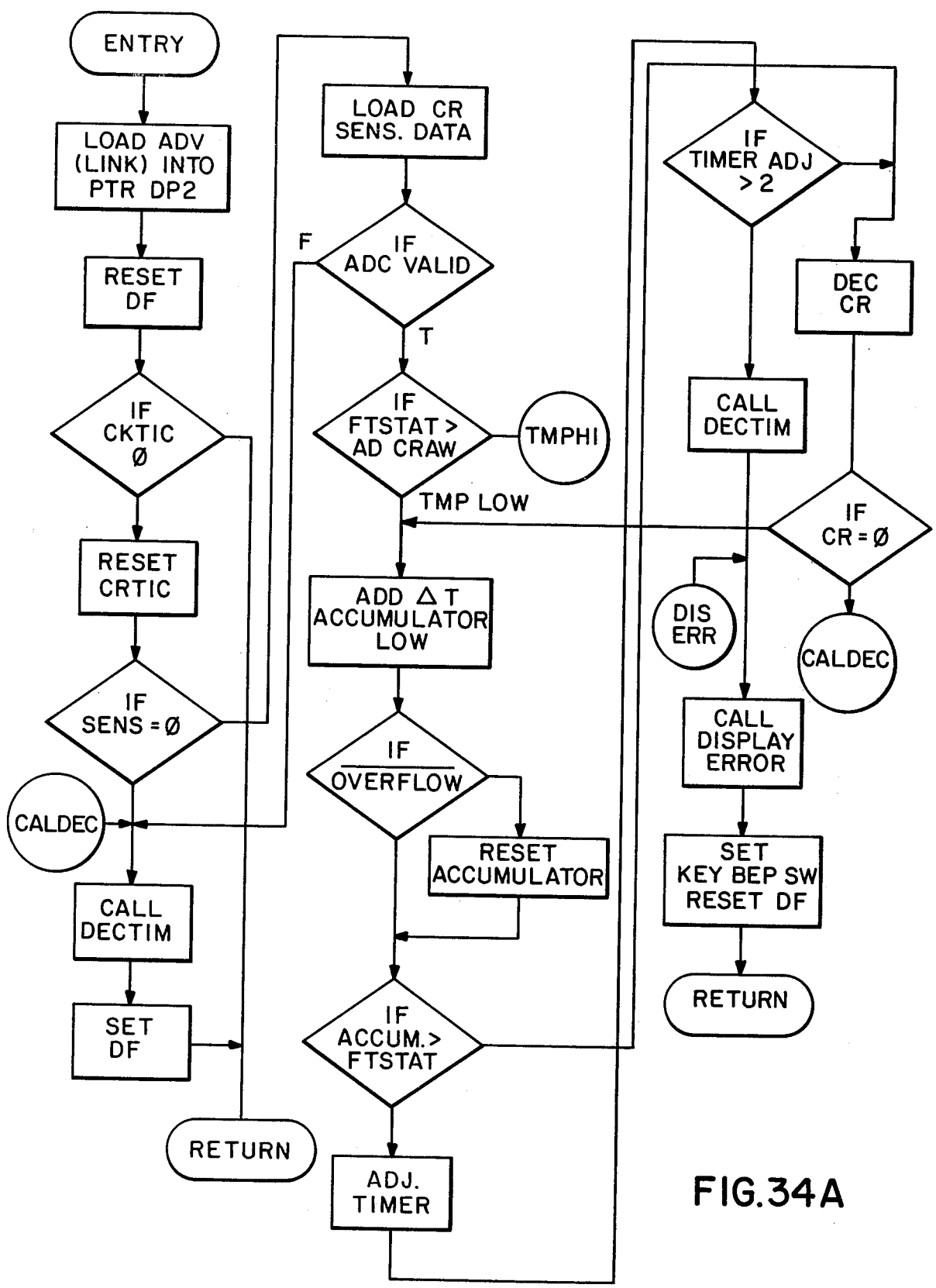
FIGS. 34A-B are flow diagrams of an integration subroutine which partially adjusts cooking timers in response to the difference between the shortening temperature and a temperature set point.
Figures 34B, 35:
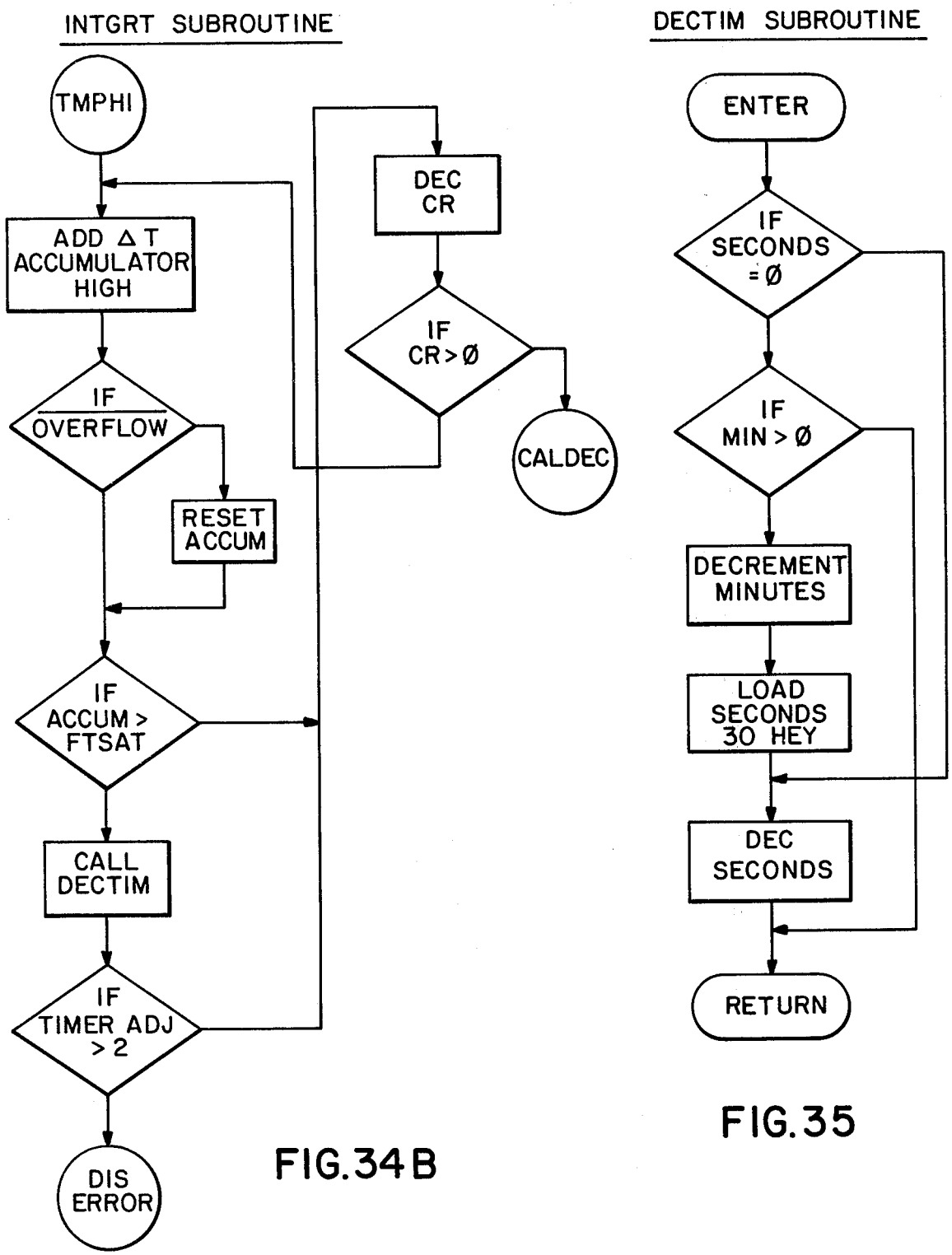
FIG. 35 is a flow diagram of a timer diagram routine.
Figure 36:
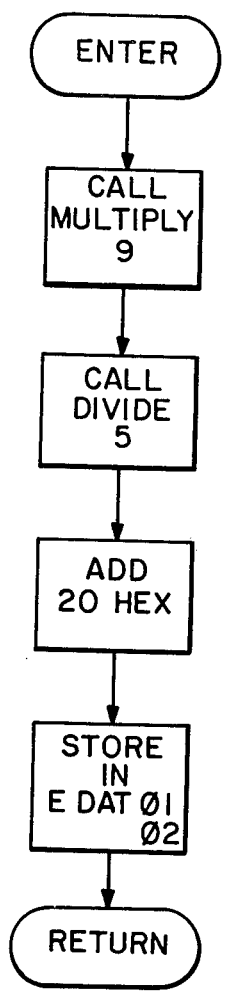
FIG. 36 is a flow diagram of a routine which converts degrees Celsius to degrees Fahrenheit.
Figure 37:
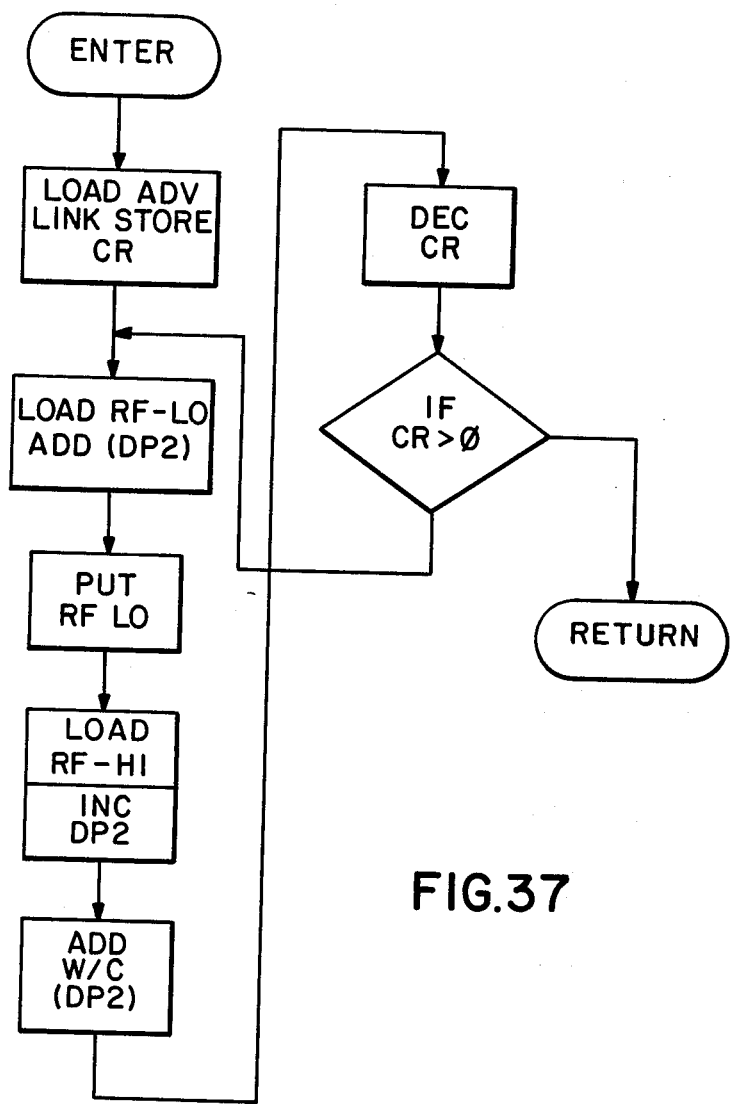
FIG. 37 is a flow diagram of a multiple subroutine.
Figure 38:
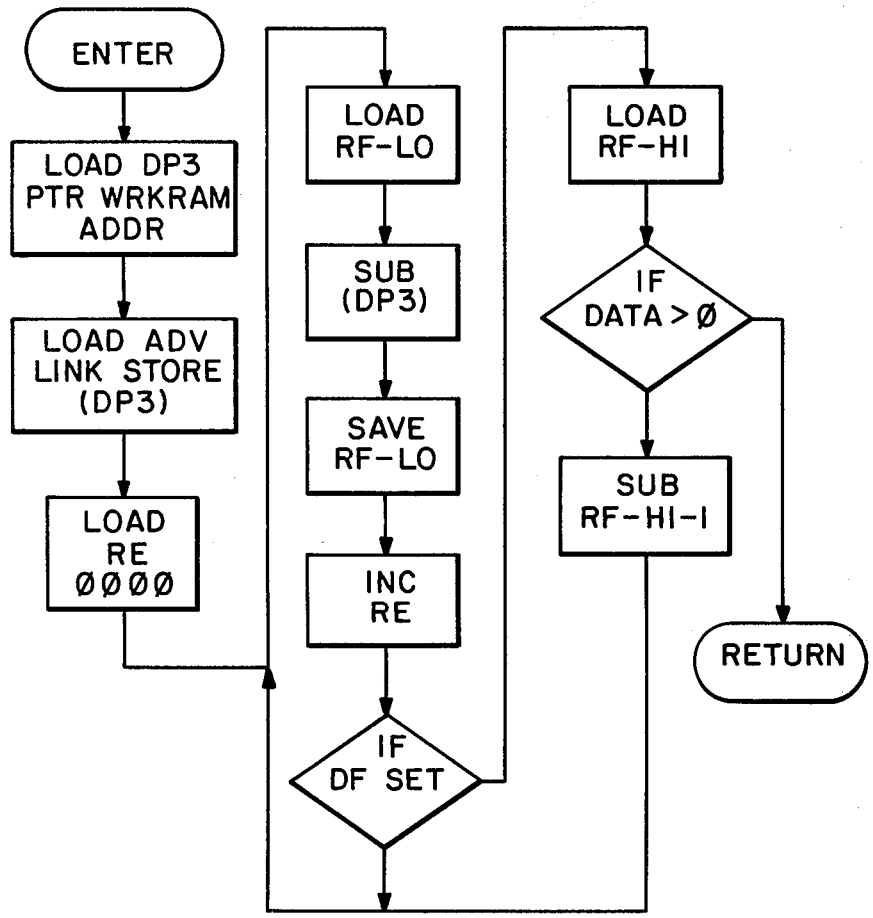
FIG. 38 is a flow diagram of a division subroutine.
Figure 39:
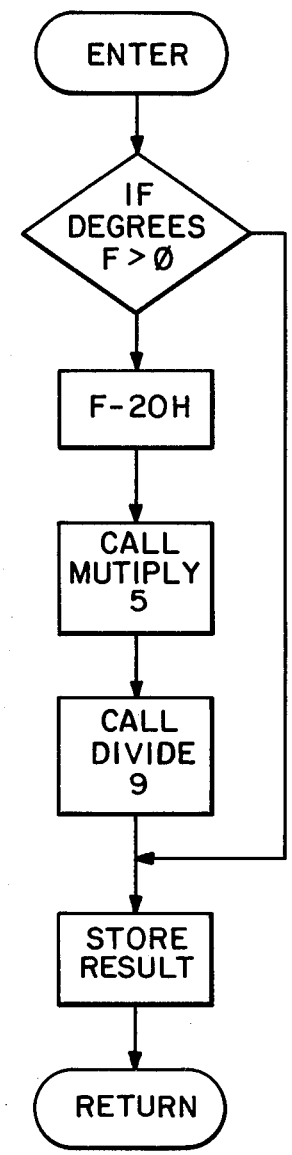
FIG. 39 is a flow diagram of a degrees Fahrenheit to degrees Celsius conversion routine.
Figure 40A:
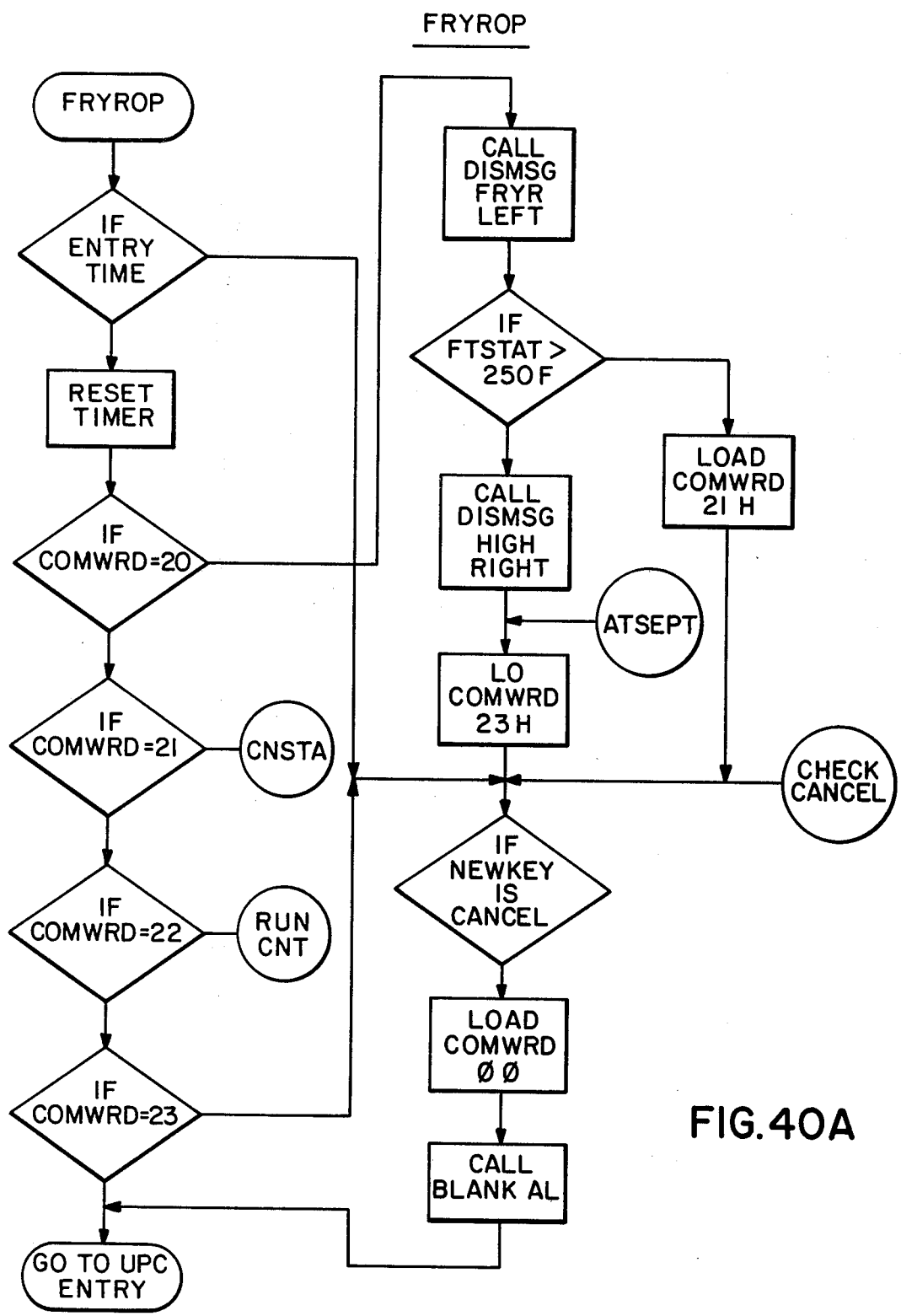
FIGS. 40A-B are flow diagrams of a fryer recovery routine.
Figure 40B:
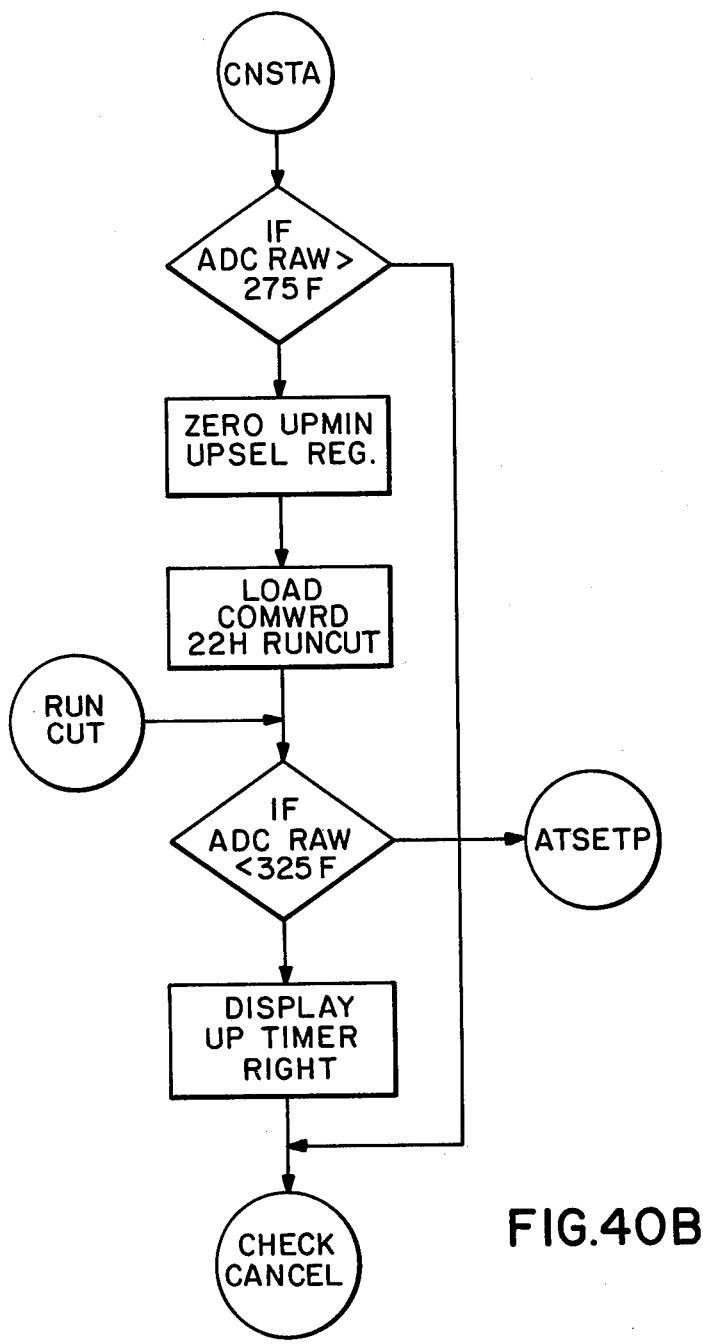

Referring now to FIG. 1E, a keyboard 750 is shown therein in schematic fashion. Keyboard 750 includes 16 membrane switches respectively numbered 751, 752, 753, 754, 755, 756, 757, 758, 759, 760, 761, 762, 763, 764, 765 and 766 which correspond respectively to key numbers 0 through F as encoded in hexadecimal notation. Keys 751 through 756 are the left basket product keys. Keys 757 through 762 are the right basket product keys. Keys 763 through 766 are control keys. All keys are located on a face portion of the control 10 immediately beneath displays 690 through 697. The keys are connected to a keyboard encoder 770, in this instance, a National Semiconductor 75C922 16-key encoder, through a plurality of pins 771 through 778, inclusive, which correspond respectively to terminals X1, X2, X3, X4, Y1, Y2, Y3 and Y4 in the National Semiconductor numbering scheme. Keyboard 770 is powered from lead 120 at a pin 780 which corresponds to pin 16 in the National Semiconductor numbering system. Four pins, 781 through 784, are connected to Port A bus 660 to provide a 4-digit number to the four lowest order Port A pins. The four digit binary number being indicative of switch closure of one of the key switches 751 through 766. The keyboard encoder 770 has an output enable pin 786 connected to lead 734 from latch 714. A data available pin 788 is connected to a lead 790 which is connected to pin 206 of CPU 104. The EF4 flag pin, an oscillator pin 792, a ground pin 794 and a key bounce in 796 are connected through capacitors to ground.

A second display controller 800, in this instance, also an ICM 7218 AIJI, is powered at its VCC pin 802 by current from line 120 for which filtering is provided by capacitor 804, a mode pin 806 is connected to lead 733 to receive signals from the pin 732 output terminal of latch 714. A plurality of input pins 810 through 817 corresponding respectively to pins 7, 5, 6, 10, 14, 13, 11 and 12 in the Intersil numbering scheme are connected to Port A bus 660 for communication herewith. A plurality of output terminals respectively 820 through 823 are connected in parallel as are a plurality of output pins 824 through 827. Pins 820 through 827 correspond to pins 15, 16, 20, 17, 22, 21 and 18 in the Intersil numbering scheme. Pins 820 through 823 are connected to a common lead 828. Pins 824 through 827 are connected to a common lead 829. A plurality of individual output pins respectively numbered 830a through g correspond to pins 27, 3, 1, 25, 2, 24 and 26 in the Intersil numbering scheme.

A first plurality of light emitting diodes 850, 851, 852, 853, 854, 855, 856 and 857 are connected in parallel to lead 828 and respectively to pins 830a through 830h and correspond to and are located adjacent to keys 757 through 764. A second plurality of light emitting diodes 860, 861, 862, 863, 864, 865, 866 and 867 are connected in parallel to lead 829 and respectively to pins 830a through 830h to be energized thereby. Light emitting diodes 860 through 867 correspond to keys 751 through 756, 765 and 766 and are located immediately adjacent thereto.

When controller 10 is initially switched on the program stored in EPROM 360 begins in CPU 104. Details of the program are set forth in a program listing and associated comments which is attached hereto and is made a part of this disclosure. In addition, FIGS. 3 through 40 comprise flow charts which describe the specific functions of the program which forms a part of this disclosure.

Execution of the program begins with initialization of all of CPU 104's scratchpad registers, followed by zeroing all of the RAM 310 locations for later receipt of data. The display comprising seven segment LEDs 690 through 697 is also blanked. A test is performed to determine whether the cooking computer is configured for a single product or for multiple products. As disclosed herein the cooking computer is a multiple product computer. The temperature to which the fryer is to be set, as previously stored in EAROM 430, is fetched to RAM 310 along with information establishing a plus or minus 15° Fahrenheit temperature window about the program temperature. In addition, information from the EAROM specifying a fryer high limit temperaure of 390° F. is also loaded into RAM 310 where it is available for processing.

An additional feature of the initialization routine sets controller commands to insure that the basket lifts are raised. The initialization routine also operates an interrupt driven timer which is first interrupted by signals supplied through lead 94 to start a timer running and is then interrupted by the next positive going zero crossing potential supplied through lead 94 to stop the timer from operating in order to determine the frequency of the line voltage of the power supply.

A supervisory routine is next entered which tests a command word to determine which of several states the controller should be operating in. One of the states is a cooking state wherein at least one of the baskets is immersed in the oil and cooking counters are running. Another state is a fryer recovery state wherein a timer is initiated when the oil temperature sensed by the RTD probe reaches 275° and the timer is shut off when the RTD probe temperature reaches 325° thereby giving the user an indication of the amount of time required for the fryer to return to an operating temperature. The fryer recovery state also provides a running indication of elasped time in a display. A temperature display state may be entered to display the temperature of the RTD probe. A program state allows certain of the variables stored in EAROM, such as sensitivity and cooking time to be changed.

When the computer is first switched on, the user receives a visual signal caused by LED 857 blinking. Should the user then press membrane switch 757 the controller 10 enters the programming mode wherein the product temperature may be reset as stored in the EAROM by punching the new temperature in through the keyboard 750. Once the temperature has been set individual program recipes may be altered by pressing the appropriate membrane switch which first interrogates the user as to whether a sensitivity factor was identified as the CFAC variable should be changed. The sensitivity factor in effect determines the magnitude of time temperature correction to be performed by the integration routine stored at addresses OB96 through OB53. In addition, the minutes and seconds information stored in EAROM for the particular membrane switch depressed may also be changed by entering new information through the keyboard.

In order to obtain access to the memory in EAROM for purposes of re-programming, it is necessary that the operator enter a four-digit code when the microcomputer interrogates him with the cooking code on the display. The routine which controls the interrogation and code checking is located at addresses 0173 through 0181 and is identified as PROG81. This program also interrogates the user as to whether temperature information is to be displayed and set in terms of the Celsius scale or the Fahrenheit scale. The user selects the Fahrenheit scale or Celsius scale by depressing membrane switch 750 to respond to the Celsius prompt in the left hand display or by depressing switch 757 to respond to the Fahrenheit prompt in the right hand display. PROG84 located at address 026E through 02A4 performs the actual storage of the programmed temperature data. It should be apparent that since two baskets are being used in a single oil bath only one temperature set point is required for the instant controller. Once processing of PROG84 is complete, PROG85 prompts the user with the signals SELP in the display which requires the user to press a product key (one of keys 750 through 752). Once the product recipe has been selected, PROG86, located at address 02BC and 02EE, takes over and interrogates the user and receives new user information regarding the sensitivity factor for the program as well as the cooking time in minutes and seconds.

In addition, the user can program the amount of hold time to be displayed by the microcomputer. Hold time is defined as the amount of time following cooking of the last batch of product for which a vendor wishes to retain the product before disposing of it. Certain well-known fast-food chains, for instance, require that french fried potatoes, which had been cooked more than seven minutes before selling to a user, be disposed of. The hold time may be programmed through reentries similar to the cooking time when PROG88 at addresses 0351 through 0374 is entered.

The programming mode may be exited by pressing command key 755 following entry of a particular recipe data.

A cooking operator routine which is stored between addresses 0451 and 061E tests keyboard inputs to determine if a cook key 750 has been depressed. In the event that a cook key has been depressed a cook cycle is initiated wherein the appropriate basket lift is lowered and a cooking timer begins running within the microcomputer. Since the temperature sensed by RTD probe 14 varies during the course of foodstuff cooking, it is necessary to adjust the cook time for temperature variations. An integration routine beginning at address OB96 and ending at address OC53 compares the actual temperature as received from the analog to digital converter 250 to the set point temperature and computes the difference as a delta factor. The delta factor is divided by two and multiplied by the integer stored as the sensitivity constant for the particular recipe. This number is then added to a number previously stored in an accumulator register. The program tests the contents of the accumulator and when the total stored in the accumulator is greater than the set point temperature stored in EAROM 430 the seconds timer of the cooking out program is adjusted by one count. If the fryer temperature is higher than the set point temperature the cooking time is decremented by one. The temperature dependent decrement takes place independently of the periodic one second decrementing of the cooking counter which occurs on a regular basis. Thus, the cooking timer is adjusted to compensate for temperature differences above or below the set point fryer temperature.

All timers running in the program are updated on a regular basis in synchronism with interrupts generated by positive zero voltage crossings of the line frequency.

Following is an assembly language listing program of 63 pages in length stored in Read Only Memory 360:

```
00020              ;CPU REGISTER ASSIGNMENTS?
00021              ;
00022    0000    CPUWRK EQU    00    ;CPU REGISTER UTILIZED TO HOLD COOK FLAGS.
00023    0001    INT    EQU    01    ;INTERRUPT PROGRAM COUNTER.
00024    0002    SP     EQU    02    ;STACK POINTER.
00025    0003    PC     EQU    03    ;PROGRAM COUNTER
00026    0004    CALL   EQU    04    ;CALL PROGRAM COUNTER.
00027    0005    RETN   EQU    05    ;RETURN PROGRAM COUNTER.
00028    0006    LINK   EQU    06    ;LINKING POINTER FOR CALL & RETURN.
```

```
00029   0007    DP1     EQU     07      ;DATA POINTER NUMBER 1.
00030   0008    DP2     EQU     08      ;DATA POINTER NUMBER 2.
00031   0009    DP3     EQU     09      ;DATA POINTER NUMBER 3.
00032   000A    UPC     EQU     0AH     ;UTILITY PROGRAM COUNTER.
00033   000B    CPUAUX  EQU     0BH     ;AUXILLARY CPU REGISTER.
00034   000C    CR      EQU     0CH     ;SCRATCH PAD AND COUNTER.
00035   000D    KEYPTR  EQU     0DH     ;POINTER TO RAM FOR KEY BUFFER IN PROGOP.
00036   000E    TENCTR  EQU     0EH     ;RE.1 XCRATCHPAD - RE.0 COUNTER.
00037   000F    BINNUM  EQU     0FH     ;16 BIT BINARY DATA.
00038   107F    STKTOP  EQU     107FH   ;STACK ADDRESS TOP OF 32 BYTE STACK.
00039   1060    RAMTOP  EQU     1060H   ;REST OF RAM DEDICATED TO STACK.
00040   1056    RDEGC1  EQU     1056H   ;CELSIUS HIGH BYTE.
00041   1055    RDEGC0  EQU     1055H   ;CELSIUS DEGREES REGISTER.
00042   1050    WRKRAM  EQU     1050H   ;4 BYTE WORKING RAM.
00043   104E    UPHUR   EQU     104EH   ;HOUR REGISTER FOR BURN IN TIME.
00044                   ;
00045                   ;LAMP RELATED REGISTERS.?
00046                   ;
00047   104D    LMPTWO  EQU     104DH   ;RIGHT BASKET LAMP DATA.
00048   104C    FLASH2  EQU     104CH   ;FLASH LAMP DATA.
00049   104B    LMPONE  EQU     104BH   ;LEFT BASKET LAMP DATA.
00050   104A    FLASH1  EQU     104AH   ;FLASH LAMP DATA.
00051   1049    INDCMD  EQU     1049H   ;INDICATOR CONT CMD BYTE.
00052                   ;
00053                   ;RIGHT DISPLAY REGISTERS.?
00054                   ;
00055   1048    RIGHTD  EQU     1048H   ;RIGHT DISPLAY.
00056   1047    RIGHTC  EQU     1047H   ;
00057   1046    RIGHTB  EQU     1046H   ;
00058   1045    RIGHTA  EQU     1045H   ;
00059                   ;
00060                   ;LEFT DISPLAY REGISTERS.?
00061                   ;
00062   1044    LEFTD   EQU     1044H   ;LEFT DISPLAY.
00063   1043    LEFTC   EQU     1043H   ;
00064   1042    LEFTB   EQU     1042H   ;
00065   1041    LEFTA   EQU     1041H   ;
00066                   ;
00067                   ;COMMAND DISPLAY BYTE.?
00068                   ;
00069   1040    DISCMD  EQU     1040H   ;FIRST BYTE FOR DISPLAY + 8.
00070                   ;
00071                   ;
00072   1035    KEYBF4  EQU     1035H   ;
00073   1034    KEYBF3  EQU     1034H   ;
00074   1033    KEYBF2  EQU     1033H   ;
00075   1032    KEYBF1  EQU     1032H   ;
00076                   ;
00077                   ;EAROM DATA BUFFER.?
00078                   ;
00079   1031    EDATO4  EQU     1031H   ;EAROM DATA BUFFER.
00080   1030    EDATO3  EQU     1030H   ;
00081   102F    EDATO2  EQU     102FH   ;
00082   102E    EDATO1  EQU     102EH   ;
00083                   ;
00084                   ;MASTER COMMAND FLAGS.?
00085                   ;
00086   102D    COMFLG  EQU     102DH   ;EAROM MASTER BYTE.
00087   102C    COMWRD  EQU     102CH   ;COMMAND FLAGS.
00088   102B    ALMCOM  EQU     102BH   ;ADDRESS FOR ALARM FLAGS.
00089                   ;
00090                   ;FRYIO BYTE.?
00091                   ;
```

```
00092   1028    IFBYTE EQU      1028H   ;INTERFACE TO FRYER DATA.
00093                   ;
00094                   ;TEMPERATURE RELATED REGISTERS.?
00095                   ;
00096   1027    RFRYHI EQU      1027H   ;HIGH OPERATING TEMPERATURE DATA (ADD 140).
00097   1026    RFRYLO EQU      1026H   ;LOW OPERATING TEMPERATURE DATA (ADD 140).
00098   1025    RPDEG1 EQU      1025H   ;HIGH BYTE PROG TEMP.
00099   1024    RPDEG0 EQU      1024H   ;LOW BYTE PROG TEMP.
00100   1023    DEGFM1 EQU      1023H   ;HIGH BYTE MEASURED TEMP.
00101   1022    DEGFM0 EQU      1022H   ;LOW BYTE MEASURED TEMP.
00102   1021    FTSTAT EQU      1021H   ;PROG TSTAT TEMP -140 DEGREES F.
00103   1020    ADCRAW EQU      1020H   ;RAW ADC DATA.
00104                   ;
00105                   ;MIN
00106                   ;MIN SEC DECREMENTED BY INTEGRATOR.?
00107                   ;
00108   101F    LTACC1 EQU      101FH   ;LEFT ACCUMULATOR HIGH BYTE.
00109   101E    LTACC0 EQU      101EH   ;LEFT ACCUMULATOR LOW BYTE.
00110   101D    CKMIN1 EQU      101DH   ;LEFT BASKET MINUTES.
00111   101C    CKSEC1 EQU      101CH   ;LEFT BASKET SECONDS.
00112   101B    CFAC01 EQU      101BH   ;CORRECTION FACTOR LEFT BASKET.
00113   101A    TCORR1 EQU      101AH   ;TEMP CORRECTED LEFT BASKET.
00114                   ;
00115                   ;MIN SEC DECREMENTED BY INTEGRATOR.?
00116                   ;
00117   1019    RTACC1 EQU      1019H   ;ACCUMULATOR HIGH BYTE RIGHT BASKET.
00118   1018    RTACC0 EQU      1018H   ;ACCUMULATOR LOW BYTE RIGHT BASKET.
00119   1017    CKMIN2 EQU      1017H   ;RIGHT BASKET MINUTES.
00120   1016    CKSEC2 EQU      1016H   ;RIGHT BASKET SECONDS.
00121   1015    CFAC02 EQU      1015H   ;CORRECTION FACTOR RIGHT BASKET.
00122   1014    TCORR2 EQU      1014H   ;TEMP CORRECTED RIGHT BASKET.
00123                   ;
00124                   ;MASTER TICK TIMER.?
00125                   ;
00126   1013    RTCTIC EQU      1013H   ;LINE FREQUENCY TICK.
00127                   ;
00128                   ;DECREMENTING MIN SEC TIMER.?
00129                   ;
00130   1012    HLDMIN EQU      1012H   ;DECREMENTING HOLD TIMER.
00131   1011    HLDSEC EQU      1011H   ;DECREMENTING SECONDS TIMER.
00132                   ;
00133                   ;INCREMENTING MIN SEC TIMER.?
00134                   ;
00135   1010    UPMIN  EQU      1010H   ;INCREMENTING TIMER.
00136   100F    UPSEC  EQU      100FH   ;INCREMENTING TIMER.
00137                   ;
00138                   ;SECONDS TIMER.?
00139                   ;
00140   100E    SECTIM EQU      100EH   ;SECONDS TIMER.
00141                   ;
00142                   ;0.1 SECOND TIMERS.?
00143                   ;
00144   100D    SECTIC EQU      100DH   ;0.1 SECOND TICK REGISTER.
00145   100C    CKTIC1 EQU      100CH   ;DECREMENTING TIMER FOR CK 1.
00146   100B    CKTIC2 EQU      100BH   ;DECREMENTING TIMER FOR CK 2.
00147   100A    AUXTIM EQU      100AH   ;AUXILLARY TICK TIMER.
00148   1009    ADCTIM EQU      1009H   ;TIMER FOR ADC ENTRY.
00149   1008    ALMTIM EQU      1008H   ;ALARM TIMER.
00150   1007    FLASHT EQU      1007H   ;FLASH TIMER FOR ALARM AND LAMPS.
00151   1006    FLASHD EQU      1006H   ;FLASH DATA (TIME).
00152                   ;
00153                   ;KEYBOARD DATA REGISTERS.?
00154                   ;
```

```
00155    1005         NEWKEY  EQU     1005H   ;
00156    1004         LSTKEY  EQU     1004H   ;
00157                         ;
00158                         ;BINBCD & BCDBIN REGISTERS.?
00159                         ;
00160    1003         BCDRES  EQU     1003H   ;HIGHEST ADDRESS OF FOUR BYTES OF BINARY TO BCD CONVERSION.
00161    1002         BCDRE1  EQU     1002H   ;
00162    1001         BCDRE2  EQU     1001H   ;
00163    1000         BCDRE3  EQU     1000H   ;
00164                         ;
00165                         ;EAROM ADDRESS DEFINITIONS.?
00166                         ;
00167    0000         COKADD  EQU     00      ;FIRST COOK RECIPE
00168                         ;CFAC IS FIRST BYTE OR ADDRESS 00
00169                         ;COOKMIN FOLLOWS OR ADDRESS 01
00170                         ;COOKSEC IS LAST OR ADDRESS 02
00171                         ;TO ACCESS EAROM RECIPE DATA MULTIPLY ACTIVE COOK SWITCH DATA
00172                         ;BY 03, THE RESULT WILL THEN BECOME THE EAROM ADDRESS FOR CFAC.
00173                         ;EAROM ADDRESS DATA FOR RECIPES ARE 00 TO 23H OR FIRST 36D BYTES.
00174    0030         ECOMFL  EQU     30H     ;MASTER COMMAND FLAGS.
00175    0031         KEYN?   EQU     31H     ;KEY CODE FOR PROGRAM ACCESS.
00176    0032         KEYN01  EQU     32H     ;KEY NUMBER HIGH BYTE.
00177    0033         DIAGOO  EQU     33H     ;DIAGNOSTICS PROGRAMMING ACCESS CODE.
00178    0034         FACK01  EQU     34H     ;FACTORY ACCESS HIGH BYTE.
00179    0035         FRYRST  EQU     35H     ;FRYER RECOVERY START TEMP (ADD 140D).
00180    0036         FRYRED  EQU     36H     ;FRYER RECOVERY END TEMP (ADD 140D).
00181    0037         EPDEGO  EQU     37H     ;FRYER SET POINT.
00182    0038         EPDEG1  EQU     38H     ;HIGH BYTE.
00183    0039         EFRYLO  EQU     39H     ;PROGRAM LOW OPERATING TEMP (ADD 140D).
00184    003A         EFRYHI  EQU     3AH     ;PROGRAM HIGH OPERATING TEMP (ADD 140D).
00185    003B         HOLDPT  EQU     3BH     ;PROGRAMMED HOLD TIME.
00186    003C         HOLDP1  EQU     3CH     ;
00187                         ;
00188                         ;DATA DEFINITIONS.?
00189                         ;
00190    0001         LBLREL  EQU     01      ;LEFT BASKET RELAY BIT IN IF BYTE.
00191    0002         RBLREL  EQU     02      ;RIGHT BASKET RELAY.
00192    0008         LBLALM  EQU     08      ;LEFT BASKET ALARM BIT.
00193    0010         RBLALM  EQU     10H     ;RIGHT BASKET.
00194    0000         SHTDWN  EQU     00      ;DATA TO SHUT DOWN.
00195    0010         ADFALT  EQU     10H     ;SET BIT FOUR FOR ADFALT.
00196    0004         HITPTG  EQU     04      ;ALARM TOGGLE RATE.
00197    0003         CANCTG  EQU     03      ;TOGGLE RATE.
00198    0001         COOKTG  EQU     01      ;TOGGLE RATE.
00199    0002         KEEPTG  EQU     02      ;ON TIME FOR KEY DOWN.
00200    0006         HZ60    EQU     06      ;60 HERTZ TICK DATA.
00201    0085         HZ50    EQU     85H     ;50 HERTZ TICK DATA + FLAG.
00202    0080         ALRMON  EQU     80H     ;ALARM TOGGLE DATA.
00203    00A8         EARSEL  EQU     0A8H    ;PIO CTL WORD TO SET CS FOR EAROM.
00204    0088         DESEL   EQU     88H     ;PIO CTL WORD O RESET CS FOR EAROM.
00205    0020         EARCLK  EQU     20H     ;DATA TO LOGICALLY SET OR RESET CLOCK BIT.
00206    00CB         PINPRA  EQU     0CBH    ;DATA TO SET PIO PORT A PIN PROGRAMMABLE.
00207    00D3         PINPRB  EQU     0D3H    ;DATA TO SET PIO PORT B PIN PROGRAMMABLE.
00208    00FF         ALLOUT  EQU     0FFH    ;DATA TO SET ALL PINS AS OUTPUTS.
00209    0000         ALLINP  EQU     0       ;DATA TO SET ALL PINS AS INPUTS.
00210    0020         DISMOD  EQU     20H     ;DATA TO SET PORT B OUTPUT FOR DISPLAY MODE BIT.
00211    0080         INDMOD  EQU     80H     ;DATA TO SET PORT B OUTPUT FOR INDICATOR MODE BIT.
00212    0010         KEYENA  EQU     10H     ;DATA TO SET PORT B OUTPUT FOR KEY ENCODER ENABLE.
00213    0000         IOIDLE  EQU     00      ;DATA TO RESET PORT B.
00214    0044         DCLKLO  EQU     44H     ;PIOCTL DATA WORD TO SET DISPLAY CLOCK LOW.
00215    0054         DCLKHI  EQU     54H     ;PIOCTL DTA WORD TO SET DISPLAY CLOCK HIGH.
00216    0046         LCLKLO  EQU     46H     ;PIOCTL DTA TO SET LATCH CLOCK LOW.
00217    0056         LCLKHI  EQU     56H     ;PIOCTL DATA TO SET LATCH CLK HIGH.
00218    00AA         FIOCK1  EQU     0AAH    ;FRYER I/O LATCH CLK HIGH.
```

```
00219      008A              FIOCKO  EQU    8AH          ;FRYER I/O LATCH CLK LOW.
00220      008C              OFFSET  EQU    8CH          ;ADC TEMP OFFSET 140 DEGREES F.
00221                        ;
00222                        ;I/O DEFINITIONS.?
00223                        ;
00224      0001              PIOCTL  EQU    01           ;PIO CTL REGISTER I/O.
00225      0002              PIOPA   EQU    02           ;PORT A PIO I/O
00226      0003              PIOPB   EQU    03           ;PORT B PIO I/O.
00227      0004              ADCCNV  EQU    04           ;ADC I/O.
00228                        ;
00229                        ;
00230                        ;INITIALIZATION PROCEDURE.?
00231                        ;MAIN PROGRAM STARTS HERE.?
00232                        ;
00233                        ;
00234 0000 7100              POWRUP  DIS    ,00          ;DISABLE INTERRUPTS X/P =0.
00235 0002 F809   )                  LDI    LO(STARTP)   ;
00236 0004 A3                        PLO    PC           ;LOAD PROGRAM COUNTER.
00237 0005 F800   )                  LDI    HI(STARTP)   ;
00238 0007 B3                        PHI    PC           ;
00239 0008 D3                        SEP    PC           ;SWITCH TO REGISTER 3.
00240 0009 E7              STARTP    SEX    DP1          ;
00241 000A F810              LDI     HI(STKTOP)          ;
00242 000C BB                        PHI    DP2          ;LOAD DATA POINTERS.
00243 000D B7                        PHI    DP1          ;LOAD HIGH RAM ADDRESS BYTE.
00244 000E B2                        PHI    SP           ;
00245 000F BD                        PHI    KEYPTR       ;LOAD KEYPTR RAM HIGH BYTE.
00246 0010 FB7F              LDI     LO(STKTOP)          ;
00247 0012 A7                        PLO    DP1          ;
00248 0013 A2                        PLO    SP           ;
00249                        ;
00250                        ;INITIALIZE CALL & RETN CPU REGISTERS.?
00251                        ;
00252 0014 F80B   )                  LDI    HI(CALPGM)   ;
00253 0016 B4                        PHI    CALL         ;GET CALL PROG ADDRESS INTO R4.
00254 0017 F8CA   )                  LDI    LO(CALPGM)   ;
00255 0019 A4                        PLO    CALL         ;
00256                        ;
00257 001A F808   )                  LDI    HI(RETPGM)   ;
00258 001C B5                        PHI    RETN         ;GET RETURN PROG ADDRESS INTO R5.
00259 001D F8DB   )                  LDI    LO(RETPGM)   ;
00260 001F A5                        PLO    RETN         ;
00261                        ;
00262                        ;INITALIZE PIO.?
00263                        ;
00264 0020 E3                        SEX    PC           ;SET X TO CURRENT PC FOR IMMEDIATE I/O.
00265 0021 61D3                      OUT    1,PINPRB     ;MAKE PORT B BIT PROGRAMMABLE.
00266 0023 61FF                      OUT    1,ALLOUT     ;MAKE ALL PORT B PINS OUTPUTS.
00267 0025 61DC                      OUT    1,0DCH       ;EAROM CS LOW CLOCK HIGH. PAS PAR
00268 0027 61CE                      OUT    1,0CEH       ;SEND PRT B RDY-STRB (PAS-PAR), BOTH LOW FIOCLK LOW, DISP LATCH CK LOW.
00269 0029 6300                      OUT    3,IOIDLE     ;SEND IO IDLE DATA.
00270 002B 6156                      OUT    1,LCLKHI     ;SEND CLOCK.
00271 002D 6146                      OUT    1,LCLKLO     ;
00272 002F 61CB                      OUT    1,PINPRA     ;NOW SET PORT A AS OUTPUT.
00273 0031 61FF                      OUT    1,ALLOUT     ;
00274                        ;
00275                        ;SET BASKET LIFTS UP.?
00276                        ;
00277 0033 F828              LDI     LO(IFBYTE)          ;
00278 0035 A8                        PLO    DP2          ;
00279 0036 F800              LDI     00                  ;
00280 0038 5B                        STR    DP2          ;
00281 0039 D4                        SEP    CALL         ;
00282 003A 0904   )                  WORD   FRYRIO       ;
```

```
00283                   ;
00284                   ;WRITE RAM ZERO.?
00285                   ;
00286 003C E7                   SEX     DP1     ;
00287 003D F800   RAM00 LDI     00      ;
00288 003F 73             STXD          ;WRITE AND DEC POINTER.
00289 0040 B7             GLO     DP1   ;PREPARE FOR FINISHED TEST.
00290 0041 3A3D  )        BNZ     RAM00 ;CONTINUE TILL D=00.
00291 0043 57             STR     DP1   ;WRITE LAST RAM LOCATION.
00292                   ;
00293                   ;INITIALIZE DISPLAY BOARD.?
00294                   ;
00295 0044 F849           LDI     LO(INDCMD)    ;
00296 0046 A7             PLO     DP1   ;SET POINTERS TO CONTROLLER COMMAND BYTE.
00297 0047 F840           LDI     LO(DISCMD)    ;
00298 0049 A8             PLO     DP2   ;
00299 004A F8FF           LDI     0FFH  ;DATA TO INITIATE READ.
00300 004C 57             STR     DP1   ;
00301 004D 58             STR     DP2   ;
00302                   ;
00303                   ;WRITE DISPLAY RAM BLANK.?
00304                   ;
00305 004E D4             SEP     CALL  ;BLANK ALL DIGITS.
00306 004F 08FB  )        WORD    BLNKAL ;
00307 0051 D4             SEP     CALL  ;WRITE INDICATORS BLANK.
00308 0052 0A25  )        WORD    INDWRT ;
00309                   ;
00310                   ;DETERMINE LINE FREQUENCY.?
00311                   ;
00312 0054 FB0B  )        LDI     HI(INT0)      ;
00313 0056 B1             PHI     INT   ;LOAD FIRST INTERRUPT VECTOR.
00314 0057 F83A  )        LDI     LO(INT0)      ;
00315 0059 A1             PLO     INT   ;
00316 005A F800           LDI     00    ;INITILIZE COUNTER.
00317 005C AF             PLO     BINNUM ;
00318 005D BF             PHI     BINNUM ;
00319 005E E3             SEX     PC    ;TO ENABLE INTERRUPT.
00320 005F 7033           RET     ,33H  ;ENABLE INTERRUPTS.
00321 0061 00             IDL           ;WAIT FOR INT.
00322 0062 1F             INC     BINNUM ;COUNT UNTIL NEXT
00323 0063 3062  )        BR      $-1   ;INTERRUPT OCCURS.
00324 0065 FB47  ) FREQTC LDI    LO(INTRPT)     ;
00325 0067 A1             PLO     INT   ;LOAD NORMAL INTERRUPT VECTOR.
00326 0068 FB13           LDI     LO(RTCTIC)    ;
00327 006A A7             PLO     DP1   ;POINT TO RTC REG.
00328 006B BF             GLO     BINNUM ;TEST FOR 50 OR 60 HZ.
00329 006C FF40           SMI     40H   ;
00330 006E FB06           LDI     HZ60  ;LOAD 60 HERTZ DATA.
00331 0070 3B74  )        BL      SAVEFR ;DON  T DO 50 HERTZ.
00332 0072 F885           LDI     HZ50  ;LOAD 50 HERTZ DATA.
00333 0074 57     SAVEFR  STR     DP1   ;SAVE IN RTCT ..RESET.
00334                   ;
00335                   ;INITIALIZE START UP PROCEDURE.?
00336                   ;
00337 0075 7B             SEQ           ;DISABLE ALARM.
00338 0076 D4             SEP     CALL  ;GET EAROM FLAGS.
00339 0077 0A9E  )        WORD    EARRED ;
00340 0079 012D30         BYTE    1,LO(COMFLG),ECOMFL    ;ONE BYTE -- DESTINATION -- EAROM ADDRESS.
00341 007C 07             LDN     DP1   ;
00342 007D F901           ORI     1     ;SET SINGLE PRODUCT BIT.
00343 007F 3E83  )        BN3     $+4   ;IF HIGH LEAVE IT SINGLE PRODUCT.
00344 0081 FB01           XRI     1     ;MAKE MULTI PRODUCT.
00345 0083 57             STR     DP1   ;
00346 0084 D4     REINIT  SEP     CALL  ;GET FRYER TEMPERATURES.
```

```
00347 0085 0A9E   )           WORD    EARRED  ;
00348 0087 042437             BYTE    4,LO(RPDEG0),EPDEG0   ;TWO BYTES, LO AND HI -- DESTINATION --
00349                                                       ;LOW TEMP INC TO HIGH.
00350 008A 3FBF   )           BN4     $+5     ;BURN EAROM IF EF4 IS HIGH.
00351 008C C00CD2 )           LBR     EARBUN  ;
00352                         ;
00353                         ;SET DATA IN FTSTAT TO ADCRAW CO.?
00354                         ;
00355 008F F824     TESTPF    LDI     LO(RPDEG0)      ;
00356 0091 A7                 PLO     DP1     ;
00357 0092 07                 LDN     DP1     ;
00358 0093 F821               LDI     LO(FTSTAT)      ;
00359 0095 A8                 PLO     DP2     ;
00360 0096 07                 LDN     DP1     ;PROG TEMP LOW BYTE.
00361 0097 FC74               ADI     74H     ;DATA TO SET TO LESS 140 F.
00362 0099 5B                 STR     DP2     ;74 HEX IS 256D-140D.
00363 009A F80E     PROOK     LDI     LO(SECTIM)      ;
00364 009C A7                 PLO     DP1     ;
00365 009D F803               LDI     03      ;
00366 009F 57                 STR     DP1     ;
00367 00A0 F84A               LDI     LO(FLASH1)      ;
00368 00A2 A7                 PLO     DP1     ;
00369 00A3 F880               LDI     80H     ;READY INDICATOR.
00370 00A5 57                 STR     DP1     ;
00371 00A6 D4                 SEP     CALL    ;TURN ON.
00372 00A7 0A25   )           WORD    INDWRT  ;
00373 00A9 F8B1   )           LDI     LO(UPCENT)      ;
00374 00AB AA                 PLO     UPC     ;LOAD UTILITY PROG CTR.
00375 00AC F800   )           LDI     HI(UPCENT)      ;
00376 00AE BA                 PHI     UPC     ;
00377 00AF DA                 SEP     UPC     ;DO UTILITIES.
00378                         ;................................................
00379                         ;SUPERVISORY ROUTINE?
00380                         ;SUPERVISORY?
00381                         ;
00382                         ;SEP UPC ROUTINE.?
00383                         ;
00384 00B0 D3       UPCEXT    SEP     PC      ;TRANSFER & SIT HERE.
00385 00B1 F829   ) UPCENT    LDI     LO(UTILTY)      ;
00386 00B3 A3                 PLO     PC      ;LOAD UTILITY PROGRAM INTO PC.
00387 00B4 F806   )           LDI     HI(UTILTY)      ;
00388 00B6 B3                 PHI     PC      ;
00389 00B7 D3                 SEP     PC      ;TRANSFER AND SIT HERE.
00390 00B8 F82C               LDI     LO(COMWRD)      ;
00391 00BA A7                 PLO     DP1     ;GET COMWRD.
00392 00BB 07                 LDN     DP1     ;INTO D.
00393 00BC FE                 SHL             ;TEST BIT 07.
00394 00BD C3011E )           LBDF    BIT07   ;PROGRAM ROUTINE.
00395 00C0 FE                 SHL             ;
00396 00C1 C30127 )           LBDF    BIT06   ;TEMPERATURE DISPLAY ROUTINE.
00397 00C4 FE                 SHL             ;
00398 00C5 C30130 )           LBDF    BIT05   ;FRYER RECOVERY.
00399 00C8 FE                 SHL             ;
00400 00C9 C30139 )           LBDF    BIT04   ;COOKOP PROGRAM.
00401                         ;IF NONE ACTIVE LOOK FOR ANOTHER PROGRAM TO RUN.
00402 00CC F805               LDI     LO(NEWKEY)      ;
00403 00CE AB                 PLO     DP2     ;POINT TO NEW KEY.
00404 00CF 08                 LDN     DP2     ;GET THE DATA.
00405 00D0 FE                 SHL             ;TEST FOR VALID DATA.
00406 00D1 C3011A )           LBDF    SLEEP   ;IF NO KEY THEN SLEEP.
00407 00D4 08                 LDN     DP2     ;RESTORE D.
00408 00D5 FF0C               SMI     0CH     ;TEST FOR COMMAND KEY.
00409 00D7 C300E0 )           LBDF    CMDDEC  ;DECODE COMMAND KEY.
00410 00DA FB10               LDI     10H     ;ELSE SET COOKOP FLAG.
```

```
00411 00DC 57              STR    DP1     ;IN CMDWRD.
00412 00DD C00139 )        LBR    BIT04   ;GO TO COOKOP PROGRAM.
00413 00E0 08       CMDDEC LDN    DP2     ;RESTORE WITH KEY DATA.
00414 00E1 FB0F            XRI    0FH     ;TEST FOR PROGRAM CMD.
00415 00E3 CA00F5 )        LBNZ   FRYDEC  ;GO TEST FOR FRYER RECOVERY.
00416 00E6 FB2D            LDI    LO(COMFLG)  ;
00417 00E8 A8              PLO    DP2     ;TEST FOR ENTRY.
00418 00E9 08              LDN    DP2     ;GET THE DATA.
00419 00EA FA80            ANI    80H     ;MASK OUT ALL FLAGS EXCEPT PROGOP.
00420 00EC C2011A )        LBZ    SLEEP   ;COMFLG ALREADY RESET.
00421 00EF F880            LDI    80H     ;DATA TO SET PROGOP FLAG.
00422 00F1 57              STR    DP1     ;IN CMDWRD.
00423 00F2 C0011E )        LBR    BIT07   ;GO DO IT.
00424 00F5 FB2D     FRYDEC LDI    LO(COMFLG)  ;
00425 00F7 A8              PLO    DP2     ;TEST FOR ENTRY.
00426 00F8 08              LDN    DP2     ;GET THE DATA.
00427 00F9 FA80            ANI    80H     ;MASK OUT ALL FLAGS EXCEPT PROGOP.
00428 00FB C2010B )        LBZ    TMPDEC  ;COMFLG ALREADY RESET.
00429 00FE F805            LDI    LO(NEWKEY)  ;
00430 0100 A8              PLO    DP2     ;
00431 0101 08              LDN    DP2     ;RESTORE D.
00432 0102 FB0D            XRI    0DH     ;TEST FOR FRYREC REQUEST.
00433 0104 3A0B )          BNZ    TMPDEC  ;IF NOT THEN SLEEP.
00434 0106 FB20            LDI    20H     ;ELSE SET FRYREC BIT.
00435 0108 57              STR    DP1     ;IN CMDWRD.
00436 0109 3030 )          BR     BIT05   ;GO TO FRYOP.
00437 010B F805     TMPDEC LDI    LO(NEWKEY)  ;
00438 010D A8              PLO    DP2     ;
00439 010E 08              LDN    DP2     ;RESTORE KEY DATA.
00440 010F FB0E            XRI    0EH     ;TEST FOR TEMP DISPLAY REQUEST.
00441 0111 CA011A )        LBNZ   SLEEP   ;IF DATA, THEN NOT TEMPERATURE.
00442 0114 F840            LDI    40H     ;ELSE SET TEMPOP FLAG.
00443 0116 57              STR    DP1     ;INTO CMDWRD.
00444 0117 C00127 )        LBR    BIT06   ;GO DO IT.
00445 011A 00       SLEEP. IDL            ;IF NONE ACTIVE THEN SLEEP.
00446 011B C000B1 )        LBR    UPCENT  ;
00447 011E F801 )   BIT07  LDI    HI(PROG80)  ;
00448 0120 B3              PHI    PC      ;LOAD PROGOP ROUTINE ADDRESS.
00449 0121 FB42 )          LDI    LO(PROG80)  ;
00450 0123 A3              PLO    PC      ;
00451 0124 C000B0 )        LBR    UPCEXT  ;
00452 0127 F803 )   BIT06  LDI    HI(TEMPOP)  ;
00453 0129 B3              PHI    PC      ;LOAD TEMPOP ADDRESS.
00454 012A FBED )          LDI    LO(TEMPOP)  ;
00455 012C A3              PLO    PC      ;
00456 012D C000B0 )        LBR    UPCEXT  ;
00457 0130 F80D )   BIT05  LDI    HI(FRYROP)  ;
00458 0132 B3              PHI    PC      ;LOAD FRYREC ADDRESS.
00459 0133 F84C )          LDI    LO(FRYROP)  ;
00460 0135 A3              PLO    PC      ;
00461 0136 C000B0 )        LBR    UPCEXT  ;
00462 0139 F804 )   BIT04  LDI    HI(COOKOP)  ;
00463 013B B3              PHI    PC      ;
00464 013C FB51 )          LDI    LO(COOKOP)  ;
00465 013E A3              PLO    PC      ;
00466 013F C000B0 )        LBR    UPCEXT  ;
00467                      ;
00468                      ;PROGRAM OPERATOR.?
00469                      ;
00470 0142 07       PROG80 LDN    DP1     ;IF IN RECOVERY ROUTINE IGNORE PROGRAM ROUTINE.
00471 0143 7E              SHLC           ;
00472 0144 7E              SHLC           ;
00473 0145 7E              SHLC           ;
00474 0146 335F )          BDF    INREC   ;
00475 0148 F805            LDI    LO(NEWKEY)  ;
```

```
00476 0144 A8              PLO    DP2    ;
00477 0148 08              LDN    DP2    ;TEST TO INSURE WORKING DATA.
00478 014C FE              SHL           ;TEST BIT 8.
00479 014D 3B50    )       BNF    PGKEY  ;IF DATA THEN BRANCH.
00480 014F DA              SEP    UPC    ;ELSE GO TO UTILITY.
00481 0150 07       PGKEY  LDN    DP1    ;THIS IS COMWRD.
00482 0151 FE              SHL           ;TEST FOR PROG 80.
00483 0152 3A7C    )       BNZ    PROG81 ;IF NOT THEN GO TEST PROG81.
00484 0154 FB81            LDI    81H    ;INCREMENT CMDWRD.
00485 0156 57              STR    DP1    ;
00486 0157 D4              SEP    CALL   ;
00487 0158 0AD5    )       WORD   DISMSG ;
00488 015A 4100    )       BYTE   LO(LEFTA),LO(CODE)    ;
00489 015C D4              SEP    CALL   ;
00490 015D 0922    )       WORD   CLRBUF ;
00491 015F DA       INREC  SEP    UPC    ;GO TO UTILITIES.
00492                      ;
00493                      ;PROGOP UTILITY ROUTINES.?
00494                      ;
00495 0160 F82C     PROEXT LDI    LO(COMWRD)   ;
00496 0162 A7              PLO    DP1    ;
00497 0163 F800            LDI    0      ;FOR EXIT.
00498 0165 57              STR    DP1    ;
00499 0166 F82D            LDI    LO(COMFLG)   ;
00500 0168 A8              PLO    DP2    ;POINT TO COMFLG.
00501 0169 08              LDN    DP2    ;TO RESET PROGOP FLAG.
00502 016A FA7F            ANI    7FH    ;MASK OUT FLAG.
00503 016C 58              STR    DP2    ;FLAG CAN OT BE RESET EXCEPT BY PWRUP EAROM READ.
00504 016D D4              SEP    CALL   ;BLANK ALL.
00505 016E 08FB    )       WORD   BLNKAL ;
00506 0170 C000B4  )       LBR    REINIT ;REINITIALIZE.
00507 0173 F82C     PRORES LDI    LO(COMWRD)   ;
00508 0175 A7              PLO    DP1    ;
00509 0176 F885            LDI    85H    ;DATA FOR RESET TO SELP.
00510 0178 57              STR    DP1    ;
00511 0179 C002AC  )       LBR    PRSELP ;
00512                      ;
00513                      ;.............PROG 81.................?
00514                      ;
00515 017C 07       PROG81 LDN    DP1    ;THIS IS COMWRD.
00516 017D FB81            XRI    81H    ;IS IT PROG81.
00517 017F 3AE2    )       BNZ    PROG82 ;IF NOT THEN GO TEST PROG82.
00518 0181 08              LDN    DP2    ;NEW KEY DATA.
00519 0182 5D              STR    KEYPTR ;PUT IT IN KEY BUFFER.
00520 0183 1D              INC    KEYPTR ;
00521 0184 8D              GLO    KEYPTR ;TEST FOR FOUR IN.
00522 0185 FB36            XRI    LO(KEYBF4)+1  ;IF ALL IN.
00523 0187 328A    )       BZ     CODEIN ;
00524 0189 DA              SEP    UPC    ;DO UTILITIES AND GET ANOTHER KEY.
00525 018A D4       CODEIN SEP    CALL   ;GET CODE DATA FROM EAROM.
00526 018B 0A9E    )       WORD   EARRED ;
00527 018D 042E31          BYTE   4,LO(EDAT01),KEYN00   ; -- DESTINATION -- EAROM ADDRESS.
00528 0190 2D              DEC    KEYPTR ;RESET.
00529 0191 0D              LDN    KEYPTR ;GET LAST BYTE.
00530 0192 2D              DEC    KEYPTR ;
00531 0193 ED              SEX    KEYPTR ;
00532 0194 FE              SHL           ;LOW NIBBLE TO HIGH.
00533 0195 FE              SHL           ;
00534 0196 FE              SHL           ;
00535 0197 FE              SHL           ;
00536 0198 F1              OR            ;MERGE THE NIBBLES.
00537 0199 5D              STR    KEYPTR ;FOR COMPARE.
00538 019A 8D              GLO    KEYPTR ;TEST FOR BOTH BYTES MERGED.
00539 019B FB32            XRI    LO(KEYBF1)   ;
00540 019D 3ABA    )       BNZ    CODEIN ;DO SECOND MERGE.
```

```
00541 019F F82E              LDI     LO(EDAT01)     ;
00542 01A1 A8               PLO     DP2            ;SET POINTER TO CODE DATA.
00543 01A2 08               LDN     DP2            ;GET CODE.
00544 01A3 F3               XOR                    ;
00545 01A4 1D               INC     KEYPTR         ;
00546 01A5 1D               INC     KEYPTR         ;POINT TO SECOND BYTE.
00547 01A6 18               INC     DP2            ;
00548 01A7 3AAD    )        BNZ     DIGKEY         ;THEN MAYBE DIAGNOSTICS.
00549 01A9 08               LDN     DP2            ;
00550 01AA F3               XOR                    ;TEST SECOND BYTE.
00551 01AB 32CB    )        BZ      CODEOK         ;IF TEST PASSED BRANCH.
00552 01AD 2D       DIGKEY  DEC     KEYPTR         ;
00553 01AE 2D               DEC     KEYPTR         ;RESET POINTER.
00554 01AF 18               INC     DP2            ;POINT TO DIAGNOSTIC CODE.
00555 01B0 08               LDN     DP2            ;
00556 01B1 F3               XOR                    ;TEST FOR ENTRY.
00557 01B2 3ABC    )        BNZ     CODERR         ;
00558 01B4 1D               INC     KEYPTR         ;
00559 01B5 1D               INC     KEYPTR         ;
00560 01B6 18               INC     DP2            ;SET POINTERS TO SECOND BYTE.
00561 01B7 08               LDN     DP2            ;
00562 01B8 F3               XOR                    ;
00563 01B9 C20E52  )        LBZ     DIAGOP         ;IF PASSED GO.
00564 01BC D4       CODERR  SEP     CALL           ;
00565 01BD 0AD5    )        WORD    DISMSG         ;
00566 01BF 451C    )        BYTE    LO(RIGHTA),EROR ;
00567 01C1 F864             LDI     64H            ;LOAD DELAY REGISTER.
00568 01C3 A9               PLO     DP3            ;
00569 01C4 00       ERRDEL  IDL                    ;DELAY.
00570 01C5 29               DEC     DP3            ;
00571 01C6 89               GLO     DP3            ;TEST FOR EXIT.
00572 01C7 3AC4    )        BNZ     ERRDEL         ;
00573 01C9 3060    )        BR      PROEXT         ;GO EXIT PROGRAM MODE.
00574 01CB D4       CODEOK  SEP     CALL           ;SET UP CELSIUS FARIENHEIT OPTION.
00575 01CC 0AD5    )        WORD    DISMSG         ;
00576 01CE 4114    )        BYTE    LO(LEFTA),PDEGC ;DEGREES C.
00577 01D0 D4               SEP     CALL           ;
00578 01D1 0AD5    )        WORD    DISMSG         ;
00579 01D3 4510    )        BYTE    LO(RIGHTA),PDEGF     ;DEGREES F.
00580 01D5 F84A             LDI     LO(FLASH1)     ;SET UP KEY1 AND KEY6 INDICATORS TO FLASH.
00581 01D7 A7               PLO     DP1            ;
00582 01D8 F801             LDI     01             ;
00583 01DA 57               STR     DP1            ;
00584 01DB 17               INC     DP1            ;POINT TO FLASH 2.
00585 01DC 17               INC     DP1            ;
00586 01DD 57               STR     DP1            ;
00587 01DE D4               SEP     CALL           ;
00588 01DF 090C    )        WORD    PROINC         ;INCREMENT COMWORD PROG 82.
00589 01E1 DA               SEP     UPC            ;
00590                                              ;
00591                       ;PROGRAM MODE 82.?
00592                                              ;
00593 01E2 07       PROG82  LDN     DP1            ;TEST ENTRY.
00594 01E3 FB82             XRI     82H            ;
00595 01E5 CA025A  )        LBNZ    PROG83         ;
00596 01E8 F805             LDI     LO(NEWKEY)     ;
00597 01EA A8               PLO     DP2            ;
00598 01EB 08               LDN     DP2            ;TEST NEW KEY ENTRY.
00599 01EC C20232  )        LBZ     SETOC          ;IF ZERO (1).
00600 01EF FB06             XRI     06             ;TEST FOR DEGF REQUEST KEY (6).
00601 01F1 CA0231  )        LBNZ    LEAVE          ;IF KEY NOT 1 OR 6 THEN GET ANOTHER KEY.
00602 01F4 FB2D     DEGFRQ  LDI     LO(COMFLG)     ;
00603 01F6 A7               PLO     DP1            ;
00604 01F7 07               LDN     DP1            ;
00605 01F8 F910             ORI     10H            ;SET BIT FOUR TO INDICATE DEGREES F.
```

```
00606 01FA 57              STR    DP1    ;
00607 01FB D4              SEP    CALL   ;
00608 01FC 0A9E   )        WORD   EARRED ;
00609 01FE 015230          BYTE   1,LO(WRKRAM)+2,ECOMFL ;
00610 0201 07              LDN    DP1    ;
00611 0202 F910            ORI    10H    ;SET BIT FOUR IN EAROM CONTROL WORD TO INDICATE F.
00612 0204 57              STR    DP1    ;
00613 0205 D4              SEP    CALL   ;
00614 0206 09C5   )        WORD   EARWRT ;
00615 0208 015230          BYTE   1,LO(WRKRAM)+2,ECOMFL ;
00616 020B D4              SEP    CALL   ;INITIALIZE PROG 83.
00617 020C 0AD5   )        WORD   DISMSG ;
00618 020E 4110   )        BYTE   LO(LEFTA),LO(PDEGF)   ;DISPLAY PDF=.
00619 0210 D4              SEP    CALL   ;
00620 0211 0A9E   )        WORD   EARRED ;
00621 0213 022E37          BYTE   2,LO(EDAT01),EPDEG0   ;2 BYTES IN EAROM DATA BUFFER -- EAROM ADDRESS.
00622 0216 D4       DISDEG SEP    CALL   ;
00623 0217 0983   )        WORD   BINBCD ;
00624 0219 2E0135          BYTE   LO(EDAT01),1,LO(KEYBF4) ;PUT THE DATA IN KEYBF1-4.
00625 021C D4              SEP    CALL   ;
00626 021D 0914   )        WORD   DISBUF ;DISPLAY PROGRAMMED TEMP.
00627 021F F84A            LDI    LO(FLASH1) ;
00628 0221 A7              PLO    DP1    ;
00629 0222 F800            LDI    0      ;DATA TO SHUT LAMPS OFF.
00630 0224 57              STR    DP1    ;FLASH 1.
00631 0225 17              INC    DP1    ;LAMP 1.
00632 0226 57              STR    DP1    ;
00633 0227 17              INC    DP1    ;FLASH 2.
00634 0228 57              STR    DP1    ;
00635 0229 17              INC    DP1    ;LAMP 2.
00636 022A 57              STR    DP1    ;
00637 022B D4              SEP    CALL   ;
00638 022C 0A25   )        WORD   INDWRT ;
00639 022E D4              SEP    CALL   ;
00640 022F 090C   )        WORD   PROINC ;SET PROG. B3.
00641 0231 DA       LEAVE  SEP    UPC    ;GO TO UTILITIES.
00642 0232 F82D     SETOC  LDI    LO(COMFLG) ;
00643 0234 A7              PLO    DP1    ;
00644 0235 07              LDN    DP1    ;
00645 0236 F9EF            ORI    0EFH   ;(CHECK IF WE ARE ALREADY USING DEGREES C.
00646 0238 FC11            ADI    11H    ;
00647 023A 3B57   )        BNF    ALRDYNC ;(IF NO CARRY DEGREES C IN USE.
00648 023C F82D            LDI    LO(COMFLG) ;
00649 023E A7              PLO    DP1    ;
00650 023F 07              LDN    DP1    ;
00651 0240 FAEF            ANI    0EFH   ;RESET BIT 4 TO INDICATE CELSIUS.
00652 0242 57              STR    DP1    ;
00653 0243 D4              SEP    CALL   ;
00654 0244 0A9E   )        WORD   EARRED ;
00655 0246 015230          BYTE   1,LO(WRKRAM)+2,ECOMFL ;
00656 0249 07              LDN    DP1    ;
00657 024A FAEF            ANI    0EFH   ;
00658 024C 57              STR    DP1    ;
00659 024D D4              SEP    CALL   ;
00660 024E 09C5   )        WORD   EARWRT ;
00661 0250 015230          BYTE   1,LO(WRKRAM)+2,ECOMFL ;
00662 0253 D4              SEP    CALL   ;PUT CONVERTED DATA IN EDAT01 RAM ADDRESS.
00663 0254 0C54   )        WORD   FTOC   ;
00664 0256 24              BYTE   LO(RPDEG0) ;
00665 0257 C00216 ) ALRDYNC LBR   DISDEG ;
00666                      ;
00667                      ;.......PROG 83........?
00668                      ;
00669 025A 07       PROG83 LDN    DP1    ;THIS IS COMWRD.
```

```
00670 025B FBB3            XRI    83H        ;TEST FOR BIT 83.
00671 025D 3A6E    )       BNZ    PROG84     ;IF NOT THEN TRY PROG83.
00672 025F 08              LDN    DP2        ;NEWKEY DATA.
00673 0260 FB0F            XRI    0FH        ;IS IT READY KEY.
00674 0262 C20173 )        LBZ    PRORES     ;IF SO THEN SET PROGRAM TO SELP.
00675 0265 D4              SEP    CALL       ;
00676 0266 091A   )        WORD   BUFRES     ;PREPARE BUFFER FOR KEY DATA.
00677 0268 D4              SEP    CALL       ;
00678 0269 090C   )        WORD   PROINC     ;SET PROG 84.
00679 026B F805            LDI    LO(NEWKEY) ;
00680 026D AB              PLO    DP2        ;
00681                      ;
00682                      ;........PROG84........?
00683                      ;
00684 026E 07       PROG84 LDN    DP1        ;COMWRD.
00685 026F FB84            XRI    84H        ;TEST ENTRY.
00686 0271 3AA7   )        BNZ    PROG85     ;
00687 0273 08              LDN    DP2        ;NEWKEY DATA.
00688 0274 FB0F            XRI    0FH        ;IF IT^'S READY KEY.
00689 0276 328D   )        BZ     PDFWRT     ;THEN WRITE BUFFER TO EAROM.
00690 0278 D4       NCAN83 SEP    CALL       ;GET BCD KEY.
00691 0279 0B3D   )        WORD   PRGKEY     ;
00692 027B 07              LDN    DP1        ;BCD DATA.
00693 027C FE              SHL               ;TEST FOR VALID KEY.
00694 027D 3B86   )        BNF    KEY83      ;
00695 027F D4              SEP    CALL       ;
00696 0280 091A   )        WORD   BUFRES     ;
00697 0282 D4       EXIT83 SEP    CALL       ;
00698 0283 0914   )        WORD   DISBUF     ;
00699 0285 DA              SEP    UPC        ;
00700 0286 D4       KEY83  SEP    CALL       ;ELSE SHIFT BUFFER FOR NEW KEY.
00701 0287 0931   )        WORD   SHFTBF     ;
00702 0289 07              LDN    DP1        ;RESTORE FROM SHIFT.
00703 028A 5D              STR    KEYPTR     ;
00704 028B 3082   )        BR     EXIT83     ;
00705 028D D4       PDFWRT SEP    CALL       ;CONVERT THE DATA TO BINARY.
00706 028E 094D   )        WORD   BCDBIN     ;
00707 0290 32FF            BYTE   LO(KEYBF1),0FFH ;ADDRESS OF LSD -- THREE BYTE CONVERSION.
00708 0292 FB2D            LDI    LO(COMFLG) ;
00709 0294 A7              PLO    DP1        ;
00710 0295 07              LDN    DP1        ;TEST FOR DEG C PROG.
00711 0296 FA10            ANI    10H        ;
00712 0298 3A9D   )        BNZ    STRDF      ;
00713 029A D4              SEP    CALL       ;CONVERT CELSIUS TO FAREN.
00714 029B 0C84   )        WORD   CTOF       ;
00715 029D D4       STRDF  SEP    CALL       ;
00716 029E 09C5   )        WORD   EARWRT     ;
00717 02A0 022E37          BYTE   2,LO(EDAT01),EPDEG0  ;WRITE TWO BYTES -- EAROM ADDRESS.
00718 02A3 27              DEC    DP1        ;POINT TO EDAT02.
00719 02A4 C00173 )        LBR    PRORES     ;RESET TO PRSELP.
00720                      ;
00721                      ;.......PROG85........?
00722                      ;.......ENTRY TO SELP......?
00723                      ;
00724 02A7 07       PROG85 LDN    DP1        ;IT^'S COMWRD.
00725 02A8 FB85            XRI    85H        ;
00726 02AA 3ABC   )        BNZ    PROG86     ;IF DATA MAYBE PROG 86.
00727 02AC D4       PRSELP SEP    CALL       ;ELSE ITS PROG85 SO BLANK DISPLAYS.
00728 02AD 0B2B   )        WORD   BLANKD     ;
00729 02AF 45              BYTE   LO(RIGHTA) ;
00730 02B0 D4              SEP    CALL       ;
00731 02B1 0AD5   )        WORD   DISMSG     ;
00732 02B3 4104   )        BYTE   LO(LEFTA),LO(SELP) ;
00733 02B5 D4              SEP    CALL       ;
00734 02B6 0922   )        WORD   CLRBUF     ;
```

```
00735 02B8 D4              SEP    CALL    ;
00736 02B9 090C      )     WORD   PROINC  ;
00737 02BB DA              SEP    UPC     ;
00738                ;
00739                ;.......PROG86........?
00740                ;........DETERMINE P?DUCT......?
00741                ;
00742 02BC 07        PROG86 LDN   DP1     ;IT^'S COMWRD.
00743 02BD FB86             XRI   86H     ;TEST ENTRY.
00744 02BF CA031C    )      LBNZ  PROG87  ;
00745 02C2 08               LDN   DP2     ;NEW KEY DATA.
00746 02C3 FF0C             SMI   0CH     ;TEST FOR G/E 0C.
00747 02C5 33EF      )      BDF   NOTPRD  ;IF NOT PRODUCT KEY THEN BRANCH.
00748 02C7 D4               SEP   CALL    ;
00749 02C8 0B59      )      WORD  COKDEC  ;
00750 02CA FB4B             LDI   LO(LMPONE) ;
00751 02CC C7               LSNF          ;DON^'T LOAD NEXT IF DF 0.
00752 02CD FB4D             LDI   LO(LMPTWO)  ;
00753 02CF A8               PLO   DP2     ;PREPARE TO ILLUMINATE PRODUCT KEY.
00754 02D0 90               GHI   CPUWRK  ;THIS IS LAMP FLAGS.
00755 02D1 32EF      )      BZ    NOTPRD  ;IF A TWO PRODUCT COMP MAYBE 00.
00756 02D3 58               STR   DP2     ;SET LAMP ON FLAG.
00757 02D4 D4               SEP   CALL    ;ILLUMINATE IND.
00758 02D5 0A25      )      WORD  INDWRT  ;
00759 02D7 D4               SEP   CALL    ;
00760 02D8 0A9E      )      WORD  EARRED  ;
00761 02DA 032E00           BYTE  3,LO(EDAT01),0  ;THREE RECIPE BYTES -- SEND DATA TO EAROM BUFFER.
00762                                      ; -- TELL SUB TO USE INDEX.
00763 02DD D4               SEP   CALL    ;
00764 02DE 0AD5      )      WORD  DISMSG  ;
00765 02E0 4124      )      BYTE  LO(LEFTA),LO(SENS)  ;
00766 02E2 D4               SEP   CALL    ;CONVERT BINARY TO DEC.
00767 02E3 0983      )      WORD  BINBCD  ;
00768 02E5 2E0035           BYTE  LO(EDAT01),0,LO(KEYBF4) ;CFAC IS HERE -- ONE BYTE -- PUT BCD LSD HERE.
00769 02E8 D4               SEP   CALL    ;
00770 02E9 0914      )      WORD  DISBUF  ;
00771 02EB D4               SEP   CALL    ;
00772 02EC 090C      )      WORD  PROINC  ;
00773 02EE DA               SEP   UPC     ;GO TO UTILITIES.
00774                ;
00775                ;......ENTRY TO PRG HOLD......?
00776                ;
00777 02EF 08        NOTPRD LDN   DP2     ;HEX KEY DATA.
00778 02F0 FB0C             XRI   0CH     ;IS IT PRGHLD.
00779 02F2 CA0315    )      LBNZ  NOTHLD  ;
00780 02F5 FB4D             LDI   LO(LMPTWO)  ;
00781 02F7 A8               PLO   DP2     ;TO ILLUMINATE CANCEL KEY.
00782 02F8 FB40             LDI   40H     ;DATA.
00783 02FA 58               STR   DP2     ;
00784 02FB D4               SEP   CALL    ;
00785 02FC 0A25      )      WORD  INDWRT  ;
00786 02FE D4               SEP   CALL    ;
00787 02FF 0A9E      )      WORD  EARRED  ;
00788 0301 022F3B           BYTE  2,LO(EDAT02),HOLDPT  ;MIN . SEC -- PUT DATA IN EAROM BUFFER--
00789                                      ;ADDRESS IN EAROM.
00790 0304 F83A             LDI   HOLDPT-1  ;
00791 0306 A0               PLO   CPUWRK  ;HIDE IN COOK INDEX REGISTER.
00792 0307 D4               SEP   CALL    ;
00793 0308 0AD5      )      WORD  DISMSG  ;
00794 030A 411B      )      BYTE  LO(LEFTA),LO(HOLD)  ;
00795 030C F82C             LDI   LO(COMWRD)  ;
00796 030E A7               PLO   DP1     ;
00797 030F F888             LDI   88H     ;
00798 0311 57               STR   DP1     ;SET CWCHRD TO COOK PROG.
00799 0312 C0035B    )      LBR   HLDENT  ;GO THROUGH COOK CYCLE.
```

```
00800                  ;
00801                  ;.......EXIT AT SELP........?
00802                  ;
00803 0315 08   NOTHLD LDN    DP2     ;HEX KEY.
00804 0316 FB0E        XRI    0EH     ;IS IT AN EXIT REQUEST?
00805 0318 C20160 )    LBZ    PROEXT  ;GO EXIT.
00806 031B DA   NOTEXT SEP    UPC     ;ELSE DO UTILITIES.
00807                  ;
00808                  ;........PROG87.........?
00809                  ;....PROGRAM CFAC....?
00810                  ;
00811 031C 07   PROG87 LDN    DP1     ;ITS COMWRD.
00812 031D FB87        XRI    87H     ;TEST ENTRY.
00813 031F CA0351 )    LBNZ   PROG88  ;
00814 0322 08          LDN    DP2     ;NEW KEY DATA.
00815 0323 FB0C        XRI    0CH     ;IF CANCEL REQ DONT BRANCH.
00816 0325 CA032B )    LBNZ   NCAN86  ;
00817 0328 D4          SEP    CALL    ;THEN CLEAR THE BUFFER.
00818 0329 091A )      WORD   BUFRES  ;
00819 032B 08   NCAN86 LDN    DP2     ;GET HEX DATA.
00820 032C FB0F        XRI    0FH     ;IF READY KEY.
00821 032E C20343 )    LBZ    CFACWT  ;THEN WRITE TO EAROM.
00822 0331 D4          SEP    CALL    ;ELSE GET PROGRAM KEY DATA.
00823 0332 0B3D )      WORD   PRGKEY  ;
00824 0334 07          LDN    DP1     ;BCD DATA.
00825 0335 FE          SHL            ;TEST FOR VALID KEY.
00826 0336 3342 )      BDF    NKEY86  ;
00827 0338 07          LDN    DP1     ;RESTORE FROM SHIFT.
00828 0339 5D          STR    KEYPTR  ;
00829 033A 1D          INC    KEYPTR  ;TO BLANK DIGIT 2.
00830 033B F800        LDI    0       ;
00831 033D 5D          STR    KEYPTR  ;
00832 033E 2D          DEC    KEYPTR  ;
00833 033F D4          SEP    CALL    ;
00834 0340 0914 )      WORD   DISBUF  ;
00835 0342 DA   NKEY86 SEP    UPC     ;THEN DO UTILITIES.
00836 0343 D4   CFACWT SEP    CALL    ;
00837 0344 094D )      WORD   BCDBIN  ;
00838 0346 3200        BYTE   LO(KEYBF1),0    ;A ONE BYTE CONVERSION.
00839 0348 D4          SEP    CALL    ;
00840 0349 09C5 )      WORD   EARWRT  ;
00841 034B 012E00      BYTE   1,LO(EDAT01),0  ;ONE BYTE -- USE INDEX.
00842 034E D4          SEP    CALL    ;
00843 034F 090C )      WORD   PROINC  ;
00844                  ;
00845                  ;...PROGRAM MODE 88...?
00846                  ;
00847 0351 07   PROG88 LDN    DP1     ;ITS COMWRD.
00848 0352 FB88        XRI    88H     ;TEST FOR ENTRY.
00849 0354 3A75 )      BNZ    PROG89  ;
00850 0356 D4          SEP    CALL    ;DISPLAY COOC.
00851 0357 0AD5 )      WORD   DISMSG  ;
00852 0359 4120 )      BYTE   LO(LEFTA),COOC;
00853 035B D4   HLDENT SEP    CALL    ;CONVERT TIME TO BCD.
00854 035C 0983 )      WORD   BINBCD  ;
00855 035E 2F0035      BYTE   LO(EDAT02),0,LO(KEYBF4) ;SECONDS DATA -- DO ONE BYTE.
00856 0361 D4          SEP    CALL    ;DO MINUTES.
00857 0362 0983 )      WORD   BINBCD  ;
00858 0364 300003      BYTE   LO(EDAT03),0,LO(BCDRES) ;-- ONE BYTE -- PUT IN BCD BUFFER.
00859 0367 D4          SEP    CALL    ;GET MINUTES INTO KEY BUFFER.
00860 0368 0B4D )      WORD   DISTIM  ;
00861 036A D4          SEP    CALL    ;
00862 036B 0914 )      WORD   DISBUF  ;
00863 036D D4          SEP    CALL    ;
00864 036E 0B1B )      WORD   COLON   ;
```

```
00865 0370 46              BYTE    LO(RIGHTB)      ;
00866 0371 D4              SEP     CALL    ;INCREMENT CMD WRD.
00867 0372 090C  )         WORD    PROINC  ;
00868 0374 DA              SEP     UPC     ;GO DO UTILITIES.
00869                      ;
00870                      ;....PROGRAM MODE 89....?
00871                      ;
00872 0375 07     PROG89   LDN     DP1     ;ITS CMDWRD.
00873 0376 FB89            XRI     89H     ;TEST ENTRY TO PROG88.89
00874 0378 3A9D  )         BNZ     PROG90  ;
00875 037A 08              LDN     DP2     ;NEW KEY DATA.
00876 037B FB0F            XRI     0FH     ;IS IT READY KEY.
00877 037D 32C2  )         BZ      COOCWT  ;IF SO RESET.
00878 037F 08              LDN     DP2     ;RESTORE D.
00879 0380 FF0C            SMI     0CH     ;TEST FOR COMMAND KEY.
00880 0382 3B85  )         BL      KEY88   ;
00881 0384 DA              SEP     UPC     ;
00882 0385 D4     KEY88    SEP     CALL    ;
00883 0386 091A  )         WORD    BUFRES  ;
00884 0388 D4              SEP     CALL    ;
00885 0389 0B3D  )         WORD    PRGKEY  ;
00886 038B 07              LDN     DP1     ;GET PROGRAM KEY.
00887 038C FE              SHL             ;TEST FOR VALID KEY.
00888 038D 33B4  )         BDF     KEY88-1 ;
00889 038F 07              LDN     DP1     ;PROKEY DATA.
00890 0390 5D              STR     KEYPTR  ;
00891 0391 1D              INC     KEYPTR  ;
00892 0392 D4              SEP     CALL    ;
00893 0393 0914  )         WORD    DISBUF  ;
00894 0395 D4              SEP     CALL    ;
00895 0396 0B1B  )         WORD    COLON   ;
00896 0398 46              BYTE    LO(RIGHTB)      ;
00897 0399 D4              SEP     CALL    ;
00898 039A 090C  )         WORD    PROINC  ;
00899 039C DA              SEP     UPC     ;GO DO UTILITIES.
00900                      ;
00901                      ;....PROGRAM MODE 90....?
00902                      ;
00903 039D 08     PROG90   LDN     DP2     ;NEWKEY DATA.
00904 039E FB0C            XRI     0CH     ;IF CANCEL KEY.
00905 03A0 3AA9  )         BNZ     NCAN90  ;
00906 03A2 D4              SEP     CALL    ;
00907 03A3 091A  )         WORD    BUFRES  ;
00908 03A5 D4              SEP     CALL    ;
00909 03A6 0B1B  )         WORD    COLON   ;
00910 03A8 46              BYTE    LO(RIGHTB)      ;
00911 03A9 08     NCAN90   LDN     DP2     ;RESTORE HEX DATA.
00912 03AA FB0F            XRI     0FH     ;IF READY KEY.
00913 03AC 32C2  )         BZ      COOCWT  ;THEN GO WRITE EAROM.
00914 03AE D4              SEP     CALL    ;
00915 03AF 0B3D  )         WORD    PRGKEY  ;
00916 03B1 07              LDN     DP1     ;GET BCD DATA.
00917 03B2 FE              SHL             ;TEST FOR VALID ENTRY.
00918 03B3 33C1  )         BDF     NKEY90  ;
00919 03B5 D4              SEP     CALL    ;
00920 03B6 0931  )         WORD    SHFTBF  ;
00921 03B8 07              LDN     DP1     ;RESTORE FROM SHIFT.
00922 03B9 5D              STR     KEYPTR  ;
00923 03BA D4              SEP     CALL    ;
00924 03BB 0914  )         WORD    DISBUF  ;
00925 03BD D4              SEP     CALL    ;
00926 03BE 0B1B  )         WORD    COLON   ;
00927 03C0 46              BYTE    LO(RIGHTB)      ;
00928 03C1 DA     NKEY90   SEP     UPC     ;GO TO UTILITIES.
```

```
00929 03C2 D4         COOCWT SEP    CALL    ;
00930 03C3 094D )            WORD   BCDBIN  ;
00931 03C5 3200              BYTE   LO(KEYBF1),0    ;SECONDS OUT FIRST -- TWO BYTE CONVERSION.
00932 03C7 10                INC    CPUWRK  ;EAROM POINTER.
00933 03C8 D4                SEP    CALL    ;
00934 03C9 09C5 )            WORD   EARWRT  ;
00935 03CB 012E00            BYTE   1,LO(EDAT01),0  ;WRITE ONE BYTE -- USE INDEX IN CPUWRK.
00936 03CE D4                SEP    CALL    ;
00937 03CF 094D )            WORD   BCDBIN  ;
00938 03D1 34FF              BYTE   LO(KEYBF3),0FFH ;TWO BYTES FOR MINUTES.
00939 03D3 10                INC    CPUWRK  ;NEXT EAROM ADDRESS.
00940 03D4 D4                SEP    CALL    ;
00941 03D5 09C5 )            WORD   EARWRT  ;
00942 03D7 012E00            BYTE   1,LO(EDAT01),0  ;WRITE ONE BYTE -- USE INDEX.
00943 03DA F84B              LDI    LO(LMPONE)      ;
00944 03DC A7                PLO    DP1     ;
00945 03DD 07                LDN    DP1     ;
00946 03DE FAC0              ANI    0C0H    ;
00947 03E0 57                STR    DP1     ;
00948 03E1 17                INC    DP1     ;POINT TO LMP TWO.
00949 03E2 17                INC    DP1     ;
00950 03E3 07                LDN    DP1     ;
00951 03E4 FA80              ANI    80H     ;
00952 03E6 57                STR    DP1     ;
00953 03E7 D4                SEP    CALL    ;WRITE INDICATORS.
00954 03E8 0A25 )            WORD   INDWRT  ;
00955 03EA C00173?)          LBR    PRORES  ;GO TO SELP ENTRY.
00956                        ;
00957                        ;....TEMP DISPLAY....?
00958                        ;
00959 03ED 07         TEMPOP LDN    DP1     ;IF IN RECOVERY DO NOT DO TEMP DISPLAY.
00960 03EE 7E                SHLC           ;
00961 03EF 7E                SHLC           ;
00962 03F0 7E                SHLC           ;
00963 03F1 C30450 )          LBDF   TIMOKT  ;
00964 03F4 07                LDN    DP1     ;ITS COMWRD.
00965 03F5 FB40              XRI    40H     ;TEST ENTRY.
00966 03F7 CA0434 )          LBNZ   TEMP01  ;IF NOT THEN MUST BE 01.
00967 03FA F841              LDI    41H     ;
00968 03FC 57                STR    DP1     ;
00969 03FD F80A              LDI    LO(AUXTIM)      ;
00970 03FF A7                PLO    DP1     ;
00971 0400 F810              LDI    10H     ;2 SECONDS.
00972 0402 57                STR    DP1     ;
00973 0403 F82D              LDI    LO(COMFLG)      ;
00974 0405 A7                PLO    DP1     ;
00975 0406 07                LDN    DP1     ;TEST FOR C OR F.
00976 0407 FA10              ANI    10H     ;SET FOR C.
00977 0409 C2041F )          LBZ    DISCEL  ;
00978 040C D4                SEP    CALL    ;CONVERT TEMP TO BCD.
00979 040D 0983 )            WORD   BINBCD  ;
00980 040F 220103            BYTE   LO(DEGFMO),1,LO(BCDRES) ;
00981 0412 D4                SEP    CALL    ;DISPLAY DATA.
00982 0413 0AEA )            WORD   DISDAT  ;
00983 0415 004B              BYTE   LO(BCDRE3),LO(RIGHTD)   ;
00984 0417 D4                SEP    CALL    ;DISPLAY MESSAGE.
00985 0418 0AD5 )            WORD   DISMSG  ;
00986 041A 410C )            BYTE   LO(LEFTA),DEGF  ;
00987 041C C00433 )          LBR    TMPEND  ;
00988 041F D4         DISCEL SEP    CALL    ;
00989 0420 0C54 )            WORD   FTOC    ;
00990 0422 22                BYTE   LO(DEGFMO)      ;
00991 0423 D4                SEP    CALL    ;
00992 0424 09B3 )            WORD   BINBCD  ;
00993 0426 2E0103            BYTE   LO(EDAT01),1,LO(BCDRES) ;
```

```
00994 0429 D4                 SEP     CALL    ;
00995 042A 0AEA    )          WORD    DISDAT  ;
00996 042C 0048               BYTE    LO(DCDRE3),LO(RIGHTD)   ;
00997 042E D4                 SEP     CALL    ;
00998 042F 0AD5    )          WORD    DISMSG  ;
00999 0431 4128    )          BYTE    LO(LEFTA),DEGC  ;
01000 0433 DA      TMPEND SEP  UPC     ;DO UTILITIES.
01001 0434 07      TEMP01 LDN  DP1     ;COMWRD.
01002 0435 FB41             XRI     41H     ;
01003 0437 CA044A  )          LBNZ    TEMP02  ;
01004 043A FB05               LDI     LO(NEWKEY)      ;
01005 043C A8                 PLO     DP2     ;
01006 043D 0B                 LDN     DP2     ;NEWKEY DATA.
01007 043E FE                 SHL             ;
01008 043F 3344    )          BDF     NCANTP  ;
01009 0441 F842               LDI     42H     ;
01010 0443 57                 STR     DP1     ;SET CMCWRD FOR OFF.
01011 0444 F80A   NCANTP LDI  LO(AUXTIM)      ;
01012 0446 AE                 PLO     DP2     ;
01013 0447 0B                 LDN     DP2     ;GET SECTIMER.
01014 0448 3A50    )          BNZ     TIMOKT  ;
01015 044A F800   TEMP02 LDI  0       ;
01016 044C 57                 STR     DP1     ;
01017 044D D4                 SEP     CALL    ;BLANK DISPLAY.
01018 044E 08FB    )          WORD    BLNKAL  ;
01019 0450 DA     TIMOKT SEP  UPC     ;
01020                         ;
01021                         ;....COOK OPERATOR....?
01022                         ;
01023 0451 D4     COOKOP SEP  CALL    ;SEE IF COOK COMMAND.
01024 0452 0B59    )          WORD    COKDEC  ;
01025 0454 90                 GHI     CPUWRK  ;DATA HERE IF A COOK REQUEST.
01026 0455 C2052D  )          LBZ     COKINT  ;
01027 0458 E8                 SEX     DP2     ;FOR LOGICAL OPERATIONS.
01028 0459 FB4A               LDI     LO(FLASH1)      ;
01029 045B C7                 LSNF            ;IF DF SET THEN RIGHT REQUEST.
01030 045C F84C               LDI     LO(FLASH2)      ;
01031 045E A8                 PLO     DP2     ;GET POINTER SET TO FLASH FLAGS.
01032 045F F850               LDI     LO(WRKRAM)      ;
01033 0461 A7                 PLO     DP1     ;
01034 0462 08                 LDN     DP2     ;GET FLAGS INTO D.
01035 0463 FA3F               ANI     3FH     ;MASK OUT TWO HIGH BITS (COM LAMPS).
01036 0465 57                 STR     DP1     ;WRKRAM.
01037 0466 90                 GHI     CPUWRK  ;
01038 0467 E7                 SEX     DP1     ;
01039 0468 F3                 XOR             ;
01040 0469 327B    )          BZ      CKCANC  ;MUST BE CANCEL ALARM.
01041 046B 18                 INC     DP2     ;POINT TO LAMP REG (CK FLAGS).
01042 046C 08                 LDN     DP2     ;
01043 046D FA3F               ANI     3FH     ;
01044 046F 57                 STR     DP1     ;
01045 0470 32BF    )          BZ      NEWREQ  ;NO DATA THEN NEW REQUEST.
01046 0472 90                 GHI     CPUWRK  ;
01047 0473 F3                 XOR             ;
01048 0474 CA052D  )          LBNZ    COKINT  ;INVALID KEY SO IGNORE IT.
01049 0477 28                 DEC     DP2     ;
01050 0478 EB     CKCANC SEX  DP2     ;
01051 0479 90                 GHI     CPUWRK  ;ELSE MAYBE CANCEL.
01052 047A FBFF               XRI     0FFH    ;COMPLIMENT.
01053 047C F2                 AND             ;
01054 047D 5B                 STR     DP2     ;INSURE FLASH LAMP OFF.
01055 047E 18                 INC     DP2     ;INSURE LAMP RESET.
01056 047F 90                 GHI     CPUWRK  ;RESTORE.
01057 0480 FBFF               XRI     0FFH    ;COMPLIMENT.
01058 0482 F2                 AND             ;
```

```
01059 0483 58              STR    DP2     ;
01060 0484 FB2B            LDI    LO(ALMCOM)  ;
01061 0486 A8              PLO    DP2     ;POINT TO ALARM COMMAND BYTE.
01062 0487 FB08            LDI    LBLALM  ;LEFT BASKET ALARM BIT.
01063 0489 C7              LSNF           ;REMEMBER DF=0=LEFT/THEN SKIP.
01064 048A FB10            LDI    RBLALM  ;RIGHT BASKET ALARM BIT.
01065 048C FBFF            XRI    0FFH    ;
01066 048E F2              AND            ;
01067 048F 58              STR    DP2     ;SAVE NEW DATA.
01068 0490 FB2C            LDI    LO(COMWRD)  ;
01069 0492 A8              PLO    DP2     ;
01070 0493 FBFE            LDI    0FEH    ;TO MASK LEFT COOK BIT.
01071 0495 C7              LSNF           ;
01072 0496 FBFD            LDI    0FDH    ;TO MASK RIGHT COOK BIT.
01073 0498 F2              AND            ;DO IT.
01074 0499 58              STR    DP2     ;
01075 049A FB2B            LDI    LO(IFBYTE)  ;
01076 049C A8              PLO    DP2     ;POINT TO FRYER I/O BYTE.
01077 049D FB01            LDI    LBLREL  ;LEFT BASKET RELAY.
01078 049F C7              LSNF           ;SKIP IF LEFT BASKET.
01079 04A0 FB02            LDI    RBLREL  ;RIGHT BASKET RELAY BIT.
01080 04A2 FBFF            XRI    0FFH    ;COMPLIMENT IT.
01081 04A4 F2              AND            ;
01082 04A5 58              STR    DP2     ;
01083 04A6 D4              SEP    CALL    ;DO FRYER I/O.
01084 04A7 0904  )         WORD   FRYRIO  ;
01085 04A9 00              IDL            ;EXTRA DEBOUNCE.
01086 04AA 00              IDL            ;
01087 04AB 00              IDL            ;?
01088 04AC 00              IDL            ;
01089 04AD 00              IDL            ;
01090 04AE C304BB )        LBDF   RGTCAN  ;IF F=1 THEN CANCEL RIGHT DISPLAY.
01091 04B1 D4              SEP    CALL    ;ELSE BLANK LEFT.
01092 04B2 0B2B  )         WORD   BLANKD  ;
01093 04B4 41              BYTE   LO(LEFTA)   ;
01094 04B5 C00612 )        LBR    CKEND   ;
01095 04B8 D4      RGTCAN  SEP    CALL    ;
01096 04B9 0B2B  )         WORD   BLANKD  ;
01097 04BB 45              BYTE   LO(RIGHTA)  ;
01098 04BC C00612 )        LBR    CKEND   ;
01099 04BF 88      NEWREQ  GLO    DP2     ;SAVE THIS POINTER.
01100 04C0 AD              PLO    KEYPTR  ;
01101 04C1 33CB  )         BDF    RGTREQ  ;GET RIGHT BASKET TIMES.
01102 04C3 D4              SEP    CALL    ;ELSE DO LEFT.
01103 04C4 0A9E  )         WORD   EARRED  ;GET EAROM DATA.
01104 04C6 031B00          BYTE   3,LO(CFAC01),0 ;GET THREE CFAC MIN SEC -- STORE HERE --USE
01105                                     ;INDEX IN CPUWRK 0.
01106 04C9 30D1  )         BR     TESTIM  ;GO TEST IF TIME >0.
01107 04CB D4      RGTREQ  SEP    CALL    ;
01108 04CC 0A9E  )         WORD   EARRED  ;
01109 04CE 031500          BYTE   3,LO(CFAC02),0 ;
01110 04D1 07      TESTIM  LDN    DP1     ;MINUTES DATA.
01111 04D2 27              DEC    DP1     ;POINT TO RECIPE SECONDS DATA.
01112 04D3 CA04DA )        LBNZ   CKCONT  ;IF DATA THEN CONTINUE.
01113 04D6 07              LDN    DP1     ;
01114 04D7 C20612 )        LBZ    CKEND   ;NO DATA SO IGNORE THIS KEY.
01115                      ;
01116                      ;INC SECONDS FOR 1ST DEC.?
01117                      ;
01118 04DA 07      CKCONT  LDN    DP1     ;
01119 04DB AF              PLO    BINNUM  ;
01120 04DC 1F              INC    BINNUM  ;
01121 04DD 8F              GLO    BINNUM  ;
01122 04DE 57              STR    DP1     ;
```

```
01123                  ;
01124                  ;ZEROIZE ACCUMULATORS.?
01125                  ;
01126 04DF 17          INC    DP1      ;POINT TO ACCUMULATOR.
01127 04E0 17          INC    DP1      ;
01128 04E1 F800        LDI    0        ;RESET DATA.
01129 04E3 57          STR    DP1      ;
01130 04E4 17          INC    DP1      ;
01131 04E5 57          STR    DP1      ;
01132                  ;
01133                  ;ZEROIZE CKTIC REGISTERS.?
01134                  ;
01135 04E6 F80C        LDI    LO(CKTIC1)    ;
01136 04E8 A8          PLO    DP2      ;POINT TO LEFT TIC.
01137 04E9 87          GLO    DP1      ;DETERMINE LEFT OR RIGHT.
01138 04EA FB1F        XRI    LO(LTACC1)    ;TEST FOR LEFT.
01139 04EC CA04F5 )    LBNZ   RTACC    ;
01140 04EF F800        LDI    0        ;DATA.
01141 04F1 58          STR    DP2      ;
01142 04F2 C004F9 )    LBR    GOCOOK   ;
01143 04F5 F800  RTACC LDI    0        ;
01144 04F7 28          DEC    DP2      ;POINT TO CKTIC2.
01145 04F8 58          STR    DP2      ;
01146 04F9 8D   GOCOOK GLO    KEYPTR   ;SAVED POINTER TO COOK LAMPS.
01147 04FA A8          PLO    DP2      ;
01148 04FB EB          SEX    DP2      ;
01149 04FC 90          GHI    CPUWRK   ;RESTORE D.
01150 04FD F1          OR              ;SET FLAGS TO SET LAMP ON.
01151 04FE 58          STR    DP2      ;SET COOK FLAGS.
01152 04FF FB2B        LDI    LO(IFBYTE)    ;
01153 0501 A8          PLO    DP2      ;POINT TO FRYER I/O BYTE.
01154 0502 FB01        LDI    LBLREL   ;LEFT BASKET RELAY.
01155 0504 C7          LSNF            ;SKIP IF LEFT BASKET.
01156 0505 FB02        LDI    RBLREL   ;RIGHT BASKET RELAY BIT.
01157 0507 F1          OR              ;
01158 0508 58          STR    DP2      ;
01159 0509 D4          SEP    CALL     ;DO FRYER I/O.
01160 050A 0904  )     WORD   FRYRIO   ;
01161 050C 00          IDL             ;EXTRA DEBOUNCE.
01162 050D 00          IDL             ;
01163 050E 00          IDL             ;
01164 050F 00          IDL             ;
01165 0510 00          IDL             ;
01166 0511 FB2C        LDI    LO(COMWRD)    ;
01167 0513 A7          PLO    DP1      ;
01168 0514 07          LDN    DP1      ;
01169 0515 C3051E )    LBDF   RGTFLG   ;IF DF THEN DO RIGHT.
01170 0518 F901        ORI    1        ;SET LEFT COOK FLAG.
01171 051A 57          STR    DP1      ;
01172 051B C00521 )    LBR    HLDDIS   ;
01173 051E F902  RGTFLG ORI   2        ;
01174 0520 57          STR    DP1      ;
01175 0521 F841  HLDDIS LDI   LO(LEFTA)     ;
01176 0523 A7          PLO    DP1      ;TEST FOR A HOLD DISPLAY.
01177 0524 07          LDN    DP1      ;SEE IF H HERE.
01178 0525 FBBE        XRI    0BEH     ;
01179 0527 CA052D )    LBNZ   COKINT   ;
01180 052A D4          SEP    CALL     ;
01181 052B 08FB )      WORD   RLNKAL   ;
01182 052D FB2C  COKINT LDI   LO(COMWRD)    ;
01183 052F A8          PLO    DP2      ;POINT TO COM FLAGS.
01184 0530 08          LDN    DP2      ;TO TEST LEFT BUSY.
01185 0531 FA01        ANI    1        ;MASK COMMAND FLAGS.
01186 0533 3270 )      BZ     CKINTR   ;IF Z THEN DO RIGHT BASKET WORK.
```

```
01187 0535 F81B              LDI     LO(CFAC01)    ;
01188 0537 A7                PLO     DP1           ;POINT TO COOK FACTOR.
01189 0538 D4       LFTWRK   SEP     CALL          ;DO INTEGRATION.
01190 0539 0B96 )            WORD    INTGRT        ;
01191 053B 0C                BYTE    LO(CKTIC1)    ;
01192 053C F81D              LDI     LO(CKMIN1)    ;
01193 053E A7                PLO     DP1           ;POINT TO MINUTES TIMER.
01194 053F 07                LDN     DP1           ;
01195 0540 3A51 )            BNZ     DISLFT        ;IF DATA THEN DISPLAY IT.
01196 0542 27                DEC     DP1           ;POINT TO SECONDS DATA.
01197 0543 07                LDN     DP1           ;
01198 0544 3A51 )            BNZ     DISLFT        ;IF DATA THEN DISPLAY.
01199 0546 F84B    LFTDON    LDI     LO(LMPONE)    ;
01200 0548 A8                PLO     DP2           ;
01201 0549 08                LDN     DP2           ;LEFT LAMP DATA.
01202 054A FA3F              ANI     3FH           ;MASK STATUS LAMPS.
01203 054C B0                PHI     CPUWRK        ;DATA FOR CALL TO COOK DONE.
01204 054D FC00              ADI     0             ;TO SET DF TO 0.
01205 054F 30B3 )            BR      CKDONE        ;DO COOK COMPLETE PROCEDURE.
01206 0551 3B70 )  DISLFT    BNF     CKINTR        ;IF F DONT UPDATE DISPLAY.
01207 0553 D4                SEP     CALL          ;DISPLAY TIMER DATA.
01208 0554 0983 )            WORD    BINBCD        ;
01209 0556 1C0035            BYTE    LO(CKSEC1),0,LO(KEYBF4) ;SECONDS OUT FIRST -- DO ONE BYTE --
01210                                              ;PUT BCD HERE.
01211 0559 D4                SEP     CALL          ;NOW DO MINUTES.
01212 055A 0983 )            WORD    BINBCD        ;
01213 055C 1D0003            BYTE    LO(CKMIN1),0,LO(BCDRES) ; -- -- PUT IT HERE.
01214 055F 101D              WORD    CKMIN1        ;
01215 0561 00                BYTE    0             ;
01216 0562 1003              WORD    BCDRES        ;PUT IT HERE.
01217 0564 D4                SEP     CALL          ;GET MINUTES DATA INTO BUFFER.
01218 0565 0B4D )            WORD    DISTIM        ;
01219 0567 D4                SEP     CALL          ;DISPLAY DATA.
01220 0568 0AEA )            WORD    DISDAT        ;
01221 056A 3244              BYTE    LO(KEYBF1),LO(LEFTD)  ;
01222 056C D4                SEP     CALL          ;SET COLON ON.
01223 056D 0B1B )            WORD    COLON         ;
01224 056F 42                BYTE    LO(LEFTB)     ;
01225 0570 F82C    CKINTR    LDI     LO(COMWRD)    ;
01226 0572 A8                PLO     DP2           ;POINT TO COM FLAGS.
01227 0573 08                LDN     DP2           ;TO TEST RIGHT BUSY.
01228 0574 FA02              ANI     2             ;MASK COMMAND FLAGS.
01229 0576 C20612 )          LBZ     CKEND         ;
01230 0579 F815              LDI     LO(CFAC02)    ;
01231 057B A7                PLO     DP1           ;POINT TO COOK FACTOR.
01232 057C D4       RGTWRK   SEP     CALL          ;DO INTEGRATION.
01233 057D 0B96 )            WORD    INTGRT        ;
01234 057F 0B                BYTE    LO(CKTIC2)    ;
01235 0580 F817              LDI     LO(CKMIN2)    ;
01236 0582 A7                PLO     DP1           ;POINT TO MINUTES TIMER.
01237 0583 07                LDN     DP1           ;
01238 0584 3A95 )            BNZ     DISRGT        ;IF DATA THEN DISPLAY IT.
01239 0586 27                DEC     DP1           ;POINT TO SECONDS DATA.
01240 0587 07                LDN     DP1           ;
01241 0588 3A95 )            BNZ     DISRGT        ;IF DATA THEN DISPLAY.
01242 058A F84D    RGTDON    LDI     LO(LMPTWO)    ;
01243 058C A8                PLO     DP2           ;
01244 058D 08                LDN     DP2           ;RIGHT LAMP DATA.
01245 058E FA3F              ANI     3FH           ;MASK STATUS LAMPS.
01246 0590 B0                PHI     CPUWRK        ;DATA FOR CALL TO COOK DONE.
01247 0591 FCFF              ADI     0FFH          ;TO SET DF TO 1=RIGHT BASKET.
01248 0593 30B3 )            BR      CKDONE        ;DO COOK COMPLETE PROCEDURE.
01249 0595 CB0612 ) DISRGT   LBNF    CKEND         ;IF FH, NO UPDATE OF DISPLAY.
01250 0598 D4                SEP     CALL          ;DISPLAY TIMER DATA.
```

```
01251 0599 0983   )          WORD    BINBCD ;
01252 059B 160035            BYTE    LO(CKSEC2),0,LO(KEYBF4) ;SECONDS OUT FIRST -- DO ONE BYTE --
01253                                 ;PUT BCD HERE.
01254 059E D4                SEP     CALL    ;NOW DO MINUTES.
01255 059F 0983   )          WORD    BINBCD ;
01256 05A1 170003            BYTE    LO(CKMIN2),0,LO(BCDRES) ; -- -- PUT IT HERE.
01257 05A4 D4                SEP     CALL    ;GET MINUTES DATA INTO BUFFER.
01258 05A5 0B4D   )          WORD    DISTIM ;
01259 05A7 D4                SEP     CALL    ;DISPLAY DATA.
01260 05A8 0AEA   )          WORD    DISDAT ;
01261 05AA 3248              BYTE    LO(KEYBF1),LO(RIGHTB) ;
01262 05AC D4                SEP     CALL    ;SET COLON ON.
01263 05AD 0B1B   )          WORD    COLON ;
01264 05AF 46               BYTE    LO(RIGHTB) ;
01265 05B0 C00612 )          LBR     CKEND ;
01266 05B3 EB       CKDONE   SEX     DP2     ;FOR LOGICAL OPERATIONS.
01267 05B4 FB4A              LDI     LO(FLASH1) ;
01268 05B6 C7                LSNF            ;THIS BIT 0 IF LEFT BASKET DONE.
01269 05B7 F84C              LDI     LO(FLASH2) ;
01270 05B9 AB                PLO     DP2     ;SET POINTER TO FLASH LAMP.
01271 05BA 90                GHI     CPUWRK  ;DONE FLAGS.
01272 05BB F1                OR              ;SET THAT BIT ON.
01273 05BC 58                STR     DP2  ;
01274 05BD F82B              LDI     LO(ALMCOM) ;
01275 05BF A8                PLO     DP2     ;POINT TO ALARM DATA.
01276 05C0 FB08              LDI     LBLALM  ;LEFT BASKET ALARM DATA.
01277 05C2 C7                LSNF            ;DONT LOAD RIGHT IF F RESET.
01278 05C3 FB10              LDI     RBLALM ;
01279 05C5 F1                OR              ;
01280 05C6 58                STR     DP2 ;
01281 05C7 F82C              LDI     LO(COMWRD) ;
01282 05C9 AB                PLO     DP2 ;
01283 05CA 08                LDN     DP2 ;
01284 05CB C305D1 )          LBDF    CANRGT ;
01285 05CE?AFE               ANI     0FEH    ;MASK OUT CK1 FLAG.
01286 05D0 CB                LSKP            ;
01287 05D1 FAFD    CANRGT    ANI     0FDH    ;MASK OUT CK2 FLAG.
01288 05D3 58                STR     DP2     ;MASK OUT FLAGS.
01289 05D4 F828              LDI     LO(IFBYTE) ;
01290 05D6 AB                PLO     DP2 ;
01291 05D7 F801              LDI     LBLREL  ;LEFT RELAY BIT.
01292 05D9 C7                LSNF            ;
01293 05DA F802              LDI     RBLREL  ;RIGHT RELAY.
01294 05DC FBFF              XRI     0FFH ;
01295 05DE F2                AND             ;
01296 05DF 58                STR     DP2 ;
01297 05E0 D4                SEP     CALL    ;FOR BASKET LIFTS.
01298 05E1 0904   )          WORD    FRYRIO ;
01299 05E3 C305EC ) BLNKIT   LBDF    BLNRGT  ;BLANK RIGHT DISPLAY.
01300 05E6 D4                SEP     CALL ;
01301 05E7 0B2B   )          WORD    BLANKD ;
01302 05E9 41                BYTE    LO(LEFTA) ;
01303 05EA 30F0   )          BR      DOHLD ;
01304 05EC D4       BLNRGT   SEP     CALL ;
01305 05ED 0B2B   )          WORD    BLANKD ;
01306 05EF 45                BYTE    LO(RIGHTA) ;
01307 05F0 F82D    DOHLD     LDI     LO(COMFLG) ;
01308 05F2 A7                PLO     DP1     ;TO DETERMINE PROD 12 OR 2.
01309 05F3 07                LDN     DP1 ;
01310 05F4 FA01              ANI     1       ;MASK ALL BUT BIT 0.
01311 05F6 3AFE   )          BNZ     PD02    ;IF THAT BIT RESET ITS 12 PROD.
01312 05F8 90                GHI     CPUWRK  ;TO DETERMINE IF THAT WAS HOLD PROD.
01313 05F9 FB01              XRI     1       ;AT KEY POSITION ONE.
01314 05FB CA0612 )          LBNZ    CKEND   ;IF NOT THEN DONT SET THE FLAG.
01315 05FE D4       PD02     SEP     CALL    ;FIRST RESET THE TIMER WITH DATA FROM EAROM.
```

```
01316 05FF 0A9E   )            WORD    EARRED  ;
01317 0601 02113B              BYTE    2,LO(HLDSEC),HOLDPT   ;GET TWO BYTES -- PUT IT HERE.
01318 0604 07                  LDN     DP1          ;THIS IS MINUTES DATA.
01319 0605 C20612 )            LBZ     CKEND        ;IF MINUTES SET TO 0 THEN NO HOLD.
01320 0608 FB2C                LDI     LO(COMWRD)   ;
01321 060A A7                  PLO     DP1          ;
01322 060B 07                  LDN     DP1          ;TO SET HOLD FLAG.
01323 060C F908                ORI     8            ;THAT BIT HIGH.
01324 060E 57                  STR     DP1          ;
01325 060F D4                  SEP     CALL         ;
01326 0610 08E7   )            WORD    CANHLD       ;
01327 0612 F82C   CKEND  LDI   LO(COMWRD)   ;
01328 0614 A7                  PLO     DP1          ;
01329 0615 07                  LDN     DP1          ;TEST FOR HOLD FLAG.
01330 0616 FA0F                ANI     0FH          ;IF NONE BUSY.
01331 0618 CA061E )            LBNZ    SEPIT        ;IF DATA THEN BUSY.
01332 061B F800                LDI     0            ;ELSE RESET CMDWRD TO NOT BUSY.
01333 061D 57                  STR     DP1          ;RESET IT.
01334 061E DA     SEPIT  SEP   UPC          ;
01335                          ;
01336                          ;....WRITE EAROM TES....?
01337                          ;
01338 061F D4                  SEP     CALL         ;
01339 0620 09C5   )            WORD    EARWRT       ;
01340 0622 016000              BYTE    1,60H,0      ;
01341 0625 00     STOP   IDL                ;
01342 0626 C00625 )            LBR     STOP         ;
01343                          ;
01344                          ;....UTILITY ROUTINES....?
01345                          ;
01346 0629 F82C   UTILTY LDI   LO(COMWRD)   ;
01347 062B A7                  PLO     DP1          ;
01348 062C 07                  LDN     DP1          ;
01349 062D CA0633 )            LBNZ    ALARM        ;
01350 0630 D4                  SEP     CALL         ;THEN BLANK DISPLAY.
01351 0631 08FB   )            WORD    BLNKAL       ;
01352                          ;
01353                          ;....ALARM OPERATOR....?
01354                          ;
01355 0633 F82B   ALARM  LDI   LO(ALMCOM)   ;
01356 0635 A7                  PLO     DP1          ;
01357 0636 F808                LDI     LO(ALMTIM)   ;
01358 0638 A8                  PLO     DP2          ;
01359 0639 08                  LDN     DP2          ;GET ALARM TIMER DATA.
01360 063A 3A68   )            BNZ     ALMEXT       ;NOT ALARM TIME.
01361 063C 07                  LDN     DP1          ;GET COMMAND FLAGS.
01362 063D 3267   )            BZ      ALMOFF       ;GO INSURE ALARM OFF.
01363 063F FE                  SHL                  ;TEST BIT 7 HI TEMP ALARM.
01364 0640 3B47   )            BNF     ALMB06       ;IF NOT THEN TRY 06.
01365 0642 FB04                LDI     HITPTG       ;GET HI TEMP TOGGLE RATE.
01366 0644 58                  STR     DP2          ;INTO TIMER.
01367 0645 3062   )            BR      ALMTOG       ;GO TOGGLE ALARM BIT.
01368 0647 FE     ALMB06 SHL                ;IF CANCEL ALARM.
01369 0648 3B4F   )            BNF     ALMB05       ;THEN THIS BIT SET.
01370 064A F803                LDI     CANCTG       ;GET CANCEL TOGGLE DATA.
01371 064C 58                  STR     DP2          ;INTO ALARM TIMER.
01372 064D 3062   )            BR      ALMTOG       ;GO TOGGLE.
01373 064F 07     ALMB05 LDN   DP1          ;RESTORE DATA.
01374 0650 F6                  SHR                  ;THIS IS BEEP BIT IN DF.
01375 0651 3258   )            BZ      BEPALM       ;IF F SET THEN GO BEEP.
01376 0653 F801                LDI     COOKTG       ;ELSE GET COOK ALM TOGGLE DATA.
01377 0655 58                  STR     DP2          ;INTO ALM TIMER.
01378 0656 3062   )            BR      ALMTOG       ;DO TOGGLE BIT.
01379 0658 07     BEPALM LDN   DP1          ;ALMCOM DATA.
01380 0659 FAFE                ANI     0FEH         ;MASK OUT BEEP FLAG.
```

```
01381 065B 57              STR    DP1     ;
01382 065C F802            LDI    KBEPTG  ;GET BEEP TIMER DTA.
01383 065E 5B              STR    DP2     ;INTO ALM TIMER.
01384 065F 7A              REQ            ;ALARM ON.
01385 0660 306B )          BR     ALMEXT  ;
01386 0662 3967 )  ALMTOG  BNQ    ALMOFF  ;
01387 0664 7A              REQ            ;
01388 0665 306B )          BR     ALMEXT  ;
01389 0667 7B      ALMOFF  SEQ            ;
01390                      ;
01391                      ;....TERMINATE PROGRAM ENTRY MODE....?
01392                      ;
01393 0668 F80E    ALMEXT  LDI    LO(SECTIM)    ;
01394 066A A7              PLO    DP1     ;
01395 066B 07              LDN    DP1     ;GET TIMER DATA.
01396 066C 3A8C )          BNZ    RDYFLS  ;
01397 066E F84A            LDI    LO(FLASH1)    ;
01398 0670 A7              PLO    DP1     ;
01399 0671 07              LDN    DP1     ;
01400 0672 FE              SHL            ;TEST READY FLASH BIT.
01401 0673 3B8C )          BNF    RDYFLS  ;
01402 0675 07              LDN    DP1     ;
01403 0676 FA7F            ANI    7FH     ;MASK RKY FLASH BIT.
01404 0678 57              STR    DP1     ;RESTORE D.
01405 0679 17              INC    DP1     ;POINT TO LAMP 1.
01406 067A 07              LDN    DP1     ;GET THE DATA.
01407 067B FA7F            ANI    7FH     ;INSURE READY LAMP OFF.
01408 067D 57              STR    DP1     ;
01409 067E F82D            LDI    LO(COMFLG)    ;
01410 0680 A7              PLO    DP1     ;TEST FOR FLAG STILL ON.
01411 0681 07              LDN    DP1     ;
01412 0682 FA7F            ANI    7FH     ;MASK FLAG.
01413 0684 57              STR    DP1     ;
01414 0685 27              DEC    DP1     ;POINT TO CMDWRD.
01415 0686 07              LDN    DP1     ;
01416 0687 3A8C )          BNZ    RDYFLS  ;DONT CLEAR IF PRO WORK.
01417 0689 D4              SEP    CALL    ;BLANK DISPLAYS.
01418 068A 08FB )          WORD   BLNKAL  ;
01419                      ;
01420                      ;....UTILITY HOLD....?
01421                      ;....CANCEL HOLD ALARM....?
01422                      ;
01423 068C F82C    RDYFLS  LDI    LO(COMWRD)    ;
01424 068E A7              PLO    DP1     ;
01425 068F 07              LDN    DP1     ;
01426 0690 FA10            ANI    10H     ;TEST FOR HOLD FLAG.
01427 0692 C20710 )        LBZ    ANADC   ;
01428 0695 F812            LDI    LO(HLDMIN)    ;
01429 0697 AB              PLO    DP2     ;
01430 0698 08              LDN    DP2     ;
01431 0699 3AB1 )          BNZ    HOLDOP  ;
01432 069B 2B              DEC    DP2     ;POINT TO SECONDS.
01433 069C 0B              LDN    DP2     ;
01434 069D 3AB1 )          BNZ    HOLDOP  ;BRANCH IF DATA.
01435 069F F805            LDI    LO(NEWKEY)    ;
01436 06A1 AB              PLO    DP2     ;
01437 06A2 0B              LDN    DP2     ;NEWKEY DATA.
01438 06A3 FB0C            XRI    0CH     ;
01439 06A5 3AB1 )          BNZ    HOLDOP  ;SKIP CANCEL ALARM.
01440 06A7 07              LDN    DP1     ;COMWRD.
01441 06A8 FAF7            ANI    0F7H    ;RESET HOLD BIT.
01442 06AA 57              STR    DP1     ;
01443 06AB D4              SEP    CALL    ;
01444 06AC 08E7 )          WORD   CANHLD  ;
```

```
01445 06AE C00710 )          LBR     ANADC   ;GO TO ADC OP.
01446                    ;
01447                    ;....TEST FOR HOLD DISPLAY....?
01448                    ;....TEST FOR DISPLAY NOT BUSY....?
01449                    ;
01450 06B1 07     HOLDOP LDN     DP1     ;GET COMMAND WORD.
01451 06B2 FAE0          ANI     0E0H    ;TEST FOR OTHER FUNCTIONS.
01452 06B4 CA0710 )      LBNZ    ANADC   ;GO TO ADC OP.
01453 06B7 07            LDN     DP1     ;RESTORE.
01454 06B8 FA08          ANI     8       ;TEST FOR COOK HOLD OP.
01455 06BA C20710 )      LBZ     ANADC   ;
01456 06BD 07            LDN     DP1     ;CMDWRD.
01457 06BE FA03          ANI     3       ;TEST FOR COOKING.
01458 06C0 CA06F3 )      LBNZ    HLDALM  ;
01459 06C3 FB2B          LDI     LO(ALMCOM)      ;
01460 06C5 A7            PLO     DP1     ;
01461 06C6 07            LDN     DP1     ;
01462 06C7 FA18          ANI     18H     ;TEST FOR COOK COMPLETE ALARMS.
01463 06C9 CA06F3 )      LBNZ    HLDALM  ;IF BUSY SKIP DISPLAY.
01464                    ;
01465                    ;....TEST FOR DISPLAY TIME....?
01466                    ;
01467 06CC FB0A          LDI     LO(AUXTIM)      ;
01468 06CE A7            PLO     DP1     ;
01469 06CF 07            LDN     DP1     ;
01470 06D0 CA0710 )      LBNZ    ANADC   ;
01471 06D3 F80A          LDI     0AH     ;
01472 06D5 57            STR     DP1     ;
01473 06D6 D4            SEP     CALL    ;DISPLAY HOLD.
01474 06D7 0AD5  )       WORD    DISMSG  ;
01475 06D9 4118  )       BYTE    LO(LEFTA),HOLD  ;
01476 06DB D4            SEP     CALL    ;CONVERT IT AND DISPLAY IT.
01477 06DC 0983  )       WORD    BINBCD  ;
01478 06DE 110035        BYTE    LO(HLDSEC),0,LO(KEYBF4) ;
01479 06E1 D4            SEP     CALL    ;
01480 06E2 0983  )       WORD    BINBCD  ;
01481 06E4 120003        BYTE    LO(HLDMIN),0,LO(BCDRES) ;
01482 06E7 D4            SEP     CALL    ;
01483 06E8 0B4D  )       WORD    DISTIM  ;
01484 06EA D4            SEP     CALL    ;
01485 06EB 0AEA  )       WORD    DISDAT  ;
01486 06ED 3248          BYTE    LO(KEYBF1),LO(RIGHTD)   ;
01487 06EF D4            SEP     CALL    ;
01488 06F0 0B1B  )       WORD    COLON   ;
01489 06F2 46            BYTE    LO(RIGHTB)      ;
01490                    ;
01491                    ;....TEST FOR ALARM TIME ZERO....?
01492                    ;
01493 06F3 FB11    HLDALM LDI    LO(HLDSEC)      ;
01494 06F5 A7            PLO     DP1     ;
01495 06F6 07            LDN     DP1     ;
01496 06F7 CA0710 )      LBNZ    ANADC   ;
01497 06FA 17            INC     DP1     ;POINT TO MINUTES.
01498 06FB 07            LDN     DP1     ;
01499 06FC CA0710 )      LBNZ    ANADC   ;BRANCH IF DATA.
01500                    ;
01501                    ;....THEN TURN ALARM ON....?
01502                    ;
01503 06FF FB2B          LDI     LO(ALMCOM)      ;
01504 0701 A7            PLO     DP1     ;
01505 0702 07            LDN     DP1     ;
01506 0703 F940          ORI     40H     ;SET ALARM ON.
01507 0705 57            STR     DP1     ;
01508 0706 F84C          LDI     LO(FLASH2)      ;
```

```
01509 070B A7                PLO    DP1     ;SET FLASH LAMP ON.
01510 070Y 07                LDN    DP1     ;
01511 070A F940              ORI    40H     ;SET CANCEL LED ON.
01512 070C 57                STR    DP1     ;
01513 070D C00710 )          LBR    ANADC   ;
01514                 ;      UTILITY 1.
01515                 ;
01516                 ;....ADC CONVERSION UTILITY....?
01517                 ;
01518 0710 F809     ANADC    LDI    LO(ADCTIM)  ;
01519 0712 A7                PLO    DP1     ;USE AS ADC TIMER.
01520 0713 07                LDN    DP1     ;
01521 0714 CA07DA )          LBNZ   NOTADC  ;
01522 0717 F80A              LDI    0AH     ;RESET TIMER.
01523 0719 57                STR    DP1     ;
01524 071A 97                GHI    DP1     ;SET DP3 TO RAM.
01525 071B B9                PHI    DP3     ;
01526 071C F82C              LDI    LO(COMWRD)  ;
01527 071E A9                PLO    DP3     ;
01528 071F C907DA )          LBNQ   NOTADC  ;IF ALARM ENERGIZED THEN SKIP.
01529                 ;
01530                 ;....TURN DISPLAY DRIVERS OFF....?
01531                 ;
01532 0722 F840              LDI    LO(DISCMD)  ;
01533 0724 A7                PLO    DP1     ;
01534 0725 F800              LDI    0       ;BLANK DISPLAY DATA.
01535 0727 57                STR    DP1     ;
01536 0728 D4                SEP    CALL    ;SET DISPLAYS OFF.
01537 0729 09F3 )            WORD   SNDMOD  ;
01538 072B 20                BYTE   DISMOD  ;
01539 072C F849              LDI    LO(INDCMD)  ;
01540 072E A7                PLO    DP1     ;
01541 072F F800              LDI    0       ;
01542 0731 57                STR    DP1     ;
01543 0732 D4                SEP    CALL    ;TURN INDICATORS OFF.
01544 0733 09F3 )            WORD   SNDMOD  ;
01545 0735 B0                BYTE   INDMOD  ;
01546 0736 E8                SEX    DP2     ;PUT DATA HERE NG.
01547 0737 F820              LDI    LO(ADCRAW)  ;
01548 0739 A8                PLO    DP2     ;
01549 073A 6C                INP    ADCCNV  ;INITIALIZE ADC.
01550 073B 3C3B ) HERE0      BN1    HERE0   ;LOOP TILL CONVERSION COMP.
01551                 ;
01552                 ;....NOW READ DATA....?
01553                 ;
01554 073D 6C                INP    ADCCNV  ;GET NEW DATA.
01555                 ;
01556                 ;....TURN DISPLAY CONTS BACK ON....?
01557                 ;
01558 073E F840              LDI    LO(DISCMD)  ;
01559 0740 A7                PLO    DP1     ;
01560 0741 F8FF              LDI    0FFH    ;NORMAL OP DATA.
01561 0743 57                STR    DP1     ;
01562 0744 D4                SEP    CALL    ;
01563 0745 0A0D )            WORD   DISWRT  ;
01564 0747 F849              LDI    LO(INDCMD)  ;
01565 0749 A7                PLO    DP1     ;
01566 074A F8FF              LDI    0FFH    ;
01567 074C 57                STR    DP1     ;
01568 074D D4                SEP    CALL    ;
01569 074E 0A25 )            WORD   INDWRT  ;
01570                 ;
01571                 ;....PROCESS ADC DATA....?
01572                 ;
01573 0750 F822              LDI    LO(DEGFM0)  ;
```

```
01574 0752 A7              PLO    DP1         ;POINT TO MEASURED TEMP REGISTER.
01575 0753 F820            LDI    LO(ADCRAW)  ;
01576 0755 A8              PLO    DP2         ;
01577 0756 0B              LDN    DP2         ;RAW ADC DATA.
01578 0757 AF              PLO    BINNUM      ;TEMP STORE.
01579 0758 32C7  )         BZ     BADC00      ;IF 0 ITS SHORTED.
01580 075A FFFF            SMI    0FFH        ;
01581 075C 32C7  )         BZ     BADC00      ;IF FF THEN ITS OPEN.
01582 075E 8F              GLO    BINNUM      ;RAW DATA.
01583 075F FC8C            ADI    8CH         ;
01584 0761 57              STR    DP1         ;SAVE DATA LOW BYTE.
01585 0762 F800            LDI    0           ;HIGH BYTE DATA.
01586 0764 17              INC    DP1         ;POINT TO HIGH.
01587 0765 C7              LSNF               ;DONT LOAD 01 IF DATA <256.
01588 0766 F801            LDI    1           ;GET TEMP HIGH HIGH BYTE.
01589 0768 57              STR    DP1         ;INTO MEAS TEMP REG.
01590 0769 09              LDN    DP3         ;TEST FOR DIAGNOSTICS.
01591 076A FB81            XRI    81H         ;
01592 076C C207DA  )       LBZ    NOTADC      ;
01593 076F F84D            LDI    LO(LMPTWO)  ;
01594 0771 A8              PLO    DP2         ;
01595 0772 0B              LDN    DP2         ;
01596 0773 FA7F            ANI    7FH         ;DATA TO SET BAD PROBE OFF.
01597 0775 5B              STR    DP2         ;
01598 0776 2B              DEC    DP2         ;POINT TO LAMP ONE.
01599 0777 2B              DEC    DP2         ;
01600                      ;
01601                      ;....TEST FOR READY LAMP ILLUMINATION....?
01602                      ;
01603 0778 F826            LDI    LO(RFRYLO)  ;
01604 077A A7              PLO    DP1         ;POINT TO DIFFERENCE TEMP.
01605 077B 07              LDN    DP1         ;GET READY LAMP DIFFERENCE TEMP.
01606 077C BF              PHI    BINNUM      ;TEMP STORE.
01607 077D F821            LDI    LO(FTSTAT)  ;
01608 077F A7              PLO    DP1         ;POINT TO PDEGF ADJUSTED FOR OFFSET.
01609 0780 E7              SEX    DP1         ;
01610 0781 9F              GHI    BINNUM      ;READY DIFF TEMP.
01611 0782 F5              SD                 ;ADJUST.
01612 0783 52              STR    SP          ;PUT IT HERE TEMP.
01613 0784 E2              SEX    SP          ;
01614 0785 8F              GLO    BINNUM      ;ADCRAW.
01615 0786 F5              SD                 ;FTSTAT ADJ-ADCRAW.
01616 0787 E8              SEX    DP2         ;
01617 0788 3B90  )         BL     RDYON       ;IF LESS THAN.
01618 078A F87F            LDI    7FH         ;
01619 078C F2              AND                ;
01620 078D 58              STR    DP2         ;MASK OUT READY LAMP.
01621 078E 3094  )         BR     TSTHI       ;
01622 0790 F880    RDYON   LDI    80H         ;
01623 0792 F1              OR                 ;MERGE READY BIT.
01624 0793 58              STR    DP2         ;
01625 0794 9F      TSTHI   GHI    BINNUM      ;DIFFERENTIAL READY TEMP.
01626 0795 E7              SEX    DP1         ;POINTS TO FTSTAT.
01627 0796 F4              ADD                ;FTSTAT + DIFFERENCE TEMP.
01628 0797 52              STR    SP          ;TEMP SAVE.
01629 0798 E2              SEX    SP          ;
01630 0799 8F              GLO    BINNUM      ;ADC RAW.
01631 079A F5              SD                 ;(FTSTAT+DIFF)-ADCRAW.
01632 079B E8              SEX    DP2         ;
01633 079C 33A4  )         BL     HILTON      ;TURN ON HIGH LIMIT INDICATOR.
01634 079E F8BF            LDI    0BFH        ;HI TMEP IND OFF DATA.
01635 07A0 F2              AND                ;
01636 07A1 58              STR    DP2         ;
01637 07A2 30A8  )         BR     TSTHIA      ;GO TEST FOR ALARM.
01638 07A4 F840    HILTON  LDI    40H         ;TEMP IND BIT.
```

```
01639 07A6 F1              OR                    ;MERGE IT.
01640 07A7 58              STR       DP2         ;SAVE IN LMP 1 DATA.
01641 07A8 FB27   TSTHIA   LDI       LO(RFRYHI)  ;
01642 07AA A7              PLO       DP1         ;
01643 07AB E7              SEX       DP1         ;
01644 07AC 8F              GLO       BINNUM      ;RAW ADC DATA.
01645 07AD F5              SD                    ;
01646 07AE E8              SEX       DP2         ;
01647 07AF 2B              DEC       DP2         ;POINT TO FLASH DATA.
01648 07B0 3BB9 )          BL        HITON       ;
01649 07B2 FBBF            LDI       0BFH        ;DATA TO MASK HIT LMP.
01650 07B4 F2              AND                   ;
01651 07B5 58              STR       DP2         ;
01652 07B6 C007DA )        LBR       NOTADC      ;
01653 07B9 FB40   HITON    LDI       40H         ;
01654 07BB F1              OR                    ;MERGE LAMP ON.
01655 07BC 58              STR       DP2         ;
01656 07BD F82B            LDI       LO(ALMCOM)  ;
01657 07BF A8              PLO       DP2         ;POINT TO ALARM BYTE.
01658 07C0 F880            LDI       80H         ;HIGH TEMP BIT.
01659 07C2 F1              OR                    ;MERGE.
01660 07C3 58              STR       DP2         ;
01661 07C4 C007DA )        LBR       NOTADC      ;
01662 07C7 F800   BADCOO   LDI       0           ;DATA FOR BAD ADC.
01663 07C9 57              STR       DP1         ;
01664 07CA 17              INC       DP1         ;
01665 07CB 57              STR       DP1         ;SET BOTH BYTES TO 0.
01666 07CC 09              LDN       DP3         ;TEST FOR DIAGOP.
01667 07CD FB81            XRI       81H         ;
01668 07CF C207DA )        LBZ       NOTADC      ;
01669 07D2 F84D            LDI       LO(LMPTWO)  ;
01670 07D4 A8              PLO       DP2         ;
01671 07D5 F880            LDI       80H         ;DATA TO SET LAMP ON.
01672 07D7 E8              SEX       DP2         ;
01673 07D8 F1              OR                    ;MERGE.
01674 07D9 58              STR       DP2         ;
01675                      ;
01676                      ;....FLASH LAMPS....?
01677                      ;
01678 07DA F84A   NOTADC   LDI       LO(FLASH1)  ;
01679 07DC A8              PLO       DP2         ;SET POINTER.
01680 07DD F807   FLASH    LDI       LO(FLASHT)  ;
01681 07DF A7              PLO       DP1         ;
01682 07E0 07              LDN       DP1         ;GET FLASH TIMER DATA.
01683 07E1 CA07FB )        LBNZ      KEYIN       ;IF GT 0 THEN SKIP.
01684 07E4 F802            LDI       02          ;RESET TIMER DATA.
01685 07E6 57              STR       DP1         ;RESET TIMER.
01686 07E7 08     INDITR   LDN       DP2         ;
01687 07E8 52              STR       SP          ;FOR LOGICAL OP.
01688 07E9 E2              SEX       SP          ;
01689 07EA 18              INC       DP2         ;POINT TO LAMP DATA.
01690 07EB 08              LDN       DP2         ;
01691 07EC F3              XOR                   ;XOR FLASH DATA WITH LAMP DATA.
01692 07ED 58              STR       DP2         ;
01693 07EE 18              INC       DP2         ;POINT TO NEXT.
01694 07EF 88              GLO       DP2         ;TEST IT.
01695 07F0 FB4E            XRI       LO(LMPTWO)+1
01696 07F2 CA07E7 )        LBNZ      INDITR      ;ITERATE ELSE INC PC.
01697 07F5 D4              SEP       CALL        ;WRITE IND CONTROLLER.
01698 07F6 0A25 )          WORD      INDWRT      ;
01699                      ;
01700                      ;....KEYBOARD READ UTILITY....?
01701                      ;
01702                      ;         FLAG EF2 MONITORS THE DATA AVAILABLE PIN.
```

```
01703                    ;           RAM ASSIGNMENTS ARE:
01704                    ;             NEWKEY=1006
01705                    ;             LSTKEY=1005
01706                    ;
01707 07F8 FB04   KEYIN  LDI    LO(LSTKEY)  ;
01708 07FA A8            PLO    DP2     ;SET POINTER TO LAST KEY REG.
01709 07FB FB05          LDI    LO(NEWKEY)  ;
01710 07FD A7            PLO    DP1     ;SET DATA POINTER TO NEWKEY REG.
01711                    ;
01712                    ;
01713      0B00   )      ORG    800H    ;
01714                    ;
01715                    ;
01716 0800 3D09   )      BN2    GDKEY   ;SKIPT TO GDKEY.
01717 0802 FB80   NOKEY  LDI    80H     ;INVALID DATA.
01718 0804 57            STR    DP1     ;SAVE IN NEWKEY REG.
01719 0805 5B            STR    DP2     ;AND LSTKEY REG.
01720 0806 C00839 )    ? LBR    KEYEXT  ;
01721 0809 E3     GDKEY  SEX    PC      ;FOR IMMED I/O.
01722 080A 00            IDL            ;DEBOUNCE KEY.
01723 080B 61            OUT    PIOCTL  ;SET PORT A AS INPUT.
01724 080C CB            BYTE   LO(PINPRA)  ;
01725 080D 61            OUT    PIOCTL  ;
01726 080E 00            BYTE   LO(ALLINP)  ;
01727 080F 63            OUT    PIOPB   ;SEND KEY ENCODER OUTPUT ENABLE.
01728 0810 10            BYTE   LO(KEYENA)  ;
01729 0811 61            OUT    PIOCTL  ;SEND LATCH CLOCK HI.
01730 0812 56            BYTE   LO(LCLKHI)  ;
01731 0813 61            OUT    PIOCTL  ;SEND LATCH CLK LOW.
01732 0814 46            BYTE   LO(LCLKLO)  ;
01733 0815 E7            SEX    DP1     ;TO WRITE INPUT TO RAM.
01734 0816 6A            INP    PIOPA   ;INPUT KEYBOARD DATA.
01735 0817 FB0F          LDI    0FH     ;
01736 0819 F2            AND            ;
01737 081A 57            STR    DP1     ;
01738 081B E3            SEX    PC      ;IMMED I/O.
01739 081C 63            OUT    PIOPB   ;SEND DATA TO DISABLE KEYREAD.
01740 081D 00            BYTE   LO(IOIDLE)  ;
01741 081E 61            OUT    PIOCTL  ;SEND CLOCK HI.
01742 081F 56            BYTE   LO(LCLKHI)  ;
01743 0820 61            OUT    PIOCTL  ;SEND CLK LO.
01744 0821 46            BYTE   LO(LCLKLO)  ;
01745 0822 61            OUT    PIOCTL  ;SET PORT A OUTPUT.
01746 0823 CB            BYTE   LO(PINPRA)  ;
01747 0824 61            OUT    PIOCTL  ;
01748 0825 FF            BYTE   LO(ALLOUT)  ;
01749                    ;
01750                    ;....DETERMINE VALID KEY DATA....?
01751                    ;
01752 0826 E7            SEX    DP1     ;
01753 0827 0B            LDN    DP2     ;LSTKEY DATA.
01754 0828 F3            XOR            ;TEST FOR NEW KEY.
01755 0829 3A30   )      BNZ    NEWDAT  ;IF NEW DATA THEN BRANCH.
01756 082B FB80          LDI    80H     ;
01757 082D 57            STR    DP1     ;SET DP1 INVALID.
01758 082E 3039   )      BR     KEYEXT  ;
01759 0830 07     NEWDAT LDN    DP1     ;GET NEW DATA.
01760 0831 58            STR    DP2     ;IN LSTKEY REGISTER.
01761                    ;
01762                    ;....SET KEY BEEP SWITCH....?
01763                    ;
01764 0832 F82B          LDI    LO(ALMCOM)  ;
01765 0834 A7            PLO    DP1     ;
01766 0835 FB01          LDI    1       ;BIT TO SET FOR KEY DOWN.
```

```
01767 0837 F1              OR              ;SET THIS BIT IN ALM COMMAND.
01768 0838 57              STR     DP1     ;
01769 0839 DA       KEYEXT SEP     UPC     ;RETURN TO OPERATING SYSTEM.
01770                      ;
01771                      ;....FREQ TEST INTERRUPT 0....?
01772                      ;
01773 083A C4       INT0   NOP             ;DELAY TO INSURE INT PIN HIGH AGAIN.
01774 083B C4              NOP             ;
01775 083C C4              NOP             ;
01776 083D C4              NOP             ;
01777 083E E1              SEX     INT     ;FOR RETURN.
01778 083F 7033             RET    ,33H    ;60 COUNT TO DETERMINE FREQ OF LINE.
01779                      ;
01780                      ;....FREQ TEST INTERRUPT....?
01781                      ;
01782 0841 F865     ) INT1 LDI     LO(FREQTC) ;
01783 0843 A3              PLO     PC      ;BUMP PC PAST COUNT.
01784 0844 303B     )      BR      INT0+1  ;FOR RETURN.
01785                      ;
01786                      ;....INTERRUPT SERVICE PROCEDURE....
01787                      ;
01788 0846 70       EXTINT RET             ;LEAVE INT HERE RESTORE X & P.
01789 0847 22       INTRPT DEC     SP      ;POINT TO FREE LOCATION.
01790 0848 78              SAV             ;SAVE X AND P ON STACK.
01791 0849 22              DEC     SP      ;NEXT FREE LOCATION.
01792 084A 73              STXD            ;SAVE D.
01793 084B 76              SHRC            ;SHIFT DF INTO D.
01794 084C 73              STXD            ;SAVE BYTE CONTAINING DF.
01795 084D 87              GLO     DP1     ;SAVE CONTENTS OF DP1.
01796 084E 73              STXD            ;
01797 084F 97              GHI     DP1     ;
01798 0850 73              STXD            ;
01799 0851 88              GLO     DP2     ;
01800 0852 73              STXD            ;
01801 0853 98              GHI     DP2     ;
01802 0854 73              STXD            ;
01803                      ;
01804 0855 FB10            LDI     HI(RAMTOP) ;
01805 0857 B7              PHI     DP1     ;INSURE POINTERS IN RAM.
01806 0858 B8              PHI     DP2     ;
01807                      ;
01808                      ;....REAL TIME TICK SERVICE....?
01809                      ;
01810 0859 F813            LDI     LO(RTCTIC) ;
01811 085B A7              PLO     DP1     ;POINT TO LINE FREQ TICK REGISTER.
01812 085C 07              LDN     DP1     ;GET DATA INTO D.
01813 085D FF01            SMI     1       ;DECREMENT IT.
01814 085F 57              STR     DP1     ;
01815 0860 FE              SHL             ;SHIFT BIT 7 (FLAG) OUT.
01816 0861 3ABA     )      BNZ     NOTSEC  ;IF GT 0 THEN SKIP-
01817 0863 FB06            LDI     HZ60    ;ELSE RESET TIMER.
01818 0865 3B69     )      BNF     HERT60  ;IF NO FLAG GO.
01819 0867 FB85            LDI     HZ50    ;ELSE ITS A 50 HERTZ LINE.
01820 0869 57       HERT60 STR     DP1     ;
01821                      ;
01822                      ;....DECREMENT 0.1 SECOND TIMERS....?
01823                      ;
01824 086A F807            LDI     LO(FLASHT) ;
01825 086C A8              PLO     DP2     ;0.1 SEC TICK ADDRESS.
01826 086D 08       TICLOP LDN     DP2     ;GET DATA FROM TIC REGISTER.
01827 086E CE              LSZ             ;DONT DEC IF 0.
01828 086F FF01            SMI     1       ;FOR DECREMENT.
01829 0871 5B              STR     DP2     ;STORE ADJUSED TICK.
01830 0872 18              INC     DP2     ;POINT TO NEXT TIC TIMER.
```

```
01831 0873 B8              GLO     DP2       ;FOR TESTING.
01832 0874 FB0E            XRI     LO(SECTIC)+1   ;
01833 0876 3A6D  )         BNZ     TICLOP    ;IF 0 THEN IN PC ELSE LOOP.
01834 0878 28              DEC     DP2       ;POINT TO SECTIC.
01835 0879 08              LDN     DP2       ;GET SECTIC DATA.
01836 087A 3ABA  )         BNZ     NOTSEC    ;IF ZERO THEN DO SECONDS PROCEDURE.
01837 087C FB0A            LDI     0AH       ;LOAD SECTIC FOR 10.01 SEC COUNTS.
01838 087E 58              STR     DP2       ;
01839                 ;
01840                 ;....DECREMENT SECONDS TIMERS....?
01841                 ;
01842 087F 18              INC     DP2       ;POINT TO SECTIM REGISTER.
01843 0880 08              LDN     DP2       ;GET DATA.
01844 0881 3286  )         BZ      DECTWO    ;DON^'T DEC IF ZERO.
01845 0883 FF01            SMI     1         ;DECREMENT DATA.
01846 0885 58              STR     DP2       ;STORE ADJUSTED DATA.
01847                 ;
01848                 ;....DECREMENT HOLD TIMER....?
01849                 ;
01850 0886 F811   DECTWO   LDI     LO(HLDSEC)   ;
01851 0888 AB              PLO     DP2       ;POINT TO HOLD TIMER.
01852 0889 08              LDN     DP2       ;GET SECONDS DATA.
01853 088A 3A96  )         BNZ     DECSEC    ;60 IT GT DONT DO MINUTES.
01854 088C 18              INC     DP2       ;POINT TO MINUTES TIMERS.
01855 088D 08              LDN     DP2       ;GET THE DATA.
01856 088E 3299  )         BZ      HLD00     ;LET THE TIMER STOP AT 0.
01857 0890 FF01            SMI     1         ;DECREMENT MINUTES DATA.
01858 0892 58              STR     DP2       ;SAVE IT FOR DISPLAY.
01859 0893 2B              DEC     DP2       ;BACK TO SECONDS.
01860 0894 F83C            LDI     3CH       ;RESET DATA.
01861 0896 FF01   DECSEC   SMI     1         ;DECREMENT SECONDS DATA.
01862 0898 58              STR     DP2       ;SAVE IT.
01863                 ;
01864                 ;....SERVICE UPCTR....?
01865                 ;
01866 0899 F80F   HLD00    LDI     LO(UPSEC)    ;
01867 089B A8              PLO     DP2       ;
01868 089C 08              LDN     DP2       ;SECONDS DATA.
01869 089D FC01            ADI     1         ;INC SEC.
01870 089F 58              STR     DP2       ;SAVE IT.
01871 08A0 FF3C            SMI     3CH       ;TEST FOR 60DH.
01872 08A2 3BBA  )         BNF     NOTSEC    ;IF
01873 08A4 FB00            LDI     0         ;ELSE RESET SECONDS.
01874 08A6 58              STR     DP2       ;
01875 08A7 1B              INC     DP2       ;POINT TO MINUTES.
01876 08A8 08              LDN     DP2       ;
01877 08A9 FC01            ADI     1         ;INCREMENT MINUTES.
01878 08AB 58              STR     DP2       ;
01879 08AC FF3C            SMI     3CH       ;TEST FOR 60 MINUTES.
01880 08AE 3BBA  )         BNF     NOTSEC    ;
01881 08B0 F800            LDI     0         ;RESET MINUTES.
01882 08B2 58              STR     DP2       ;
01883 08B3 FB4E            LDI     LO(UPHUR)    ;
01884 08B5 A7              PLO     DP1       ;POINT TO HOURS DATA.
01885 08B6 07              LDN     DP1       ;
01886 08B7 FC01            ADI     1         ;
01887 08B9 57              STR     DP1       ;
01888                 ;
01889                 ;....TERMINATE INTERRUPT PROCEDURE....?
01890                 ;
01891 08BA E2     NOTSEC   SEX     SP        ;SE?X TO STACK POINTER.
01892 08BB 60              IRX               ;FOR DECREMENT AT START.
01893 08BC 72              LDXA              ;GET SAVED DATA.
01894 08BD B8              PHI     DP2       ;RESTORE DATA POINTER.
01895 08BE 72              LDXA              ;
```

```
01896 08BF A8                PLO     DP2     ;BOTH DATA POINTERS.
01897 08C0 72                LDXA            ;
01898 08C1 B7                PHI     DP1     ;
01899 08C2 72                LDXA            ;GET BYTE HOLDING DF.
01900 08C3 A7                PLO     DP1     ;
01901 08C4 72                LDXA            ;
01902 08C5 FE                SHL             ;RESTORE DF.
01903 08C6 72                LDXA            ;GET SAVED DATA FOR D.
01904 08C7 3046    )         BR      EXTINT  ;BRANCH TO SET UP R1 PROPERLY.
01905                        ;
01906                        ;....1802 CALL ROUTINE....?
01907                        ;
01908 08C9 D3       CALEXT   SEP     PC      ;LEAVE R4 HERE.
01909                        ;
01910 08CA E2       CALPGM   SEX     SP      ;SET X TO STACK POINTER.
01911 08CB 96                GHI     LINK    ;SAVE CONTENTS OF R6 ON STACK.
01912 08CC 73                STXD            ;
01913 08CD 86                GLO     LINK    ;BOTH BYTES.
01914 08CE 73                STXD            ;
01915                        ;
01916 08CF 93                GHI     PC      ;GET PC CONTENTS INTO LINKING REGISTER.
01917 08D0 B6                PHI     LINK    ;
01918 08D1 83                GLO     PC      ;
01919 08D2 A6                PLO     LINK    ;
01920                        ;
01921 08D3 46                LDA     LINK    ;GET SUBROUTINE ADDRESS.
01922 08D4 B3                PHI     PC      ;INTO PC.
01923 08D5 46                LDA     LINK    ;
01924 08D6 A3                PLO     PC      ;
01925                        ;
01926 08D7 C008C9  )         LBR     CALEXT  ;GO SET UP R4 PROPERLY.
01927                        ;
01928                        ;....1802 RETURN ROUTINE....?
01929                        ;
01930 08DA D3       EXTRTN   SEP     PC      ;LEAVE R5 HERE.
01931                        ;
01932 08DB 96       RETPGM   GHI     LINK    ;THIS IS THE RETURN ADDRESS.
01933 08DC B3                PHI     PC      ;GET IT INTO PC.
01934 08DD 86                GLO     LINK    ;
01935 08DE A3                PLO     PC      ;
01936                        ;
01937 08DF E2                SEX     SP      ;SET X TO STACK POINTER.
01938 08E0 60                IRX             ;POINT TO DATA.
01939 08E1 72                LDXA            ;GET SAVED LINK.
01940 08E2 A6                PLO     LINK    ;RESTORE.
01941 08E3 F0                LDX             ;
01942 08E4 B6                PHI     LINK    ;
01943 08E5 30DA   )          BR      EXTRTN  ;GO SET UP R5 PROPERLY.
01944                        ;
01945                        ;....CALL CANHLD....
01946                        ;
01947 08E7 FB2B     CANHLD   LDI     LO(ALMCOM)      ;
01948 08E9 A8                PLO     DP2     ;
01949 08EA 08                LDN     DP2     ;
01950 08EB FABF             ANI     0BFH    ;MASK OUT HOLD ALARM.
01951 08ED 5B                STR     DP2     ;
01952 08EE F94C             LDI     LO(FLASH2)      ;
01953 08F0 A8                PLO     DP2     ;
01954 08F1 08                LDN     DP2     ;
01955 08F2 FABF             ANI     0BFH    ;MASK OUT HOLD LAMP.
01956 08F4 58                STR     DP2     ;
01957 08F5 1B                INC     DP2     ;POINT TO LAMP TWO.
01958 08F6 08                LDN     DP2     ;
01959 08F7 FABF             ANI     0BFH    ;MASK OUT LAMP.
```

```
01960 08F9 5B              STR     DP2     ;
01961 08FA D5              SEP     RETN    ;
01962                      ;
01963                      ;....CALL BLNKAL....?
01964                      ;
01965 08FB D4      BLNKAL  SEP     CALL    ;
01966 08FC 0B2B )          WORD    BLANKD  ;
01967 08FE 41              BYTE    LO(LEFTA)       ;
01968 08FF D4              SEP     CALL    ;
01969 0900 0B2B )          WORD    BLANKD  ;
01970 0902 45              BYTE    LO(RIGHTA)      ;
01971 0903 D5              SEP     RETN    ;
01972                      ;
01973                      ;....CALL FRYRIO....?
01974                      ;
01975 0904 EB      FRYRIO  SEX     DP2     ;FOR I/O.
01976 0905 63              OUT     PIOPB   ;SEND DATA TO I/O LATCH.
01977 0906 E3              SEX     PC      ;IMMED I/O.
01978 0907 61              OUT     PIOCTL  ;SEND FRYER I/O LATCH CLK HIGH.
01979 0908 AA              BYTE    LO(FIOCK1)      ;
01980 0909 61              OUT     PIOCTL  ;SEND CLOCK LOW.
01981 090A BA              BYTE    LO(FIOCK0)      ;
01982 090B D5              SEP     RETN    ;
01983                      ;
01984                      ;....CALL PROINC....?
01985                      ;
01986 090C F82C    PROINC  LDI     LO(COMWRD)      ;
01987 090E A7              PLO     DP1     ;
01988 090F 07              LDN     DP1     ;
01989 0910 FC01            ADI     1       ;FOR INCREMENT.
01990 0912 57              STR     DP1     ;
01991 0913 D5              SEP     RETN    ;
01992                      ;
01993                      ;....CALL DISBUF....?
01994                      ;
01995                      ;DISPLAY KEY BUFFER IN RIGHT DISPLAY.
01996 0914 D4      DISBUF  SEP     CALL    ;
01997 0915 0AEA )          WORD    DISDAT  ;
01998 0917 3248            BYTE    LO(KEYBF1),LO(RIGHTD)   ;
01999 0919 D5              SEP     RETN    ;
02000                      ;
02001                      ;....CALL BUFRES....?
02002                      ;
02003                      ;RESET THE BUFFER ALL ZERO AND BLANK RIGHT DISPLAY.
02004                      ;
02005 091A D4      BUFRES  SEP     CALL    ;
02006 091B 0922 )          WORD    CLRBUF  ;
02007 091D D4              SEP     CALL    ;
02008 091E 0B2B )          WORD    BLANKD  ;
02009 0920 45              BYTE    LO(RIGHTA)      ;
02010 0921 D5              SEP     RETN    ;
02011                      ;
02012                      ;....CALL CLRBUF....?
02013                      ;
02014                      ;               SEP     CALL    ;
02015                      ;               WORD    CLRBUF  ;
02016                      ;                       USES KEYPTR TO WRITE KEY BUFFER ZERO.
02017                      ;                       ON EXIT KEYPTR POINTS TO KEYBF1.
02018                      ;
02019 0922 F835    CLRBUF  LDI     LO(KEYBF4)      ;
02020 0924 AD              PLO     KEYPTR  ;
02021 0925 ED              SEX     KEYPTR  ;CUT LOOP TIME ONE INSTRUCTION CYCLE.
02022 0926 F800    B?00    LDI     0       ;
02023 092B 73              STXD            ;WRITE RAM 0 AND DEC PTR.
02024 0929 8D              GLO     KEYPTR  ;FOR FINISH TEST.
```

```
02025 092A FB31            XRI     LO(KEYBF1)-1    ;
02026 092C CA0926  )       LBNZ    BUF00           ;IF NOT DONE THEN LOOP.
02027 092F 1D              INC     KEYPTR          ;POINT TO FIRST LOCATION.
02028 0930 D5              SEP     RETN            ;ELSE RETURN.
02029                  ;
02030                  ;....CALL SHFTBF....?
02031                  ;
02032                  ;       SEP     CALL    ;
02033                  ;       WORD    SHFTBF  ;
02034                  ;       USES KEYPTR AND STACK TO SHIFT BUFFER ONE BYTE LEFT.
02035                  ;       ON EXIT KEYPTR POINTS TO KEYBF1, KEYBUF4 LOST KEYBUF1 ALWAYS ZERO.
02036                  ;
02037 0931 FB32   SHFTBF  LDI     LO(KEYBF1)      ;
02038 0933 AD             PLO     KEYPTR          ;POINT TO LSB OF BUFFER.
02039 0934 4D     SAVBUF  LDA     KEYPTR          ;GET BYTE AND INC POINTER.
02040 0935 73             STXD                    ;SAVE IT ON THE STACK.
02041 0936 8D             GLO     KEYPTR          ;TEST FOR ALL 3 SAVED (WE LOSE #4).
02042 0937 FB35           XRI     LO(KEYBF4)      ;
02043 0939 CA0934  )      LBNZ    SAVBUF          ;IF POINTER NOT AT 4 THEN LOOP.
02044 093C D4             SEP     CALL            ;ELSE CLEAR THE BUFFER.
02045 093D 0922   )       WORD    CLRBUF          ;
02046 093F F835           LDI     LO(KEYBF4)      ;
02047 0941 AD             PLO     KEYPTR          ;
02048 0942 60             IRX                     ;INC STACK POINTER (CORRECT FOR LAST DEC).
02049 0943 72     RESBUF  LDXA                    ;RESTORE BUFFER GET DATA FROM STACK.
02050 0944 5D             STR     KEYPTR          ;SAVE IT IN KEYBUF.
02051 0945 2D             DEC     KEYPTR          ;POINT TO NEXT.
02052 0946 8D             GLO     KEYPTR          ;TEST FINISHED.
02053 0947 FB32           XRI     LO(KEYBF1)      ;
02054 0949 3A43   )       BNZ     RESBUF          ;IF POINTER NOT AT 1 THEN LOOP.
02055 094B 22             DEC     SP              ;CORRECT FOR LAST LDXA.
02056 094C D5             SEP     RETN            ;ELSE RETURN.
02057                  ;
02058                  ;....CALL BCDBIN....?
02059                  ;
02060                  ;       SEP     CALL    ;
02061                  ;       WORD    BCDBIN,[DATA ADDRESS]   ;
02062                  ;       BYTE    00      ;IF ONLY TWO BYTES..ELSE N FOR THREE.
02063                  ;       DATA ADDRESS IS LS BYTE INCREMENT TO MS BYTE.
02064                  ;       ON RETURN BINARY NUMBER IS IN EDAT01(LSB) AND
02065                  ;       EDAT02 (MSB). USES DATA POINTER DP2.
02066                  ;
02067 094D FB00   BCDBIN  LDI     0               ;INITILIZE.
02068 094F BF             PHI     BINNUM          ;
02069 0950 46             LDA     LINK            ;GET ADDRESS OF DATA.
02070 0951 A8             PLO     DP2             ;INTO POINTER.
02071 0952 48             LDA     DP2             ;THIS IS BINARY DATA (BCD UNITS).
02072 0953 AF             PLO     BINNUM          ;STROE.
02073 0954 48             LDA     DP2             ;GET TENS DATA.
02074 0955 AE             PLO     TENCTR          ;STORE FOR MANIPULATION.
02075 0956 8E     ADDTEN  GLO     TENCTR          ;TEST.
02076 0957 3264   )       BZ      ADD100          ;DO NEXT.
02077 0959 2E             DEC     TENCTR          ;COUNT THE TENS DOWN.
02078 095A 8F             GLO     BINNUM          ;FOR ADD.
02079 095B FC0A           ADI     0AH             ;ADD TEN.
02080 095D AF             PLO     BINNUM          ;RETURN.
02081 095E 9F             GHI     BINNUM          ;ADD HIGH BYTE.
02082 095F 7C00           ADCI    0               ;TO GET CARRY.
02083 0961 BF             PHI     BINNUM          ;RESULT HIGH BYTE.
02084 0962 3056   )       BR      ADDTEN          ;LOOP.
02085 0964 06     ADD100  LDN     LINK            ;TEST FOR TWO OR THREE BCD DIGITS.
02086 0965 3277   )       BZ      BCDFIN          ;IF ZERO THEN SKIP 100S.
02087 0967 08             LDN     DP2             ;GET ADD 100S DATA.
02088 0968 AE             PLO     TENCTR          ;SAVE FOR MANIPULATION.
```

```
02089 0969 BE           LOP100 GLO      TENCTR    ;TEST.
02090 096A 3277  )             BZ       BCDFIN    ;
02091 096C 2E                  DEC      TENCTR    ;COUNT 100S DOWN.
02092 096D 8F                  GLO      BINNUM    ;FOR ADD.
02093 096E FC64                ADI      64H       ;ADD 100.
02094 0970 AF                  PLO      BINNUM    ;RETURN DATA.
02095 0971 9F                  GHI      BINNUM    ;ADD HIGH BYTE.
02096 0972 7C00                ADCI     0         ;THROUGH CARRY.
02097 0974 BF                  PHI      BINNUM    ;
02098 0975 3069  )             BR       LOP100    ;GET MORE 64S.
02099 0977 FB2E         BCDFIN LDI      LO(EDAT01)     ;TO STORE DATA.
02100 0979 A8                  PLO      DP2       ;
02101 097A BF                  GLO      BINNUM    ;LSB OUT FIRST.
02102 097B 58                  STR      DP2       ;
02103 097C 46                  LDA      LINK      ;ONE OR TWO BYTES.
02104 097D 3282  )             BZ       CDBFIN    ;
02105 097F 18                  INC      DP2       ;POINT TO EDAT02.
02106 0980 9F                  GHI      BINNUM    ;MSB
02107 0981 58                  STR      DP2       ;
02108 0982 D5           CDBFIN SEP      RETN      ;RETURN.
02109                   ;
02110                   ;....CALL BINBCD....?
02111                   ;
02112                   ;              SEP      CALL      ;
02113                   ;              WORD     BINBCD,[DATA ADDRESS]   ;
02114                   ;              BYTE     [NUMBER OF BYTES 0=1, N=2]     ;
02115                   ;              WORD     [DESTINATION ADDRESS OF RESULTS];
02116                   ;              ON EXIT DP2 POINTS TO HIGH BYTE DEC DP2 TO LOW.
02117                   ;              USES BOTH DP1 AND DP2 POINTERS.
02118                   ;
02119 0983 FB00         BINBCD LDI      0         ;INITILIZE FOR SINGLE BYTE DATA.
02120 0985 BF                  PHI      BINNUM    ;
02121 0986 46                  LDA      LINK      ;GET ADDRESS OF DATA.
02122 0987 A7                  PLO      DP1       ;
02123 0988 47                  LDA      DP1       ;GET THE DATA.
02124 0989 AF                  PLO      BINNUM    ;INTO BINNUM REGISTER.
02125 098A 46                  LDA      LINK      ;GET NUMBER OF BYTES.
02126 098B 328F  )             BZ       STRCON    ;IF ZERO THEN START.
02127 098D 07                  LDN      DP1       ;GET SECOND BYTE.
02128 098E BF                  PHI      BINNUM    ;
02129 098F 46           STRCON LDA      LINK      ;DESTINATION ADDRESS.
02130 0990 A8                  PLO      DP2       ;
02131 0991 F804                LDI      4         ;
02132 0993 AC                  PLO      CR        ;
02133 0994 FB00         RAM00  LDI      0         ;INITIALIZE RESULT RAM TO 0.
02134 0996 58                  STR      DP2       ;
02135 0997 28                  DEC      DP2       ;POINT TO NEXT.
02136 0998 2C                  DEC      CR        ;COUNT DOWN.
02137 0999 BC                  GLO      CR        ;TEST FOR FINISH.
02138 099A 3A94  )             BNZ      RAM00     ;IF NOT 0 THEN LOOP.
02139 099C 18                  INC      DP2       ;POINT TO LOWEST LOCATION A 1000.
02140 099D F800         CBD0   LDI      0         ;INITIALIZE REGISTER.
02141 099F BE                  PHI      TENCTR    ;
02142 09A0 AE                  PLO      TENCTR    ;
02143 09A1 8F           CBD1   GLO      BINNUM    ;GET FIRST BINARY BYTE.
02144 09A2 FF0A                SMI      0AH       ;IS IT GREATER THAN 10.
02145 09A4 AF                  PLO      BINNUM    ;SAVE RESULT.
02146 09A5 3BAA  )             BNF      LESTHN    ;BRANCH IF LESS THAN 10.
02147 09A7 1E                  INC      TENCTR    ;THERE WAS A 10 IN THERE.
02148 09A8 30A1  )             BR       CBD1      ;LOOK FOR MORE 10S.
02149 09AA CE           LESTHN LSZ                ;IF D=0 DONT RESTORE.
02150 09AB FC0A                ADI      0AH       ;LESS THAN 0 SO RESTORE.
02151 09AD AF                  PLO      BINNUM    ;RESTORE DATA IN BINNUM LOW.
02152 09AE 9F                  GHI      BINNUM    ;FOR TEST.
```

```
02153 09AF 32BB    )              BZ      HBYTE0   ;BRANCH IF THIS BYTE 0.
02154 09B1 FF01                   SMI     1        ;SUBTRACT 1.
02155 09B3 BF                     PHI     BINNUM   ;PUT DATA BACK.
02156 09B4 8F                     GLO     BINNUM   ;FOR SUBTRACT NUMBER 10.
02157 09B5 FF0A                   SMI     0AH      ;SUBTRACT 10 FROM LOW BYTE.
02158 09B7 AF                     PLO     BINNUM   ;
02159 09B8 1E                     INC     TENCTR   ;FOR THAT LAST TEN.
02160 09B9 30A1    )              BR      CBD1     ;ELSE GO FOR MORE ITERATIONS.
02161 09BB 8F        HBYTE0       GLO     BINNUM   ;THIS IS BCD DATA.
02162 09BC 5B                     STR     DP2      ;LEAST SIG BYTE OUT FIRST.
02163 09BD 1B                     INC     DP2      ;NET LOCATION.
02164 09BE 8E                     GLO     TENCTR   ;TEST FOR FINISHED.
02165 09BF 3AC2    )              BNZ     DOMOR    ;
02166 09C1 D5                     SEP     RETN     ;WERE DONE SO RETURN.
02167 09C2 AF        DOMOR        PLO     BINNUM   ;FOR MORE ITERATIONS.
02168 09C3 309D    )              BR      CBD0     ;GO FOR MORE ITERATIONS.
02169                             ;
02170                             ;....CALL EARWRT....?
02171                             ;
02172                             ;            SEP     CALL    ;
02173                             ;            WORD    EARWRT  ;
02174                             ;            BYTE    [NUMBER OF BYTES]    ;
02175                             ;            WORD    [ORIGIN ADDRESS (DATA TO WRITE)]    ;
02176                             ;            BYTE    [EAROM ADDRESS]    ;
02177                             ;            ON EXIT DP1 POINTS TO LAST BYTE WRITTEN +1 AND DP2
02178                             ;            POINTS TO EARDEX +1.
02179                             ;
02180 09C5 F850     EARWRT        LDI     LO(WRKRAM)   ;
02181 09C7 AB                     PLO     DP2      ;POINT TO A WRKRAM REG.
02182 09C8 46                     LDA     LINK     ;NUMBER OF BYTES TO WRITE.
02183 09C9 AC                     PLO     CR       ;COUNT BYTES WRITTEN.
02184 09CA 46                     LDA     LINK     ;ORIGIN DATA ADDRESS.
02185 09CB A7                     PLO     DP1      ;
02186 09CC 46                     LDA     LINK     ;ADDRESS IN EAROM.
02187 09CD 3AD0    )              BNZ     ERWRIT   ;DONT LOAD INDEX.
02188 09CF 80                     GLO     CPUWRK   ;THIS I INDEX TO RECIPE.
02189 09D0 FB80     ERWRIT        XRI     80H      ;COMPLIMENT BIT 7 (MODE).
02190 09D2 AF                     PLO     BINNUM   ;SAVE FOR INCREMENT.
02191 09D3 5B                     STR     DP2      ;FOR I/O.
02192 09D4 EB                     SEX     DP2      ;TO SEND ADDRESS.
02193 09D5 63                     OUT     PIOPB    ;SEND ADDRESS + MODE BIT.
02194 09D6 2B                     DEC     DP2      ;RESET.
02195 09D7 E3                     SEX     PC       ;FOR IMMEDIATE I/O.
02196 09D8 61                     OUT     PIOCTL   ;SEND CS VIA PIO CONTROL REG.
02197 09D9 AB                     BYTE    LO(EARSEL)   ;DATA.
02198 09DA 00                     IDL              ;TIME KEEPING WHILE DELAYING.
02199 09DB 00                     IDL              ;
02200 09DC 00                     IDL              ;
02201 09DD 00                     IDL              ;
02202 09DE 61                     OUT     PIOCTL   ;SEND DESELECT DATA.
02203 09DF BB                     BYTE    LO(DESEL)    ;DATA.
02204 09E0 8F                     GLO     BINNUM   ;WAS THAT ERASE OR WRITE.
02205 09E1 FE                     SHL              ;IF ERASE THEN THAT BIT IN DF IS HIGH.
02206 09E2 C7                     LSNF             ;IF F LOW THEN DONT OUTPUT DATA.
02207 09E3 E7                     SEX     DP1      ;FOR I/O.
02208 09E4 62                     OUT     PIOPA    ;SEND DATA TO BE WRITTEN & INC POINTER.
02209 09E5 BF                     GLO     BINNUM   ;GET READY TO GO AGAIN.
02210 09E6 C309D0  )              LBDF    ERWRIT   ;HIGH THEN GO WRITE, THAT WAS ERASE.
02211 09E9 2C                     DEC     CR       ;ONE DONE.
02212 09EA 8C                     GLO     CR       ;IF ZERO.
02213 09EB 32F2    )              BZ      WRTFIN   ;THEN WERE DONE.
02214 09ED 1F                     INC     BINNUM   ;ELSE - NEXT EAROM ADD.
02215 09EE BF                     GLO     BINNUM   ;MUST HAVE THIS DATA READY.
02216 09EF C009D0  )              LBR     ERWRIT   ;FINALLY!!
02217 09F2 D5       WRTFIN        SEP     RETN     ;FINALLY!!!
```

```
02218                   ;
02219                   ;....CALL SNDMOD....?
02220                   ;
02221 09F3 E6    SNDMOD  SEX    LINK    ;FOR DATA I/O.
02222 09F4 63            OUT    PIOPB   ;SEND MODE BIT.
02223 09F5 E3            SEX    PC      ;IMMEDIATE I/O.
02224 09F6 61            OUT    PIOCTL  ;SEND LATCH CLOCK LOW.
02225 09F7 56            BYTE   LO(LCLKHI)  ;
02226 09F8 61            OUT    PIOCTL  ;SEND LATCH CLOCK HIGH.
02227 09F9 46            BYTE   LO(LCLKLO)  ;
02228 09FA E7            SEX    DP1     ;I/O POINTER.
02229 09FB 62            OUT    PIOPA   ;SEND COMMAND BYTE.
02230 09FC E3            SEX    PC      ;IMMEDIATE I/O.
02231 09FD 61            OUT    PIOCTL  ;SEND DISPLAY CLOCK LOW.
02232 09FE 44            BYTE   LO(DCLKLO)  ;
02233 09FF 61            OUT    PIOCTL  ;SEND DISPLAY CLOCK HIGH.
02234 0A00 54            BYTE   LO(DCLKHI)  ;
02235 0A01 F800          LDI    0       ;DATA TO RESET LATCH.
02236 0A03 52            STR    SP      ;INTO STACK FOR I/O.
02237 0A04 E2            SEX    SP      ;
02238 0A05 63            OUT    PIOPB   ;SEND RESET DATA .
02239 0A06 22            DEC    SP      ;CORRECT FOR I/O.
02240 0A07 E3            SEX    PC      ;
02241 0A08 61            OUT    PIOCTL  ;
02242 0A09 56            BYTE   LO(LCLKHI)  ;
02243 0A0A 61            OUT    PIOCTL  ;SEND LATCH CLOCK HIGH.
02244 0A0B 46            BYTE   LO(LCLKLO)  ;
02245 0A0C D5            SEP    RETN    ;
02246                   ;
02247                   ;....DISPLAY WRITE ROUTINE....?
02248                   ;
02249 0A0D FB40   DISWRT LDI    LO(DISCMD)  ;
02250 0A0F A7            PLO    DP1     ;SET POINTER TO DATA.
02251 0A10 D4            SEP    CALL    ;SET MODE BIT SEND CMD BYTE.
02252 0A11 09F3          WORD   SNDMOD  ;SELECT 7 SEG CONTROLLER.
02253 0A13 20            BYTE   DISMOD  ;
02254 0A14 E7    DISSND  SEX    DP1     ;DATA I/O POINTER TO DP1.
02255 0A15 62            OUT    PIOPA   ;SEND DATA.
02256 0A16 E3            SEX    PC      ;IMMEDIATE I/O.
02257 0A17 61            OUT    PIOCTL  ;SEND DISPLAY CLK LOW.
02258 0A18 44            BYTE   LO(DCLKLO)  ;
02259 0A19 61            OUT    PIOCTL  ;SEND DISPLAY CLK HIGH.
02260 0A1A 54            BYTE   LO(DCLKHI)  ;
02261 0A1B 87            GLO    DP1     ;TEST POINTER FOR NINE BYTES SENT.
02262 0A1C FB49          XRI    LO(DISCMD)+9  ;
02263 0A1E C20A24        LBZ    DONE    ;MAYBE DONE.
02264 0A21 C00A14        LBR    DISSND  ;ELSE SEND THE REMAINDER.
02265 0A24 D5    DONE    SEP    RETN    ;RETURN.
02266                   ;
02267                   ;....CALL INDWRT....?
02268                   ;....INDICATOR CONTROLLER DECODE....?
02269                   ;              THIS ROUTINE UTILIZED TO DECODE BIT DATA.
02270                   ;              IN INDICATOR REGISTERS TO DATA FOMATTED.
02271                   ;              FOR INDICATOR CONTROLLER UTILIZATION.
02272                   ;
02273 0A25 F850   INDWRT LDI    LO(WRKRAM)  ;
02274 0A27 A8            PLO    DP2     ;SET POINTER TO WORK REGS.
02275 0A28 FB49          LDI    LO(INDCMD)  ;
02276 0A2A A7            PLO    DP1     ;SET THIS POINTER TO DATA.
02277 0A2B 07            LDN    DP1     ;MOVE DATA TO WORKRAM.
02278 0A2C 58            STR    DP2     ;
02279 0A2D 18    DECAGN  INC    DP2     ;POINT TO NEXT.
02280 0A2E 17            INC    DP1     ;
02281 0A2F 17            INC    DP1     ;
02282 0A30 F800          LDI    0       ;RESET WRKRAM BYTE.
```

```
02283 0A32 5B                STR    DP2     ;
02284 0A33 E8                SEX    DP2     ;FOR LOGICAL OPS.
02285 0A34 07                LDN    DP1     ;GET LAMP DATA.
02286 0A35 FE                SHL            ;SHIFT BIT 7 TO DF.
02287 0A36 52                STR    SP      ;TEMP SAVE.
02288 0A37 C30A3E )          LBDF   NLOAD7  ;NO LOAD IF 7 SET.
02289 0A3A FB80               LDI    80H     ;DATA TO DISABLE BIT 7 LED.
02290 0A3C F1                 OR             ;MERGE WRKRAM DP2 POINTER.
02291 0A3D 5B                 STR    DP2    ;SAVE HERE.
02292 0A3E 02      NLOAD7    LDN    SP      ;RESTORE D.
02293 0A3F FE                SHL            ;TEST NEXT BIT.
02294 0A40 52                STR    SP      ;TEMP SAVE.
02295 0A41 3B47 )            BNF    NLOAD6  ;
02296 0A43 FB04              LDI    4       ;DATA TO SET G SEG.
02297 0A45 F1                OR             ;MERGE IT.
02298 0A46 5B                STR    DP2     ;SAVE IT.
02299 0A47 02      NLOAD6    LDN    SP      ;RESTORE D.
02300 0A48 FE                SHL            ;TEST BIT 5.
02301 0A49 52                STR    SP      ;TEMP SAVE.
02302 0A4A 3B50 )            BNF    NLOAD5  ;
02303 0A4C FB02              LDI    2       ;DATA TO SET F SEG.
02304 0A4E F1                OR             ;MERGE IT.
02305 0A4F 5B                STR    DP2     ;SAVE IT.
02306 0A50 02      NLOAD5    LDN    SP      ;RESTORE.
02307 0A51 FE                SHL            ;TEST BIT 4.
02308 0A52 52                STR    SP      ;TEMP SAVE.
02309 0A53 3B59 )            BNF    NLOAD4  ;
02310 0A55 FB08              LDI    8       ;DATA TO SET E SEG.
02311 0A57 F1                OR             ;MERGE IT.
02312 0A58 5B                STR    DP2     ;SAVE IT.
02313 0A59 02      NLOAD4    LDN    SP      ;RESTORE.
02314 0A5A FE                SHL            ;TEST BIT 3.
02315 0A5B 52                STR    SP      ;TEMP SAVE.
02316 0A5C 3B62 )            BNF    NLOAD3  ;
02317 0A5E FB01              LDI    1       ;DATA TO SET D SEG.
02318 0A60 F1                OR             ;MERGE IT.
02319 0A61 5B                STR    DP2     ;SAVE IT.
02320 0A62 02      NLOAD3    LDN    SP      ;RESTORE.
02321 0A63 FE                SHL            ;TEST BIT 2.
02322 0A64 52                STR    SP      ;TEMP SAVE.
02323 0A65 3B6B )            BNF    NLOAD2  ;
02324 0A67 FB10              LDI    10H     ;DATA TO SET C SEG.
02325 0A69 F1                OR             ;MERGE IT.
02326 0A6A 5B                STR    DP2     ;SAVE IT.
02327 0A6B 02      NLOAD2    LDN    SP      ;RESTORE.
02328 0A6C FE                SHL            ;TEST BIT 1.
02329 0A6D 52                STR    SP      ;TEMP SAVE.
02330 0A6E 3B74 )            BNF    NLOAD1  ;
02331 0A70 FB20              LDI    20H     ;DATA TO SET B SEG.
02332 0A72 F1                OR             ;MERGE IT.
02333 0A73 5B                STR    DP2     ;SAVE IT.
02334 0A74 02      NLOAD1    LDN    SP      ;RESTORE.
02335 0A75 FE                SHL            ;TEST BIT 0.
02336 0A76 52                STR    SP      ;TEMP SAVE.
02337 0A77 3B7D )            BNF    NLOAD0  ;
02338 0A79 FB40              LDI    40H     ;DATA TO SET A SEG.
02339 0A7B F1                OR             ;MERGE IT.
02340 0A7C 5B                STR    DP2     ;SAVE IT.
02341 0A7D 87      NLOAD0    GLO    DP1     ;TEST FOR BOTH COMPLETE.
02342 0A7E FB4D              XRI    LO(LMPTH0) ;
02343 0A80 CA0A2D )          LBNZ   DECAGN  ;ITERATE IF NOT DONE.
02344                        ;
02345                        ;....INDICATOR WRITE ROUTINE....?
02346                        ;
02347 0A83 F850              LDI    LO(WRKRAM) ;
```

```
02348 0A85 A7                    PLO      DP1       ;SET POINTER TO CMD DATA.
02349 0A86 D4                    SEP      CALL      ;SEND MODE BIT SEND CMD BYTE.
02350 0A87 09F3       )          WORD     SNDMOD    ;SELECT INDICATOR CONTROLLER.
02351 0A89 B0                    BYTE     INDMOD    ;
02352 0A8A F804       INDSND     LDI      4         ;ITERATION COUNTER.
02353 0A8C AC                    PLO      CR        ;
02354 0A8D E7                    SEX      DP1       ;FOR I/O FROM DP1 POINTER.
02355 0A8E 62                    OUT      PIOPA     ;SEND DATA THROUGH PORT A.
02356 0A8F E3                    SEX      PC        ;I/O FROM ROM.
02357 0A90 61         INDOUT     OUT      PIOCTL    ;SEND DISPLAY C?CK LOW.
02358 0A91 44                    BYTE     DCLKLO    ;
02359 0A92 61                    OUT      PIOCTL    ;SEND DISPLAY CLOCK HIGH.
02360 0A93 54                    BYTE     DCLKHI    ;
02361 0A94 2C                    DEC      CR        ;COUNT ITERATIONS NEG.
02362 0A95 8C                    GLO      CR        ;TEST FOR ALL SENT.
02363 0A96 3A90      )           BNZ      INDOUT    ;ITERATE.
02364 0A98 87                    GLO      DP1       ;TEST FOR SECOND BYTE SENT.
02365 0A99 FB53                  XRI      LO(WRKRAM)+3    ;
02366 0A9B 3A8A      )           BNZ      INDSND    ;
02367 0A9D D5                    SEP      RETN      ;FINALLY!!!!!!!!
02368                 ;
02369                 ;....CALL EARRED....?
02370                 ;
02371                 ;          SEP      CALL      ;
02372                 ;          WORD     EARRED    ;
02373                 ;          BYTE     [NUMBER OF BYTES TO READ]     ;
02374                 ;          WORD     [DESTINATION ADDRESS]    ;
02375                 ;          BYTE     [EAROM ADDRESS]    ;
02376                 ;                   NOTE: ON EXIT DP1 POINTS TO LAST BYTE READ.
02377                 ;                         DP2 POINTS TO WRKRAM REGISTER.
02378                 ;
02379                 ;.................................................................
02380 0A9E E3         EARRED     SEX      PC        ;FOR IMMED I/O.
02381 0A9F 61                    OUT      PIOCTL    ;SET A AS INPUT.
02382 0AA0 CB                    BYTE     LO(PINPRA)     ;
02383 0AA1 61                    OUT      PIOCTL    ;
02384 0AA2 00                    BYTE     LO(ALLINP)     ;
02385 0AA3 61                    OUT      PIOCTL    ;
02386 0AA4 44                    BYTE     LO(DCLKLO)     ;
02387 0AA5 F850                  LDI      LO(WRKRAM)     ;
02388 0AA7 A8                    PLO      DP2       ;POINT TO EARDEX.
02389 0AA8 46                    LDA      LINK      ;NUMBER OF BYTES.
02390 0AA9 AC                    PLO      CR        ;SAVE IN COUNTER.
02391 0AAA 46                    LDA      LINK      ;DESTINATION ADDRESS.
02392 0AAB A7                    PLO      DP1       ;
02393 0AAC 46                    LDA      LINK      ;FIRST ADDRESS TO READ.
02394 0AAD 3AB0      )           BNZ      NINDEX    ;DONT LOAD INDEX IF DATA.
02395 0AAF 80                    GLO      CPWRK     ;THIS IS INDEX TO RECIPE.
02396 0AB0 F940       NINDEX     ORI      40H       ;SET READ MODE BIT.
02397 0AB2 AF                    PLO      BINNUM    ;FOR INCREMENT.
02398 0AB3 E8         REDITR     SEX      DP2       ;LOGIC OPS & I/O.
02399 0AB4 58                    STR      DP2       ;SAVE ADDRESS IN WORK RAM.
02400 0AB5 63                    OUT      PIOPB     ;SEND ADDRESS + MODE.
02401 0AB6 2B                    DEC      DP2       ;RESET.
02402 0AB7 E3                    SEX      PC        ;
02403 0AB8 61                    OUT      PIOCTL    ;SEND CS.
02404 0AB9 A8                    BYTE     LO(EARSEL)     ;
02405 0ABA 61                    OUT      PIOCTL    ;SEND CLOCK HIGH.
02406 0ABB 54                    BYTE     LO(DCLKHI)     ;
02407 0ABC 61                    OUT      PIOCTL    ;SEND CLOCK LOW.
02408 0ABD 44                    BYTE     LO(DCLKLO)     ;
02409 0ABE E7                    SEX      DP1       ;FOR I/O REMEMBER DP1 POINTS TO DESTINATION.
02410 0ABF 6A                    INP      PIOPA     ;DATA NOW AT DP1 ADDRESS.
02411 0AC0 E3                    SEX      PC        ;FOR INT ENABLE & IMMED I/O.
```

```
02412 0AC1 61              OUT    PIOCTL    ;SEND DESELECT DATA.
02413 0AC2 BB              BYTE   LO(DESEL)       ;DESELECT EAROM.
02414 0AC3 2C              DEC    CR        ;COUNT DOWN.
02415 0AC4 8C              GLO    CR        ;IF ZERO.
02416 0AC5 C20ACE )        LBZ    EARFIN    ;THEN FINISHED.
02417 0AC8 17              INC    DP1       ;ELSE PREPARE TO ITERATE.
02418 0AC9 1F              INC    BINNUM    ;NEXT READ ADDRESS.
02419 0ACA BF              GLO    BINNUM    ;ADDRESS INTO D FOR NEXT.
02420 0ACB C00AB3 )        LBR    REDITR    ;
02421 0ACE 61       EARFIN OUT    PIOCTL    ;SET A PORT AS OUT.
02422 0ACF CB              BYTE   LO(PINPRA)       ;
02423 0AD0 61              OUT    PIOCTL    ;
02424 0AD1 FF              BYTE   LO(ALLOUT)       ;
02425 0AD2 61              OUT    PIOCTL    ;
02426 0AD3 54              BYTE   LO(DCLKHI)       ;
02427 0AD4 D5              SEP    RETN      ;WE ARE DONE.
02428                ;
02429                ;....CALL DISMSG....?
02430                ;
02431                ;           SEP    CALL   ;
02432                ;           WORD   DISMSG,[DISPLAY RAM ADDRESS,SEGTABLE ADDRESS]   ;
02433                ;                  DATA ARE MOVED FROM SEGTAB TO DISPLAY RAM.
02434                ;                  USES DATA POINTER 2 AND I/O POINTER 3 (DP2) (DP3).
02435                ;
02436 0AD5 46       DISMSG LDA    LINK      ;GET DISPLAY RAM ADDRESS.
02437 0AD6 AB              PLO    DP2       ;POINT TO DISPLAY RAM BYTE 1.
02438 0AD7 F80E )          LDI    HI(CODE)  ;
02439 0AD9 B9              PHI    DP3       ;POINT TO SEGTAB (HIGH BYTE ADDRESS).
02440 0ADA 46              LDA    LINK      ;GET LOW BYTE ADDRESS.
02441 0ADB A9              PLO    DP3       ;POINTER TO MESSAGE.
02442 0ADC F804            LDI    4         ;WRITE FOUR BYTES.
02443 0ADE AC              PLO    CR        ;SAVE FOR COUNT DOWN.
02444 0ADF 49       MOVMSG LDA    DP3       ;GET MESSAGE BYTE.
02445 0AE0 5B              STR    DP2       ;PUT IT IN DISPLAY RAM.
02446 0AE1 18              INC    DP2       ;POINT TO NEXT.
02447 0AE2 2C              DEC    CR        ;COUNT DOWN BYTES MOVED.
02448 0AE3 8C              GLO    CR        ;TEST FINISH.
02449 0AE4 3ADF )          BNZ    MOVMSG    ;IF >0 THEN ITERATE.
02450 0AE6 D4              SEP    CALL      ;SET DISPLAY COMMAND BIT.
02451 0AE7 0A0D )          WORD   DISWRT    ;
02452 0AE9 D5              SEP    RETN      ;ELSE RETURN.
02453                ;
02454                ;....CALL DISTAT....?
02455                ;
02456                ;           SEP    CALL   ;
02457                ;           WORD   [DISDAT,LO(DATADD),LO(RIGHTD)   ;ADDRESS OF DATA TO BE
02458                ;                                                  DISPLAYED AND DESTINATION OF
02459                ;                                                  DATA.
02460                ;                  SUBROUTINE USES DATA POINTERS DP1, DP2, AND DP3.
02461                ;
02462 0AEA F80E )   DISDAT LDI    HI(CODE)  ;
02463 0AEC B9              PHI    DP3       ;POINT TO SEVEN SEGMENT DATA.
02464 0AED 46              LDA    LINK      ;
02465 0AEE A7              PLO    DP1       ;POINT TO DATA.
02466 0AEF 46              LDA    LINK      ;
02467 0AF0 AB              PLO    DP2       ;POINT TO DISPLAY RAM.
02468 0AF1 F804            LDI    4         ;NUMBER OF BYTES TO WRITE.
02469 0AF3 AC              PLO    CR        ;
02470 0AF4 E2              SEX    SP        ;
02471 0AF5 F830 )   MOVDAT LDI    LO(NUMBER)       ;
02472 0AF7 A9              PLO    DP3       ;
02473 0AF8 47              LDA    DP1       ;GET DATA.
02474 0AF9 52              STR    SP        ;PUT IT ON THE STACK.
02475 0AFA 89              GLO    DP3       ;NUMBER.
```

```
02476 0AFB F4              ADD             ;INDEX INTO TABLE.
02477 0AFC A9              PLO    DP3      ;POINT TO SEG DAT = NUMBER.
02478 0AFD 09               LDN   DP3      ;GET DATA.
02479 0AFE 5B               STR   DP2      ;PUT IT IN DISRAM.
02480 0AFF 2B               DEC   DP2      ;POINT TO NEXT.
02481 0B00 2C               DEC   CR       ;COUNT DOWN.
02482 0B01 8C               GLO   CR       ;TEST.
02483 0B02 CA0AF5 )         LBNZ  MOVDAT   ;IF GT 0 THEN ITERATE.
02484 0B05 F804             LDI   4        ;DO ALL 4 IF ZERO.
02485 0B07 AC               PLO   CR       ;KEEP COUNT.
02486 0B08 18       NXTZED  INC   DP2      ;POINT TO DIGIT.
02487 0B09 0B              LDN    DP2      ;GET THE DATA.
02488 0B0A FBFB             XRI   0FBH     ;IS THAT SEVEN SEG FOR ZERO?
02489 0B0C CA0B17 )         LBNZ  NOZED    ;IF NOT THEN WERE DONE.
02490 0B0F F680             LDI   80H      ;BLANK DATA.
02491 0B11 5B               STR   DP2      ;PUT IN DIS RAM.
02492 0B12 2C               DEC   CR       ;THATS ONE DONE.
02493 0B13 8C               GLO   CR       ;NO MORE THAN FOUR.
02494 0B14 CA0B0B )         LBNZ  NXTZED   ;IF NOT THEN GO DO ANOTHER.
02495 0B17 D4       NOZED   SEP   CALL     ;SET DISPLAY COMMAND BIT.
02496 0B18 0A0D )           WORD  DISWRT   ;
02497 0B1A D5               SEP   RETN     ;FINSHED.
02498                ;
02499                ;....CALL COLON....?
02500                ;
02501                ;              SEP   CALL   ;
02502                ;              WORD  COLON,RIGHTB    ;OR LEFTB
02503                ;
02504 0B1B 46       COLON   LDA   LINK     ;GET FIRST DEC PNT ADDRESS.
02505 0B1C AB               PLO   DP2      ;INTO POINTER.
02506 0B1D E8               SEX   DP2      ;FOR LOGICAL OP.
02507 0B1E FB7F             LDI   7FH      ;DATA TO SET COLON ON.
02508 0B20 F2               AND            ;AND WITH DATA IN DP2.
02509 0B21 5B               STR   DP2      ;
02510 0B22 18               INC   DP2      ;MUST DO TWO BYTES.
02511 0B23 FB7F             LDI   7FH      ;
02512 0B25 F2               AND            ;
02513 0B26 5B               STR   DP2      ;
02514 0B27 D4       DISCAL  SEP   CALL     ;
02515 0B28 0A0D )           WORD  DISWRT   ;
02516 0B2A D5               SEP   RETN     ;ELSE RETURN.
02517                ;
02518                ;....CALL BLANKD....?
02519                ;
02520                ;              LINK=STARTING ADDRESS TO BLANK FOUR DIGITS.
02521                ;              EXP: SEP    CALL   ;
02522                ;                   WORD   BLANKD,LEFTA    ;FOUR DIGITS BLANK START
02523                ;                                           AT LEFTA.
02524                ;
02525 0B2B 46       BLANKD  LDA   LINK     ;
02526 0B2C AB               PLO   DP2      ;GET STARTING ADDRESS INTO POINTER.
02527 0B2D F804             LDI   4        ;PLO CTR.
02528 0B2F AC               PLO   CR       ;
02529 0B30 F880     BLNKMR  LDI   80H      ;BLANK DATA.
02530 0B32 5B               STR   DP2      ;
02531 0B33 18               INC   DP2      ;
02532 0B34 2C               DEC   CR       ;
02533 0B35 8C               GLO   CR       ;TEST FOR FINISH.
02534 0B36 CA0B30 )         LBNZ  BLNKMR   ;IF NOT ZERO THEN LOOP.
02535 0B39 D4               SEP   CALL     ;ELSE SET DIPLAY COMMAND BIT.
02536 0B3A 0A0D )           WORD  DISWRT   ;
02537 0B3C D5               SEP   RETN     ;NOW RETURN.
02538                ;
02539                ;....CALL PRGKEY....?
```

```
02540          ;
02541          ;                SEP    CALL    ;
02542          ;                WORD   PRGKEY  ;
02543          ;                          DECODES PRGKEY AND LOADS PRGKEY
02544          ;                          WITH BCD DATA.
02545          ;
02546 0B3D FB0E  ) PRGKEY LDI    HI(PROTAB)    ;
02547 0B3F B9          PHI    DP3     ;
02548 0B40 FB42  )     LDI    LO(PROTAB)    ;
02549 0B42 A9           PLO    DP3     ;
02550 0B43 F805        LDI    LO(NEWKEY)    ;
02551 0B45 A7           PLO    DP1     ;SET POINTER TO NEWKEY.
02552 0B46 E7           SEX    DP1     ;FOR INDEX.
02553 0B47 89           GLO    DP3     ;FOR ADD TO DP1 REGISTER.
02554 0B48 F4           ADD            ;INDEX INTO TABLE.
02555 0B49 A9           PLO    DP3     ;
02556 0B4A 09           LDN    DP3     ;GET BCD DATA.
02557 0B4B 57           STR    DP1     ;PUT IT IN NEWKEY.
02558 0B4C D5           SEP    RETN    ;DONE.
02559          ;
02560          ;....CALL DISTIM....?
02561          ;
02562          ;MOVES MINUTES DATA FROM BCD BUFFER TO KEY BUFFER.
02563 0B4D F800   DISTIM LDI    LO(BCDRE3)    ;
02564 0B4F A8           PLO    DP2     ;POINT TO LSD.
02565 0B50 F834        LDI    LO(KEYBF3)    ;
02566 0B52 A7           PLO    DP1     ;POINT TO LSD MIN.
02567 0B53 48           LDA    DP2     ;GET BYTE.
02568 0B54 57           STR    DP1     ;INTO KEY BUFFER.
02569 0B55 08           LDN    DP2     ;GET NEXT.
02570 0B56 17           INC    DP1     ;POINT TO NEXT KEY BUFF REG.
02571 0B57 57           STR    DP1     ;
02572 0B58 D5           SEP    RETN    ;DONE.
02573          ;
02574          ;....CALL COKDEC....?
02575          ;
02576          ;                SEP    CALL    ;
02577          ;                WORD   COKDEC  ;
02578          ;           ON RETURN: CPUWRK.0=EAROM ADDRESS FOR RECIPE.
02579          ;                      CPUWRK.1=COOK FLAGS/ I/O BYTE FOR LAMPS.
02580          ;                      DF=0=LEFT BASKET//DF=1=RIGHT BASKET.
02581          ;
02582 0B59 F805   COKDEC LDI    LO(NEWKEY)    ;
02583 0B5B A7           PLO    DP1     ;SET POINTER TO NEWKEY REGISTER.
02584 0B5C 07           LDN    DP1     ;GET KEY DATA.
02585 0B5D FF0C        SMI    0CH     ;TEST IT.
02586 0B5F 3392  )     BDF    NOPRD   ;IF GE THEN BRANCH.
02587 0B61 F82D        LDI    LO(COMFLG)    ;
02588 0B63 AB           PLO    DP2     ;
02589 0B64 08           LDN    DP2     ;
02590 0B65 F6           SHR            ;TEST FOR TWO PRODUCT COMP.
02591 0B66 3388  )     BDF    TWOPRD  ;IF FLAG SET THEN GO.
02592 0B68 07     PRDOK LDN    DP1     ;HEX DATA.
02593 0B69 FF06        SMI    6       ;TEST LESS THAN 6.
02594 0B6B 336E  )     BDF    HIGH    ;SKIP
02595 0B6D 07           LDN    DP1     ;RESTORE D.
02596 0B6E AC     HIGH  PLO    CR      ;FOR COUNT DOWN.
02597 0B6F F801        LDI    1       ;START DATA.
02598 0B71 B0     CKDEC1 PHI   CPUWRK  ;LAMP DATA.
02599 0B72 8C           GLO    CR      ;
02600 0B73 327A  )     BZ     CKINDX  ;IF 0 THEN DONE.
02601 0B75 90           GHI    CPUWRK  ;
02602 0B76 FE           SHL            ;SHIFT BIT ACROSS.
02603 0B77 2C           DEC    CR      ;COUNT KEYDATA DOWN.
02604 0B78 3071  )     BR     CKDEC1  ;ITERATE.
```

```
02605 0B7A F850     CKINDX LDI    LO(WRKRAM)    ;
02606 0B7C A8              PLO    DP2           ;POINTER TO WRKRAM.
02607 0B7D 07              LDN    DP1           ;HEX KEY DATA.
02608 0B7E EB              SEX    DP2           ;FOR ARITHMATICS.
02609 0B7F 58              STR    DP2           ;THAT WAS HEX KEY DATA.
02610 0B80 FE              SHL                  ;THAT WAS A MULTIPLY BY 2.
02611 0B81 F4              ADD                  ;THAT MAKES IT HEX DATA (X) 3.
02612 0B82 5B              STR    DP2           ;EARDEX NOW CONTAINS INDEX FOR RECIPES.
02613 0B83 A0              PLO    CPUWRK        ;INDEX HERE ALSO FOR PROGRAM OPS.
02614 0B84 07              LDN    DP1           ;HEX KEY DATA.
02615 0B85 FF06            SMI    6             ;TO SET FLAG IN DF.
02616 0B87 D5              SEP    RETN          ;DF=0=LEFT BASKET.
02617 0B88 07     TWOPRD LDN     DP1           ;TEST FOR VALID PROD KEY.
02618 0B89 FB05            XRI    5             ;FOR LEFT BASKET.
02619 0B8B 3268   )        BZ     PRDOK         ;
02620 0B8D 07              LDN    DP1           ;FOR RIGHT BASKET.
02621 0B8E FB0B            XRI    0BH           ;
02622 0B90 3268   )        BZ     PRDOK         ;
02623 0B92 FB00   NOPRD LDI     0             ;
02624 0B94 B0              PHI    CPUWRK        ;
02625 0B95 D5              SEP    RETN          ;
02626                ;
02627                ;....CALL INTGRT....?
02628                ;
02629 0B96 46     INTGRT LDA     LINK          ;GET TIC ADD.
02630 0B97 A8              PLO    DP2           ;
02631 0B98 FC00            ADI    0             ;SET DF=0.
02632 0B9A 08              LDN    DP2           ;
02633 0B9B 3AAB   )        BNZ    ENDIT         ;IF NOT TIME THEN SKIP IT.
02634 0B9D FB0A            LDI    0AH           ;SET TIMER.
02635 0B9F 58              STR    DP2           ;
02636 0BA0 07              LDN    DP1           ;SENSITIVITY.
02637 0BA1 AC              PLO    CR            ;FOR ADDITIONS.
02638 0BA2 17              INC    DP1           ;POINT TO SECONDS.
02639 0BA3 3AAC   )        BNZ    TMPINT        ;IF DATA THEN DO TEMPERATURE INTEGRATION.
02640 0BA5 D4     CALDEC SEP     CALL          ;
02641 0BA6 0C41   )        WORD   DECTIM        ;
02642 0BA8 92              GHI    SP            ;
02643 0BA9 FCFF            ADI    0FFH          ;SET DF TO 1.
02644 0BAB D5     ENDIT SEP      RETN          ;
02645 0BAC F821   TMPINT LDI     LO(FTSTAT)    ;
02646 0BAE A9              PLO    DP3           ;
02647 0BAF 97              GHI    DP1           ;RAM HIGH ADD BYTE.
02648 0BB0 B9              PHI    DP3           ;POINT TO RAM.
02649 0BB1 F820            LDI    LO(ADCRAW)    ;
02650 0BB3 A8              PLO    DP2           ;INITIALIZE
02651 0BB4 F802            LDI    2             ;ZERO ERROR FLAG.
02652 0BB6 AB              PLO    CPUAUX        ;
02653                ;
02654                ;....TEST ADC CONVERTER VALIDITY....?
02655                ;
02656 0BB7 08              LDN    DP2           ;ADC RAW DATA.
02657 0BB8 32A5   )        BZ     CALDEC        ;BAD DATA SO SKIP.
02658 0BBA FBFF            XRI    0FFH          ;
02659 0BBC 32A5   )        BZ     CALDEC        ;BAD DATA SO SKIP.
02660                ;TEST FOR FRYER () PROG TEMP.
02661 0BBE 08              LDN    DP2           ;ADC RAW DATA.
02662 0BBF E9              SEX    DP3           ;
02663 0BC0 F5              SD                   ;FTSTAT - ADCRAW.
02664 0BC1 32A5   )        BZ     CALDEC        ;IF DIFF 0 THEN BRANCH.
02665 0BC3 CB0C19 )        LBNF   HIINT         ;ELSE NO HIGH PROCEDURE.
02666                ;
02667                ;....FRYER TEMP LOW....?
02668                ;
02669 0BC6 F6              SHR                  ;DIVIDE IT BY TWO.
```

```
02670 0BC7 AF              PLO      BINNUM   ;TEMP SAVE.
02671 0BC8 87              GLO      DP1      ;THIS IS SECONDS.
02672 0BC9 FC02            ADI      2        ;INDEX TO ACCUMULATOR.
02673 0BCB A8  ?           PLO      DP2      ;POINT TO ACCUMULATOR LOW.
02674 0BCC E8              SEX      DP2      ;FOR ARITHMATICS.
02675 0BCD BF     SENSGN   GLO      BINNUM   ;DELTA TEMP.
02676 0BCE F4              ADD               ;ADD DIFFERENCE TEMP TO ACCUMULATOR.
02677 0BCF C7              LSNF              ;
02678 0BD0 F8FF            LDI      0FFH     ;
02679 0BD2 58              STR      DP2      ;SAVE IN ACCUMULATOR.
02680                  ;
02681                  ;....ADJUST ACCUMULATOR IF GT PROG TEMP....?
02682                  ;
02683 0BD3 09     ACCADJ   LDN      DP3      ;FTSTAT DATA.
02684 0BD4 F5              SD                ;TEST FOR ACCUMULATOR > FTSTAT.
02685 0BD5 CB0BF1 )        LBNF     ACCLES   ;
02686 0BD8 58              STR      DP2      ;SAVE REMAINDER.
02687                  ;
02688                  ;....ADJUST TIMER....?
02689                  ;
02690 0BD9 07              LDN      DP1      ;SECONDS DATA.
02691 0BDA FC01            ADI      1        ;ADD ONE SECOND.
02692 0BDC 57              STR      DP1      ;
02693 0BDD FF3C            SMI      3CH      ;TEST FOR 60 DECIMAL.
02694 0BDF CB0BEB )        LBNF     TESTOV   ;
02695 0BE2 F800            LDI      0        ;ELSE RESET SECONDS.
02696 0BE4 57              STR      DP1      ;
02697 0BE5 17              INC      DP1      ;POINT TO MINUTES.
02698 0BE6 07              LDN      DP1      ;
02699 0BE7 FC01            ADI      1        ;INC MINUTES.
02700 0BE9 57              STR      DP1      ;
02701 0BEA 27              DEC      DP1      ;RESET TO SEC.
02702                  ;
02703                  ;....TEST FOR ERROR....?
02704                  ;
02705 0BEB 2B     TESTOV   DEC      CPUAUX   ;
02706 0BEC 8B              GLO      CPUAUX   ;
02707 0BED 32F9   )        BZ       INTERR   ;
02708 0BEF 30D3   )        BR       ACCADJ   ;
02709 0BF1 2C     ACCLES   DEC      CR       ;COUNT CFAC DOWN.
02710 0BF2 8C              GLO      CR       ;TEST FINISH.
02711 0BF3 CA0BCD )        LBNZ     SENSGN   ;
02712 0BF6 C00BA5 )        LBR      CALDEC   ;
02713                  ;
02714                  ;....LOW TEMP ERROR ROUTINE....?
02715                  ;
02716 0BF9 D4     INTERR   SEP      CALL     ;
02717 0BFA 0C41   )        WORD     DECTIM   ;
02718 0BFC 87     CHNCHK   GLO      DP1      ;TEST CHANNEL WORKING.
02719 0BFD FB1C            XRI      LO(CKSEC1)         ;
02720 0BFF CA0C0A )        LBNZ     RGTCHN   ;
02721 0C02 D4              SEP      CALL     ;
02722 0C03 0AD5   )        WORD     DISMSG   ;
02723 0C05 411C   )        BYTE     LO(LEFTA),EROR    ;
02724 0C07 C00C0F )        LBR      ERRALM   ;
02725 0C0A D4     RGTCHN   SEP      CALL     ;
02726 0C0B 0AD5   )        WORD     DISMSG   ;
02727 0C0D 451C   )        BYTE     LO(RIGHTA),EROR   ;
02728 0C0F F82B   ERRALM   LDI      LO(ALMCOM)        ;
02729 0C11 A7              PLO      DP1      ;
02730 0C12 07              LDN      DP1      ;
02731 0C13 F901            ORI      1        ;
02732 0C15 57              STR      DP1      ;SET KEY BEEP SIGNAL.
02733 0C16 FC00            ADI      0        ;SET DF=0.
02734 0C18 D5              SEP      RETN     ;
```

```
02735                    ;
02736                    ;....FRYER HIGH....?
02737                    ;
02738 0C19 E8    HIINT    SEX    DP2     ;
02739 0C1A 09             LDN    DP3     ;FOR ARITHMATICS.
02740 0C1B F5             SD             ;ADCRAW-FTSTAT.
02741 0C1C F6             SHR            ;DIV BY TWO.
02742 0C1D AF             PLO    BINNUM  ;TEMP SAVE.
02743 0C1E 87             GLO    DP1     ;SECONDS ADDRESS.
02744 0C1F FC03           ADI    3       ;INDEX TO ACC HI.
02745 0C21 A8             PLO    DP2     ;
02746 0C22 E8             SEX    DP2     ;
02747 0C23 8F    SENSHI   GLO    BINNUM  ;DIFFERENCE TEMP.
02748 0C24 F4             ADD            ;
02749 0C25 C7             LSNF           ;
02750 0C26 FBFF           LDI    0FFH    ;
02751 0C28 58             STR    DP2     ;
02752 0C29 09    ADJACC   LDN    DP3     ;FTSTAT DATA.
02753 0C2A F5             SD             ;ACCUMULATOR-FTSTAT.
02754 0C2B 3B39  )        BL     LESSAC  ;
02755 0C2D 58             STR    DP2     ;
02756 0C2E D4             SEP    CALL    ;
02757 0C2F 0C41  )        WORD   DECTIM  ;
02758 0C31 2B             DEC    CPUAUX  ;
02759 0C32 8B             GLO    CPUAUX  ;
02760 0C33 C20BF9 )       LBZ    INTERR  ;
02761 0C36 C00C29 )       LBR    ADJACC  ;TEST FOR MORE.
02762 0C39 2C    LESSAC   DEC    CR      ;
02763 0C3A 8C             GLO    CR      ;
02764 0C3B CA0C23 )       LBNZ   SENSHI  ;
02765 0C3E C00BA5 )       LBR    CALDEC  ;
02766                    ;
02767                    ;....CALL DEC TIM DECREMENTS TIMER....?
02768                    ;
02769 0C41 07    DECTIM   LDN    DP1     ;GET SEC DATA.
02770 0C42 CA0C50 )       LBNZ   DOSEC   ;GO IF GT 0.
02771 0C45 17             INC    DP1     ;POINT TO MIN.
02772 0C46 07             LDN    DP1     ;
02773 0C47 C20C53 )       LBZ    ENDDEC  ;
02774 0C4A FF01           SMI    1       ;DEC IT.
02775 0C4C 57             STR    DP1     ;
02776 0C4D 27             DEC    DP1     ;POINT TO SECONDS.
02777 0C4E F83C           LDI    3CH     ;RESET IT.
02778 0C50 FF01  DOSEC    SMI    1       ;DEC SEC.
02779 0C52 57             STR    DP1     ;
02780 0C53 D5    ENDDEC   SEP    RETN    ;
02781                    ;CALL FTOC.
02782                    ;
02783                    ;....CONVERTS DEGREES F TO DEGREES C....?
02784                    ;
02785                    ;LINK POINTS TO LOW BYTE OF DEGREES F.
02786                    ;RESULT STORED IN EDAT01 AND 02.
02787                    ;
02788 0C54 FB2E  FTOC     LDI    LO(EDAT01) ;
02789 0C56 A7             PLO    DP1     ;POINTS TO DESTINATION.
02790 0C57 46             LDA    LINK    ;
02791 0C58 A8             PLO    DP2     ;POINTS TO MEASURED TEMP (DEGFMO).
02792 0C59 48             LDA    DP2     ;
02793 0C5A 3A5F  )        BNZ    NOTZER  ;
02794 0C5C 08             LDN    DP2     ;
02795 0C5D 3281  )        BZ     ZEROD   ;
02796 0C5F 28    NOTZER   DEC    DP2     ;
02797 0C60 E8             SEX    DP2     ;
02798 0C61 FB20           LDI    20H     ;FOR SUBTRACT 32 FROM LOW BYTE.
02799 0C63 F5             SD             ;
```

```
02800 0C64 AF        NOBOR  PLO    RF       ;SAVE IN F REG.
02801 0C65 18               INC    DP2      ;
02802 0C66 F800              LDI    0        ;FOR SUBTRACT HIGH BYTE.
02803 0C68 75               SDB             ;
02804 0C69 BF               PHI    RF       ;SAVE IN F REG.
02805 0C6A F850              LDI    LO(WRKRAM)  ;AND WORK RAM.
02806 0C6C AB               PLO    DP2      ;
02807 0C6D BF               GLO    RF       ;
02808 0C6E 5B               STR    DP2      ;
02809 0C6F 18               INC    DP2      ;
02810 0C70 9F               GHI    RF       ;
02811 0C71 5B               STR    DP2      ;
02812 0C72 D4               SEP    CALL     ;
02813 0C73 0CA2    )        WORD   MULPLY   ;NOW MULTIPLY BY 5.
02814 0C75 04               BYTE   4        ;
02815 0C76 D4               SEP    CALL     ;
02816 0C77 0CB2    )        WORD   DIVIDE   ;NOW DIVIDE BY NINE.
02817 0C79 09               BYTE   9        ;
02818 0C7A 2E               DEC    RE       ;SUBTRACT ONE TO CORRECT CENTIGRADE CONVERSION.
02819 0C7B 8E               GLO    RE       ;NOW STORE RESULT IN RAM.
02820 0C7C 57               STR    DP1      ;
02821 0C7D 9E               GHI    RE       ;
02822 0C7E 17               INC    DP1      ;
02823 0C7F 57               STR    DP1      ;
02824 0C80 D5               SEP    RETN     ;
02825 0C81 57       ZEROD   STR    DP1      ;
02826 0C82 307E    )        BR     $-4      ;
02827                       ;
02828                       ;....CALL CTOF....?
02829                       ;
02830                       ;SUBROUTINE TO CONVERT DEGREES C TO DEGREES F.
02831                       ;DEGREES C DATA IN DEG00 AND DEG01 REGISTERS IS CONVERTED.
02832                       ;AND STORED IN RPDEG0 AND RDEGF1 REGISTERS.
02833                       ;
02834 0CB4 FB2E    CTOF    LDI    LO(EDAT01)   ;
02835 0C86 A7               PLO    DP1      ;
02836 0C87 AB               PLO    DP2      ;
02837 0C88 48               LDA    DP2      ;
02838 0C89 AF               PLO    RF       ;GET DATA INTO RF.
02839 0C8A 08               LDN    DP2      ;
02840 0C8B BF               PHI    RF       ;
02841 0C8C D4               SEP    CALL     ;
02842 0C8D 0CA2    )        WORD   MULPLY   ;
02843 0C8F 08               BYTE   8        ;9 X
02844 0C90 D4               SEP    CALL     ;
02845 0C91 0CB2    )        WORD   DIVIDE   ;
02846 0C93 05               BYTE   5        ;DIVISOR.
02847 0C94 8E               GLO    RE       ;FOR ADD 32 DECIMAL.
02848 0C95 FC20             ADI    20H      ;
02849 0C97 AE               PLO    RE       ;
02850 0C9B 9E               GHI    RE       ;
02851 0C99 7C00             ADCI   0        ;
02852 0C9B BE               PHI    RE       ;RE NOW CONTAINS DEGREES F.
02853 0C9C 8E               GLO    RE       ;FOR RAM STORE.
02854 0C9D 57               STR    DP1      ;
02855 0C9E 17               INC    DP1      ;
02856 0C9F 9E               GHI    RE       ;
02857 0CA0 57               STR    DP1      ;
02858 0CA1 D5               SEP    RETN     ;
02859                       ;
02860                       ;....CALL MULPLY....^N
02861                       ;
02862                       ;            RF HOLDS DATA TO BE MULTIPLIED DP2 POINTS TO
```

```
02863                  ;                ORIGINATING REGISTER. CR CONTAINS MULTIPLIER.
02864                  ;
02865 0CA2 46          MULPLY LDA    LINK   ;GET MULTIPLIER.
02866 0CA3 AC                 PLO    CR     ;
02867 0CA4 E8                 SEX    DP2    ;TO ADD.
02868 0CA5 BF          MULOOP GLO    RF     ;LOW BYTE RESULT.
02869 0CA6 28                 DEC    DP2    ;
02870 0CA7 F4                 ADD           ;
02871 0CA8 AF                 PLO    RF     ;
02872 0CA9 1B                 INC    DP2    ;POINT TO HIGH BYTE.
02873 0CAA 9F                 GHI    RF     ;
02874 0CAB 74                 ADC           ;ADD WITH CARRY.
02875 0CAC BF                 PHI    RF     ;
02876 0CAD 2C                 DEC    CR     ;
02877 0CAE 8C                 GLO    CR     ;TEST ITERATION COUNTER.
02878 0CAF 3AA5    )          BNZ    MULOOP ;
02879 0CB1 D5                 SEP    RETN   ;RETURN WITH RESULT IN RF.
02880                  ;
02881                  ;....CALL DIVIDE....?
02882                  ;
02883                  ;RF CONTAINS THE DATA TO BE
02884                  ;DIVIDED. RE WILL CONTAIN THE RESULT.
02885 0CB2 F850        DIVIDE LDI    LO(WRKRAM)
02886 0CB4 A9                 PLO    DP3    ;
02887 0CB5 97                 GHI    DP1    ;
02888 0CB6 B9                 PHI    DP3    ;INITIALIZE DIVISOR RAM.
02889 0CB7 06                 LDN    LINK   ;GET DIVISOR.
02890 0CB8 59                 STR    DP3    ;INTO WORKRAM.
02891 0CB9 E9                 SEX    DP3    ;
02892 0CBA FB00               LDI    0      ;
02893 0CBC AE                 PLO    RE     ;
02894 0CBD BE                 PHI    RE     ;INITIALIZE RESULT REGISTER.
02895 0CBE 8F          DIGIT1 GLO    RF     ;
02896 0CBF F7                 SM            ;SUBTRACT DIVISOR.
02897 0CC0 AF                 PLO    RF     ;RESULT OF SUBTRACT.
02898 0CC1 1E                 INC    RE     ;RESULT OF DIVIDE.
02899 0CC2 3BC6    )          BNF    LESS   ;
02900 0CC4 30BE    )          BR     DIGIT1 ;
02901 0CC6 9F          LESS   GHI    RF     ;TEST AND SHIFT IF DATA.
02902 0CC7 C20CD0  )          LBZ    DIVOVR ;
02903 0CCA FF01               SMI    1      ;
02904 0CCC BF                 PHI    RF     ;
02905 0CCD C00CBE  )          LBR    DIGIT1 ;
02906 0CD0 16          DIVOVR INC    LINK   ;BUMP PAST DATA.
02907 0CD1 D5                 SEP    RETN   ;
02908                  ;
02909                  ;THE FOLLOWING SUBROUTINE WILL PROVIDE THE INITIAL BURN AND CHECK OUT
02910                  ;OF THE EAROM LOADED IN THE SOCKET. JUMPER MUST BE REMOVED TO USE MAIN
02911                  ;PROGRAM.
02912                  ;
02913 0CD2 FB0D    )   EARBUN LDI    HI(EARTAB)    ;
02914 0CD4 B7                 PHI    DP1    ;
02915 0CD5 F800               LDI    0      ;
02916 0CD7 A0                 PLO    R0     ;
02917 0CD8 D4                 SEP    CALL   ;
02918 0CD9 09C5    )          WORD   EARWRT ;
02919 0CDB 400900  )          BYTE   40H,LO(EARTAB),0   ;
02920 0CDE 98                 GHI    DP2    ;
02921 0CDF B7                 PHI    DP1    ;
02922 0CE0 FB0D    )   VERIFY LDI    HI(EARTAB)    ;
02923 0CE2 B9                 PHI    DP3    ;
02924 0CE3 F809    )          LDI    LO(EARTAB)    ;
02925 0CE5 A9                 PLO    DP3    ;
02926 0CE6 F800               LDI    0      ;
02927 0CE8 A0                 PLO    R0     ;
```

```
02928 OCE9 D4           VERLOP SEP    CALL    ;
02929 OCEA 0A9E  )             WORD   EARRED  ;
02930 OCEC 016000              BYTE   1,60H,0 ;USE INDEX.
02931 OCEF E7                  SEX    DP1     ;
02932 OCF0 49                  LDA    DP3     ;
02933 OCF1 F3                  XOR            ;
02934 OCF2 CA0D49 )            LBNZ   ERROR   ;
02935 OCF5 10                  INC    R0      ;
02936 OCF6 8F                  GLO    RF      ;
02937 OCF7 FB7F                XRI    7FH     ;
02938 OCF9 3AE9  )             BNZ    VERLOP  ;
02939                   ;
02940                   ;......FINISH......
02941                   ;
02942 OCFB 7A     FINISH REQ                  ;
02943 OCFC 00     DONRES IDL                  ;
02944 OCFD 00            IDL                  ;
02945 OCFE 00            IDL                  ;
02946 OCFF 00            IDL                  ;
02947 0D00 00            IDL                  ;
02948 0D01 00            IDL                  ;
02949 0D02 C10CFB )      LBQ    FINISH        ;
02950 0D05 7B            SEQ                  ;
02951 0D06 C00CFC )      LBR    DONRES        ;
02952 0D09 00370100 EARTAB BYTE  0,37H,1,0,0,0,0,0
02952 0D0D 00000000
02953 0D11 00000000       BYTE  0,0,0,0,0,0,0,0
02953 0D15 00000000
02954 0D19 81000537       BYTE  81H,0,5,37H,1,0,0,0
02954 0D1D 01000000
02955 0D21 00000000       BYTE  0,0,0,0,0,0,0,0
02955 0D25 00000000
02956 0D29 00000000       BYTE  0,0,0,0,0,0,0,0
02956 0D2D 00000000
02957 0D31 00000000       BYTE  0,0,0,0,0,0,0,0
02957 0D35 00000000
02958 0D39 FE60A44A       BYTE  0FEH,60H,0A4H,4AH,6,6EH,0A0H,54H
02958 0D3D 066EA054
02959 0D41 010FFA00       BYTE  1,0FH,0FAH,0,7,0,0,0
02959 0D45 07000000
02960                   ;
02961                   ;.........EAROM ERROR........
02962                   ;
02963 0D49 7A     ERROR  REQ                  ;
02964 0D4A 3049  )       BR     ERROR         ;
02965                   ;
02966                   ;
02967 0D4C FB0C   FRYRUP LDI    LO(CKTIC1)    ;
02968 0D4E A8            PLO    DP2           ;
02969 0D4F 08            LDN    DP2           ;
02970 0D50 3AE0  )       BNZ    CHKRES        ;
02971 0D52 FB0A          LDI    0AH           ;
02972 0D54 58            STR    DP2           ;
02973 0D55 FB2C          LDI    LO(COMWRD)    ;FETCH COMMAND WORD.
02974 0D57 A7            PLO    DP1           ;
02975 0D58 E7            SEX    7             ;
02976 0D59 F820          LDI    20H           ;DETERMINE JOB NEEDED.
02977 0D5B F3            XOR                  ;
02978 0D5C 326E  )       BZ     DISPLY        ;INITIALIZE DISPLAY IF ZERO.
02979 0D5E FB21          LDI    21H           ;
02980 0D60 F3            XOR                  ;
02981 0D61 3290  )       BZ     CNTSTA        ;INITIALIZE COUNTERS WHEN TEMP EQ 275F.
02982 0D63 F822  ?       LDI    22H           ;
02983 0D65 F3            XOR                  ;
02984 0D66 32AB  )       BZ     RUNCNT        ;COUNT UNTIL TEMP EQ 375F
```

```
02985 0D68 FB23              LDI    23H    ;
02986 0D6A F3                XOR           ;
02987 0D6B 32E0    )         BZ     CHKRES ;LOOK FOR CANCEL KEY.
02988 0D6D DA                SEP    UPC    ;
02989 0D6E D4      DISPLY SEP CALL          ;DISPLAY FR4R IN LEFT DISPLAY.
02990 0D6F 0AD5    )         WORD   DISMSG ;
02991 0D71 413A    )         BYTE   LO(LEFTA),FR4R ;
02992 0D73 F820              LDI    LO(ADCRAW)- ;
02993 0D75 A8                PLO    DP2    ;
02994 0D76 E8                SEX    8      ;
02995 0D77 FB6E              LDI    6EH    ;
02996 0D79 FC00              ADI    0      ;RESET CARRY BIT.
02997 0D7B F5                SD            ;
02998 0D7C 33B6    )         BDF    OILHOT ;TO HOT FOR RECOVERY TEST.
02999 0D7E FB2C              LDI    LO(COMWRD) ;SET COMMAND WORD FOR NEXT ROUTINE.
03000 0D80 A7                PLO    DP1    ;
03001 0D81 FB21              LDI    21H    ;
03002 0D83 57                STR    DP1    ;
03003 0D84 30E0    )         BR     CHKRES ;
03004 0D86 D4      OILHOT SEP CALL          ;DISPLAY HI9H IN RIGHT DISPLAY.
03005 0D87 0AD5    )         WORD   DISMSG ;
03006 0D89 453E    )         BYTE   LO(RIGHTA),HI6H ;
03007 0D8B FB2C              LDI    LO(COMWRD) ;
03008 0D8D A7                PLO    DP1    ;
03009 0D8E 30DA    )         BR     ATSEPT ;SET COMWRD TO 23H AND EXIT.
03010 0D90 F820    CNTSTA LDI        LO(ADCRAW) ;CHECK IF TEMP GE 275 DEGREES F.
03011 0D92 A8                PLO    DP2    ;
03012 0D93 E8                SEX    DP2    ;
03013 0D94 FB87              LDI    87H    ;
03014 0D96 F5                SD            ;
03015 0D97 3BE0    )         BNF    CHKRES ;IF TEMP BELOW SETPOINT, EXIT.
03016 0D99 F810              LDI    LO(UPMIN) ;ZERO MIN/SEC COUNTERS.
03017 0D9B A7                PLO    DP1    ;
03018 0D9C F80F              LDI    LO(UPSEC) ;
03019 0D9E A8                PLO    DP2    ;
03020 0D9F F800              LDI    0      ;
03021 0DA1 57                STR    DP1    ;
03022 0DA2 58                STR    DP2    ;
03023 0DA3 FB2C              LDI    LO(COMWRD) ;SET COMMAND WORD TO 22H.
03024 0DA5 A7                PLO    DP1    ;
03025 0DA6 FB22              LDI    22H    ;
03026 0DA8 57                STR    DP1    ;
03027 0DA9 30E0    )         BR     CHKRES ;
03028 0DAB F820    RUNCNT LDI        LO(ADCRAW) ;DISPLAY TIME REQUIRED TO REACH TEMP
03029 0DAD A8                PLO    DP2    ;
03030 0DAE E8                SEX    DP2    ;
03031 0DAF FB89              LDI    0B9H   ;
03032 0DB1 F5                SD            ;
03033 0DB2 33DA    )         BDF    ATSEPT ;STOP WHEN SETPOINT REACHED.
03034 0DB4 F810              LDI    LO(UPMIN) ;POINT TO MINUTES TIMER.
03035 0DB6 A7                PLO    DP1    ;
03036 0DB7 07                LDN    DP1    ;
03037 0DB8 3AC0    )         BNZ    DIPIT  ;IF DATA THEN DISPLAY IT.
03038 0DBA 27                DEC    DP1    ;POINT TO SECONDS DATA.
03039 0DBB 07                LDN    DP1    ;
03040 0DBC 3AC0    )         BNZ    DIPIT  ;IF DATA THEN DISPLAY.
03041 0DBE 30E0    )         BR     CHKRES ;
03042 0DC0 D4      DIPIT  SEP CALL          ;DISPLAY TIMER DATA.
03043 0DC1 0983    )         WORD   BINBCD ;
03044 0DC3 0F0035            BYTE   LO(UPSEC),0,LO(KEYBF4) ;SECONDS OUT FIRST -- DO ONE BYTE.
03045                                      ;PUT BCD HERE.
03046 0DC6 D4                SEP    CALL   ;NOW DO MINUTES.
03047 0DC7 0983    )         WORD   BINBCD ;
03048 0DC9 100003            BYTE   LO(UPMIN),0,LO(BCDRES) ; -- -- PUT IT HERE.
03049 0DCC D4                SEP    CALL   ;GET MINUTES DATA INTO BUFFER.
```

```
03050 ODCD OD4D  )         WORD   DISTIM   ;
03051 ODCF D4              SEP    CALL     ;DISPLAY DATA.
03052 ODD0 OAEA  )         WORD   DISDAT   ;
03053 ODD2 324B            BYTE   LO(KEYBF1),LO(RIGHTD)  ;
03054 ODD4 D4              SEP    CALL     ;SET COLON ON.
03055 ODD5 OB1B  )         WORD   COLON    ;
03056 ODD7 46              BYTE   LO(RIGHTB)       ;
03057 ODD8 30E0  )         BR     CHKRES   ;
03058 ODDA F82C   A1SEPT   LDI    LO(COMWRD)       ;
03059 ODDC A7              PLO    DP1      ;
03060 ODDD F823            LDI    23H      ;
03061 ODDF 57              STR    DP1      ;
03062 ODE0 F805   CHKRES   LDI    LO(NEWKEY)       ;
03063 ODE2 A8              PLO    DP2      ;
03064 ODE3 08              LDN    DP2      ;
03065 ODE4 FB0C            XRI    0CH      ;
03066 ODE6 32F1  )         BZ     CLEAR    ;
03067 ODE8 08              LDN    DP2      ;
03068 ODE9 FB0F            XRI    0FH      ;GO TO PROGRAM MODE?
03069 ODEB 32EE  )         BZ     PROGRM   ;
03070 ODED DA              SEP    UPC      ;
03071 ODEE FB80   PROGRM   LDI    80H      .;
03072 ODF0 C8              LSKP            ;
03073 ODF1 F800   CLEAR    LDI    00       ;
03074 ODF3 57              STR    DP1      ;
03075 ODF4 D4              SEP    CALL     ;BLANK DISPLAYS.
03076 ODF5 08FB  )         WORD   BLNKAL   ;
03077 ODF7 DA              SEP    UPC      ;
03078                      ;
03079                      ;
03080      0E00  )         ORG    0E00H    ;
03081                      ;
03082                      ;....ROM TABLES....?
03083                      ;....SEVEN SEGMENT TABLE....?
03084                      ;
03085 0E00 CB9DBDCF CODE   BYTE   0CBH,9DH,0BDH,0CFH    ;CODE
03086 0E04 D7CF8BEE SELP   BYTE   0D7H,0CFH,8BH,0EEH    ;SELP
03087 0E08 E6CEB4BB OFLOW  BYTE   0E6H,0CEH,B4H,8BH     ;OF-L
03088 0E0C 80E6CE85 OEGF   BYTE   80H,0E6H,0CEH,85H     ;OF=
03089 0E10 EEE6CE85 PDEGF  BYTE   0EEH,0E6H,0CEH,85H    ;POF
03090 0E14 EEE6CB85 PDEGC  BYTE   0EEH,0E6H,0CBH,85H
03091 0E18 BE9DBABD HOLD   BYTE   0BEH,9DH,BAH,0BDH     ;HOLD
03092 0E1C CF8C9D8C EROR   BYTE   0CFH,8CH,9DH,8CH      ;EROR
03093 0E20 CBFBFBCB COOC   BYTE   0CBH,0FBH,0FBH,0CBH   ;TIME MIN ; SEC
03094 0E24 D7CF7AD7 SENS   BYTE   0D7H,0CFH,7AH,0D7H    ;
03095 0E28 80E6CB85 DESC   BYTE   80H,0E6H,0CBH,85H     ;0C=
03096 0E2C BE9D998C HOUR   BYTE   0BEH,9DH,99H,8CH      ;HOUR
03097 0E30 FB0EDF5  NUMBER BYTE   0FBH,0B0H,0EDH,0F5H   ;0,1,2,3
03098 0E34 B6D7DFF0        BYTE   0B6H,0D7H,0DFH,0F0H   ;4,5,6,7
03099 0E38 FFF7            BYTE   0FFH,0F7H             ;8,9
03100 0E3A CE8CB78C FR4R   BYTE   0CEH,8CH,0B7H,8CH     ;FRYER RECOVERY TEST MESSAGE.
03101 0E3E BEB0DFBE HI6H   BYTE   0BEH,0B0H,0DFH,0BEH   ;OIL TEMP TO HIGH FOR TEST.
03102 0E42 01020304 PROTAB BYTE   1,2,3,4 ;#80 IS AN INVALID NUMBER.
03103 0E46 05B00607        BYTE   5,60H,6,7    ;
03104 0E4A 08090080        BYTE   8,9,0,80H    ;
03105 0E4E 80808080        BYTE   80H,80H,80H,80H ;
03106 0E52 F828   DIAGOP   LDI    LO(IFBYTE)      ;
03107 0E54 A7              PLO    DP1      ;
03108 0E55 F84B            LDI    LO(LMPONE)      ;
03109 0E57 A8              PLO    DP2      ;
03110 0E58 F801            LDI    1        ;
03111 0E5A 57              STR    DP1      ;
03112 0E5B 58              STR    DP2      ;
03113 0E5C F864  )         LDI    LO(DIAGNO)      ;INITIALIZE UPC.
03114 0E5E AA              PLO    UPC      ;
```

```
03115 0E5F F80E    )            LDI     HI(DIAGNO)   ;
03116 0E61 BA                   PHI     UPC          ;
03117 0E62 DA                   SEP     UPC          ;
03118 0E63 D3          DIAGEX   SEP     PC           ;
03119 0E64 F829   )    DIAGNO   LDI     LO(UTILTY)   ;
03120 0E66 A3                   PLO     PC           ;
03121 0E67 F806   )             LDI     HI(UTILTY)   ;
03122 0E69 B3                   PHI     PC           ;
03123 0E6A D3                   SEP     PC           ;
03124 0E6B F873   )             LDI     LO(TEST)     ;
03125 0E6D A3                   PLO     PC           ;
03126 0E6E F80E   )             LDI     HI(TEST)     ;
03127 0E70 B3                   PHI     PC           ;
03128 0E71 3063   )             BR      DIAGEX       ;
03129 0E73 F805        TEST     LDI     LO(NEWKEY)   ;
03130 0E75 A7                   PLO     DP1          ;
03131 0E76 E7                   SEX     DP1          ;FOR LOGICAL OP.
03132 0E77 80                   GLO     CPUWRK       ;
03133 0E78 F3                   XOR                  ;COMPARE.
03134 0E79 3A80   )             BNZ     DONCAN       ;
03135 0E7B F800                 LDI     0            ;
03136 0E7D A0                   PLO     CPUWRK       ;
03137 0E7E 3087   )             BR      TSTCON       ;
03138 0E80 F80F        DONCAN   LDI     0FH          ;
03139 0E82 F3                   XOR                  ;
03140 0E83 3A87   )             BNZ     TSTCON       ;
03141 0E85 07                   LDN     DP1          ;
03142 0E86 A0                   PLO     CPUWRK       ;
03143 0E87 F80C        TSTCON   LDI     LO(CKTIC1)   ;
03144 0E89 A7                   PLO     DP1          ;FOR DIAGNOSTIC LAMPS.
03145 0E8A 07                   LDN     DP1          ;GET TIC DATA.
03146 0E8B 3A9D   )             BNZ     SKPLMP       ;
03147 0E8D F802                 LDI     2            ;.2 SECOND DELAY.
03148 0E8F 57                   STR     DP1          ;
03149 0E90 7E                   SHLC                 ;
03150 0E91 F84B                 LDI     LO(LMPONE)   ;
03151 0E93 A7                   PLO     DP1          ;
03152 0E94 07                   LDN     DP1          ;GET DATA.
03153 0E95 7E                   RSHL                 ;
03154 0E96 3B99   )             BNF     $+3          ;
03155 0E98 7E                   RSHL                 ;
03156 0E99 57                   STR     DP1          ;
03157 0E9A 17                   INC     DP1          ;POINT TO LAMP TWO.
03158 0E9B 17                   INC     DP1          ;
03159 0E9C 57                   STR     DP1          ;
03160 0E9D 80         SKPLMP    GLO     CPUWRK       ;
03161 0E9E 3ABE   )             BNZ     SKPTS2       ;
03162 0EA0 F80D                 LDI     LO(CKTIC2)   ;
03163 0EA2 A7                   PLO     DP1          ;
03164 0EA3 07                   LDN     DP1          ;
03165 0EA4 FB2B                 XRI     28H          ;
03166 0EA6 3AB6   )             BNZ     SKPHUR       ;
03167 0EA8 D4                   SEP     CALL         ;
03168 0EA9 0AD5   )             WORD    DISMSG       ;
03169 0EAB 412C   )             BYTE    LO(LEFTA),HOUR ;
03170 0EAD D4                   SEP     CALL         ;
03171 0EAE 0983   )             WORD    BINBCD       ;
03172 0EB0 4E0035               BYTE    LO(UPHUR),0,LO(KEYBF4) ;
03173 0EB3 D4                   SEP     CALL         ;
03174 0EB4 0914   )             WORD    DISBUF       ;
03175 0EB6 F80D        SKPHUR   LDI     LO(CKTIC2)   ;
03176 0EB8 A7                   PLO     DP1          ;
03177 0EB9 07                   LDN     DP1          ;
03178 0EBA FB1E                 XRI     1EH          ;
03179 0EBC 3ACE   )             BNZ     SKPTMP       ;
```

```
03180 0EBE D4           SKPTS2  SEP    CALL      ;
03181 0EBF 0983    )            WORD   BINBCD    ;
03182 0EC1 2201                 BYTE   LO(DEGFMO),1  ;
03183 0EC3 03                   BYTE   LO(BCDRES)    ;
03184 0EC4 D4                   SEP    CALL      ;
03185 0EC5 0AEA    )            WORD   DISDAT    ;
03186 0EC7 0048                 BYTE   LO(BCDRE3),LO(RIGHTD)  ;
03187 0EC9 D4                   SEP    CALL      ;
03188 0ECA 0AD5    )            WORD   DISMSG    ;
03189 0ECC 410C    )            BYTE   LO(LEFTA),DEGF  ;
03190 0ECE 80            SKPTMP GLO    CPUWRK    ;
03191 0ECF 3AEB    )            BNZ    SKPBS     ;
03192 0ED1 F80B                 LDI    LO(CKTIC2)    ;
03193 0ED3 A7                   PLO    DP1       ;
03194 0ED4 07                   LDN    DP1       ;
03195 0ED5 FB14                 XRI    14H       ;
03196 0ED7 3AE8    )            BNZ    SKPBS     ;
03197 0ED9 FB4B                 LDI    LO(RIGHTD)    ;
03198 0EDB A8                   PLO    DP2       ;
03199 0EDC EB                   SEX    DP2       ;
03200 0EDD F8FF          SET8   LDI    OFFH      ;
03201 0EDF 73                   STXD             ;
03202 0EE0 88                   GLO    DP2       ;
03203 0EE1 FB40                 XRI    LO(DISCHD)    ;
03204 0EE3 3ADD    )            BNZ    SET8      ;
03205 0EE5 D4                   SEP    CALL      ;
03206 0EE6 0A0D    )            WORD   DISWRT    ;
03207 0EE8 F80B          SKPBS  LDI    LO(CKTIC2)    ;
03208 0EEA A7                   PLO    DP1       ;
03209 0EEB 07                   LDN    DP1       ;
03210 0EEC 3AFB    )            BNZ    NORES     ;
03211 0EEE FB2B                 LDI    2BH       ;
03212 0EF0 57                   STR    DP1       ;
03213 0EF1 FB2B                 LDI    LO(IFBYTE)    ;
03214 0EF3 A8                   PLO    DP2       ;
03215 0EF4 0B                   LDN    DP2       ;
03216 0EF5 FB03                 XRI    3         ;
03217 0EF7 5B                   STR    DP2       ;
03218 0EF8 D4                   SEP    CALL      ;
03219 0EF9 0904    )            WORD   FRYRID    ;
03220 0EFB DA            NORES  SEP    UPC    ;DO UTILITIES.
03221                          ;
03222                          ;HOORAY.......HOORAY........HOORAY......?
03223                           END              ;
```

Therefore, it is apparent that the cooking computer 10 provides a higher accurate temperature compensated timer which can be re-programmed in the field with ease by users quite rapidly. Although a specific embodiment of the cooking computer 10 has been disclosed in detail above, it may be appropriate that various modifications and changes may be made in the instant invention without departing from the spirit and scope. It is to be explicitly understood that the instant invention is limited solely by the appended claims.

What is claimed is:

1. A cooking computer for use with a deep fat fryer comprising means for sensing a temperature of a quantity of shortening in a well of a deep fat fryer, means for storing a cooking time, means for timing a cooking cycle of a product within said shortening using said cooking time and periodically adjusting said cooking time by applying a time compensation factor to compensate for changes in said temperature of said shortening, the magnitude of said periodic adjustments being proportional to said time compensation factor and a difference between a set point temperature and a temperature of said quantity of shortening, means for storing a signal determinative of the magnitude of said time compensation factor for a given temperature condition, control panel means for changing said stored cooking time and said time compensation factor in a reprogramming operation, and means for providing a termination signal indicative of the termination of a cooking cycle.

2. A cooking computer as defined in claim 1 wherein the cooking time is shortened by the means for timing the cooking cycle when said shortening temperature exceeds said set point temperature.

3. A cooking computer as defined in claim 2 including means for providing a product holding time and displaying a running count of said product holding time.

4. A cooking computer as defined in claim 1 wherein said means for providing said termination signal provides a control signal to a basket lift of said deep fat fryer to cause said basket lift to be actuated thereby withdrawing comestibles positioned within said basket from said shortening to terminate cooking.

5. A deep fat fryer comprising a frypot having heating means located therein for heating shortening, means for sensing a temperature of a quantity of said shortening in said frypot, means for storing a cooking time, means for timing a cooking cycle of a product within said shortening using said cooking time and periodically adjusting said cooking time by applying a time compensation factor to compensate for changes in said temperature of said shortening the magnitude of said periodic adjustments being proportional to said time compensation factor and a difference between a set point temperature and a temperature of said quantity of shortening, means for storing a signal determinative of the magnitude of said time compensation factor for a given temperature condition, control panel means for changing said stored cooking time and said time compensation factor in a reprogramming operation, and means for providing a termination signal indicative of the termination of a cooking cycle.

6. A deep fat fryer as defined in claim 5 wherein the cooking time is shortened by the means for timing the cooking cycle when said shortening temperature exceeds said set point temperature.

7. A deep fat fryer as defined in claim 6 including means for providing a product holding time and displaying a running count of said product holding time.

8. A deep fat fryer as defined in claim 5 wherein said means for providing said termination signal provides a control signal to a basket lift of said deep fat fryer to cause said basket lift to be actuated thereby withdrawing comestibles positioned within said basket from said shortening to terminate cooking.

9. A cooking computer for use with a deep fat fryer comprising a variable resistance for sensing a temperature of a quantity of shortening in a frypot of a deep fat fryer, an analog to digital converter converting an analog signal from said resistance means to a digital signal, a microprocessor which employs a stored program for processing the binary signal from said analog to digital converter, said microprocessor performing a timing function for the timing of a product immersed in said shortening and periodically adjusting said cooking time by applying a time compensation factor to compensate for changes in said temperature of said shortening, the magnitude of said periodic adjustments being proportional to said time compensation factor and a difference between a set point temperature and a temperature of said quantity of shortening whereby the cooking time is decreased when said shortening temperature exceeds said set point temperature, means for storing a digital signal determinative of the magnitude of said time compensation factor for a given temperature condition, means for storing a cooking time, control panel means for changing said stored cooking time and said time compensation factors in a reprogramming operation, and means for controlling a basket lift of a deep fat fryer to provide a basket lift raise signal upon termination of said cooking cycle.

10. A cooking computer as defined in claim 9 wherein more than a plurality of cooking times and associated time compensation factors are stored to provide a plurality of recipe selections.

11. A deep fat fryer comprising a frypot having heating means located therein for heating shortening to a preselected cooking temperature, means independent of said heating means for sensing a temperature of said shortening in said frypot, means for storing a cooking time, a means for timing a cooking cycle of a product within said shortening using said cooking time and periodically adjusting said cooking time by applying a time compensation factor to compensate for deviations of said sensed temperature from said preselected temperature, the magnitude of said periodic adjustments being proportional to said time compensation factor and said deviation, means for storing a signal determinative of the magnitude of said time compensation factor for a given temperature condition, and means for providing a termination signal indicative of the termination of a cooking cycle.

12. The deep fat fryer of claim 11 wherein said means of storing a cooking time includes storage means for storing a plurality of cooking times for various types of food.

13. The deep fat fryer according to claim 12 wherein said means for storing a signal determinative of the magnitude of said time compensation factor includes means for storing a plurality of such signals.

14. The deep fat fryer according to claim 13 including means for selecting any combination of one of said cooking times and one of said signals to regulate the time of a selected cooking cycle.

15. A cooking appliance comprising:
means for heating a cooking medium;
means for sensing a temperature of said cooking medium;
means for storing a cooking time;
means for timing a cooking cycle of a product within said cooking medium using said cooking time and periodically adjusting said cooking time by applying a time compensation factor to compensate for changes in said temperature of said cooking medium, the magnitude of said periodic adjustments being proportional to the time compensation factor and a difference between a set point temperature and a temperature of said cooking medium;
means for storing a signal determinative of the magnitude of said time compensation factor for a given temperature condition;
control panel means for changing said stored cooking time and said compensation factor;
means for providing a termination signal indicative of the termination of a cooking cycle; and
means for receiving said termination signal and for removing said product from said cooking medium.

16. A cooking appliance comprising:
means for heating a cooking medium;
means for sensing a temperature of said cooking medium;
means for storing a cooking time;
means for timing a cooking cycle of a product within said cooking medium using said cooking time and periodically adjusting said cooking time by applying a time compensation factor to compensate for deviations of said sensed temperature from a preselected temperature, the magnitude of said periodic adjustments being proportional to said time compensation factor and said deviation;
means for providing a termination signal indicative of the termination of a cooking cycle; and
means for receiving said termination signal and for removing said product from said cooking medium.

17. A cooking appliance according to claim 16 further including a control panel means for changing said stored cooking time and said compensation factor.

* * * * *